US012123244B2

(12) United States Patent
Nowak et al.

(10) Patent No.: US 12,123,244 B2
(45) Date of Patent: Oct. 22, 2024

(54) EMERGENCY OPENING DEVICE FOR A CLOSURE

(71) Applicant: Nowak Innovations Spolka Z Ograniczona Odpowiedzialnoscia, Krosno (PL)

(72) Inventors: Zygmunt Nowak, Krosno (PL); Janusz Nowak, Krosno (PL); Wieslaw Nowak, Krosno (PL)

(73) Assignee: Nowak Innovations Spolka z Ograniczona Odpowiedzialnoscia, Krosno (PL)

( * ) Notice: Subject to any disclaimer, the term of this patent is extended or adjusted under 35 U.S.C. 154(b) by 598 days.

(21) Appl. No.: 17/051,940

(22) PCT Filed: Apr. 30, 2019

(86) PCT No.: PCT/PL2019/050026
§ 371 (c)(1),
(2) Date: Oct. 30, 2020

(87) PCT Pub. No.: WO2019/212370
PCT Pub. Date: Nov. 7, 2019

(65) Prior Publication Data

US 2021/0115721 A1 Apr. 22, 2021

(30) Foreign Application Priority Data

May 2, 2018 (PL) ........................................ 425422

(51) Int. Cl.
*E05F 15/72* (2015.01)
*E05F 1/00* (2006.01)
(Continued)

(52) U.S. Cl.
CPC .............. *E05F 15/72* (2015.01); *E05F 1/006* (2013.01); *E05F 1/1091* (2013.01); *E05F 1/16* (2013.01);
(Continued)

(58) Field of Classification Search
CPC .......... E05F 15/72; E05F 1/006; E05B 51/023
(Continued)

(56) References Cited

U.S. PATENT DOCUMENTS 3,043,338 A * 7/1962 Hanson .................. F15B 15/10 92/240
3,744,123 A * 7/1973 Vers .......................... F16F 9/38 29/520
4,043,128 A * 8/1977 Bendler ................. A62C 2/248 60/632
5,361,549 A * 11/1994 Betts ......................... E04B 1/98 49/141
(Continued)

FOREIGN PATENT DOCUMENTS

CA 2543750 A1 10/2006
DE 2431965 A1 4/1975
JP H1118918 A 1/1999

*Primary Examiner* — Gregory J Strimbu
(74) *Attorney, Agent, or Firm* — Andrzej Malarz, Esq.

(57) ABSTRACT

An integrated system for releasing trapped persons in a vehicle (PARIS) includes a central management unit (CPU) to which sensors (D1, D2, . . . Dn), an input-output socket (S) for connecting a service computer and control switches or buttons, and at least the following are connected at an output of the central management unit: an automatic seatbelt cutting system (SBC), a system for automatically opening door locks and bolts and locking them in the open position (LOB), and a system for automatically swinging doors and locking them in the open position (DOB).

5 Claims, 26 Drawing Sheets

(51) Int. Cl.

| | |
|---|---|
| ***E05F 1/10*** | (2006.01) |
| *E05F 1/16* | (2006.01) |
| *E05F 15/53* | (2015.01) |
| *E05F 15/56* | (2015.01) |

(52) U.S. Cl.

CPC ............... *E05F 15/53* (2015.01); *E05F 15/56* (2015.01); *E05Y 2201/426* (2013.01); *E05Y 2201/448* (2013.01); *E05Y 2800/122* (2013.01); *E05Y 2800/25* (2013.01); *E05Y 2900/132* (2013.01); *E05Y 2900/148* (2013.01); *E05Y 2900/531* (2013.01)

(58) Field of Classification Search

USPC ............................................................ 49/141

See application file for complete search history.

(56) References Cited

U.S. PATENT DOCUMENTS

| | | | | | |
|---|---|---|---|---|---|
| 5,839,230 | A * | 11/1998 | Licking | E05F 15/57 | 49/141 |
| 2005/0240331 | A1* | 10/2005 | Nowak | F15B 15/19 | 292/195 |
| 2006/0010769 | A1* | 1/2006 | Pelz | F15B 15/227 | 49/141 |
| 2012/0242069 | A1* | 9/2012 | Parks | B60R 21/2338 | 280/743.2 |
| 2013/0139681 | A1* | 6/2013 | Nowak | F15B 15/20 | 92/145 |
| 2016/0186479 | A1* | 6/2016 | Delbos | E05F 15/53 | 91/418 |
| 2019/0128045 | A1 | 5/2019 | Nowak | | |

* cited by examiner

EMERGENCY OPENING DEVICE FOR A CLOSURE

TECHNICAL FIELD

The subject matter of the invention are various methods of emergency opening of manholes (entry openings/hatches) or loading holes (doors/hatches) in emergency situations, especially an emergency move/shift (opening, make door ajar, moving/shifting or pushing out) of movable components closing manholes (entry openings), exit openings, loading or unloading openings, from closed position into opened position, such as doors, manholes, hatches, gates, emergency exits, windows, window panes and other, especially in means of transport, construction furnishing devices and premises (buildings). The invention regards also various systems and devices and the way of their installation/assembly/fitting, which in emergency situations enable fast evacuation of people, animals, valuable objects, equipment or machinery, from various means of land, air and water (sea) transport and from various rooms and buildings/premises such as residential and public buildings, residential and office sheds (containers) and others.

FIELD OF THE INVENTION

The invention is especially useful for automobile vehicles, especially passenger vehicles, as their share in traffic events is predominant. Nevertheless, the invention is also intended for buses and cargo trucks/lorries/vans and other civilian and military means of land, water and air transport.

The invention also finds its specific use in heavy means of transport, especially in armoured/bullet-proof-military vehicles, such as military means of transport, armoured fighting vehicles, vehicles with armour added and also helicopters, aircraft, submarines, cargo trucks/lorries/vans in which there are special reinforcing structures of plating/sheath, armour, vehicle body and chassis components, including the structures of door, hatches and manholes, where standard means of emergency openings used in the cases of light structures/constructions does not perform their function.

The event is also useful in other applications of civilian and military nature and also in applications other than military ones, such as military technical devices/equipment, building/civil engineering machinery, trains, underground (metro), boats, off-shore drilling platforms etc. which, due to their kind/type and intended use, must have a very robust structure.

STATE OF THE PRIOR ART

After an occurrence of various emergency situations such as road/traffic accidents, explosions of mines and missiles, collisions of vehicles, gas explosions in buildings and on drilling platforms, earthquakes, fires, floods/sinking and other natural disasters, e.g. falling down trees or elements of buildings' structures, blown down and tossed by hurricanes and storms, people, animals and valuable items (e.g. Important documents, pieces of art in museums, computers with confidential information stored) get often trapped when the entrances or exits in means of transport, technical equipment or buildings get locked and immediate evacuation or access to the inside of vehicles, technical equipment or buildings are necessary in order to release people, carry out resuscitation of the injured or to take out valuable items.

In the present state of technology there are solutions which attempt to solve the problems of passengers trapped mainly in passenger cars because of jammed door and impossibility to free oneself from fastened seat-belts.

The mechanism of emergency opening of vehicle door after a road accident is known from a Polish patent application no. P.364324; it has an electric motor coupled with a mechanical transmission which drives a threaded mandrel/bolt which causes a bushing move out and press on the door to open. The move out and move bac action of the bushing is controlled by an electronic system which assesses the level of opening the door and resistance (refusal) of opening.

A Polish patent no. PL194447B1 describes a system of emergency opening of vehicle door which got jammed as a result of an accident. This system is made up of pneumatic telescopic actuators driven by pyrotechnic gas generators coupled with a system of sensors which give a signal to actuate/explode the pyrotechnic gas generators. The pneumatic actuator, on the end touching the door to be opened, a self-adjusting element mating the shape of the surface of the element of the door to be opened, designed to release the mechanical blockade of opening of the door lock or activating a mechanism opening the lock. The self-adjusting element causing opening the door is formed in such a way that, while pressing a relatively large area, not in one point, it could unlock the mechanical blockade of the lock directly or by a system of levers and/or tension members (strands) fastened in the door or to initiate the mechanism of the lock opening. The telescopic actuators are installed in the reinforced elements of a vehicle body between the frame of the door opening and the movable door leaf, preferably in the sill or door posts.

The design of the telescopic actuator for emergency opening of automotive vehicle door is known prom patent no. PL225323. Such an actuator is made up of a bushing body and movable/sliding bushings placed inside it, the consecutive bushings having smaller diameters, fitted concentrically one in another and sequentially moving out driven by the pressure agent. The bushing body is connected with a head attached to its free end, the head featuring a control segment and drive system of the actuator, which is at least one gas generator. The bushing body and also the movable/sliding bushings have at least one ring channel (groove) on the surface mating another tube element, near the faces of these tube elements. At least one ring is fitted in the groove or at least one system of rings, made up of at least two rings, which function as a guide and sealing of these tube elements. The sealing and guiding function is effected by mating the individual rings or systems of rings with the tube elements of the body, middle sliding bushing and internal sliding bushing, as cylindrical tubes of high dimension precision and cylindricity of their outer and inner diameters and low surface roughness. The telescopic actuator has a control segment and at least one gas generator which are placed in the head in graded/stepped openings in the plate fitted in the head and they are protected with a pressure back plate with a protective ring. The electric leads necessary for their function are routed through a side hole in the head wall and a two-step blind of the head is the first thrust surface of the actuator.

Another Polish patent application no. P.396300 describes a telescopic actuator with tubular cylinders which eat the same time has also the function of pistons. On one end of its tubular body, this actuator has at least one baffle featuring at least one through-hole (pass) routing the gas pressure from the gas generator to the space of the working cylinders of the actuator. On the other end of the tubular body, it has a system of blockade sliding-out of the cylinders.

Another patent application, no. P.416870, shows the way of mounting an actuator for opening a vehicle door. The base of the actuator body is fixed to a car body element which is on inner side, by screwing, riveting, gluing or welding. This element of car body is most often a door post made of robust thick sheet metal (plates/shapes) which are stronger than other parts of car body or outside plating. The actuator is placed between the inner plate (a stronger one, to which it was fastened) and the outer plate (a thinner one), and an opening is cut in the outer plate necessary to slide out the movable/sliding element in order to push off the door to be opened. The other way of installation of the actuator consists in that, that on its movable (sliding-out) piece an tip segment (cover plate) is placed having a diameter smaller than or equal to the diameter of the hole in the outer side of the post or the car body plate. This tip segment (cover plate) on the movable part of the actuator is to eliminate the single-point action of the actuator in order to avoid deformation or destruction of the element pushed out. In turn, on the inner side of the door, opposite the opening in the outside plate of the car body (with the door closed), a reinforcement element is placed in a form of a door cover plate, taking on the force of hitting by the pushing tip segment fixed on the movable (sliding-out) element of the actuator. Depending on the door construction details, the door cover plate (tip segment) can be flat or wedge-shaped.

In this second case, the wedge shaped is to compensate the slant/bevel between the door element and the tip segment (cover plate) on the actuator, as slant action of the actuator could its sliding off from the door edge and—as a result—jamming instead of opening.

These pyrotechnic actuators for emergency door opening, mainly in automotive vehicles which has light and then weak and thin outer plating of the car body, are fixed onto the robust/strong inner elements/shapes of the car body which are under the outer plane/surface of the car body, e.g. onto door posts B and C.

SUMMARY OF THE INVENTION

The purpose of this invention is to offer various systems, devices and ways of emergency opening of entrance, exit, loading or unloading holes (openings) in emergency situations, which at least partially eliminate the drawbacks of solutions in the state of art/technology or solve the problems unsolved or unknown so far.

Doors, manholes, hatches, emergency exits made of strong/robust materials, e.g. thick steel plates, and also windows in which bullet-proof panes are often fixed, often get jammed or blocked in emergency situations, which prevents quick releasing or getting out of, or it is impossible to release trapped people at all, which often results in fatalities. That is why another purpose of the invention is to provide solutions which will find application in reinforced designs, in heavy means of transportation, especially in armoured military vehicles, where standard ways of emergency opening, used in light designs, are not sufficient.

In various types of heavy designs and heavy transportation means, mainly in military armoured vehicles, cargo trucks/lorries, trains, boats and buildings, not always it is possible to install actuators for emergency opening on the rims of entry, exit manholes, loading and unloading holes or in the light of entry/exit manholes, loading/unloading holes such as: doors, manholes, hatches, emergency exits, windows or window panes. That is why another purpose of this invention is to provide such actuators and the way of their installation, which will assure a possibility of installation in a way not interfering or not limiting the possibility/ability of convenient use of the entry or exit manholes.

According to one aspect of this invention, the system of emergency opening of entry openings in emergency situations is adjusted to emergency opening of the first closing element, which is a movable element for opening and closing the entry opening, which is made/inserted in the second element, whereas the other element is an immovable element and constitutes a barrier between the two spaces or rooms, favourably in the design in means of transport, a building structure, a building or a technological device/equipment. The system has the means of moving the movable element from its closed position to its opened position, while—according to the invention—the system has an actuator including the body, preferably made of metal, at least one sliding-out element located, at least partially, within the body and the actuating/enabling means, which drive the actuator and as a result of enabling/activation, they cause the movement of at least one sliding-out element, and the actuator body is fixed in the opening in the immovable element, favourably supported from the side of the movable element, or the actuator body is fixed in the opening in the immovable element, favourably supported from the side of the immovable element.

Favourably, the actuator body is fixed in the opening in the immovable element from the side of the immovable element and the body has a thrust collar which is supported on the outer surface of the immovable element.

Favourably, the body features a thread and there is a nut on it on the inside surface of the immovable element, for permanent fixing of the actuator in the opening of the immovable element.

Favourably, the body is closed with a mounting head to which the actuating agents/means are attached or the body is closed with a gas generator, at least one-step one.

Favourably, the actuator body is fixed in the opening in the movable element and in this opening, from the side of the immovable element a bushing is fastened with a thrust collar which is supported on the inner surface of the movable element and overlapping, at least partially, the actuator when the movable element is in closed position.

Favourably, the actuator has a fixing-and-closing element and this element on one end is fastened to the actuator body and on the other end—to the immovable element.

Favourably, between the actuator body and the fixing-and-closing element there is a guard bushing which additionally fastens and stabilizes the enabling/actuating means (agents/media).

Favourably, the actuator is a telescopic actuator and has several movable/siding-out elements in the form of bushings, fitted concentrically one in another and sequentially moving/sliding out driven by the pressure agent.

Favourably, the actuator is a piston actuator and has at least one moving/sliding-out element in the form of a piston. There is a mandrel/rod, located behind the piston placed inside the body, which (the mandrel) is connected by an articulated joint with the movable element or with the immovable element.

Favourably, the actuator has a sliding-out element in the form of flexible material, which increases its volume as a result of externally applied gas or air pressure, or as a result of activation of an actuating agent placed hermetically inside.

Favourably, the activating/enabling agents are at least one gas generator or the pressure of compressed gas or air, or compressed air from a compressor.

Favourably, the gas generator is placed within the actuator body, basically in parallel to the axis of action of the actuator and the gas generator at least partially or in total enters the sliding-out element or sliding-out elements. Alternatively, the gas generator is placed within the actuator body basically perpendicularly to the axis of action of the actuator Favourably, the internal part of the assembly head has a slant plane opposite the gas generator, which causes a rebound of properly directed shock wave originating at the moment of activation of the gas generator and thus an increase of the shock wave.

Favourably, the activating agents is at least one material with the shape memory, of the SMA/SMP type.

Favourably, the fixing head or the gas generator, at least one-step one, closing the body, have guards preventing self-activation of the activating agent and they have reinforcement, favourably in the form of a plate made of metal or plastic, and under this reinforcement at least one activating agent is placed.

Favourably, the fixing head or gas generator, at least one-step one, has a thread for assembling within the actuator body.

Favourably, the reinforcement has a hollow or holes enabling to screw in and screw out the head having a thread or a gas generator, at least one-step one, having a thread.

Favourably, the assembly head or the gas generator, at least one-step one, have internal and external electrical connections in the form of electric cables or electrodes routed outside.

Favourably, the actuator is equipped with an electronic system controlling the start-up/activation and operation of the actuator, which (the system) is situated inside the actuator, especially in the body.

The electronic control system includes one or more of the following elements: a battery or an accumulator (storage cell) or a super-condenser to supply the control electronic system controlling the operation of the actuator, a diode or display signalling its charging level, a microprocessor controlling the actuator operation, alfa-numerical push-buttons or a touch screen to enter a code activating/enabling the operation of the actuator, a guard (e.g. made of glass) of the digital or literal push-buttons, which is broken or removed when it is necessary to activate/enable the actuator, a push-button of emergency enabling/activation of the actuator without entering the access code (the push-button can be highlighted e.g. by colour pulsing light and stay active/enabled all the time or enabled/activated after any abnormal parameters occur as sensed/recorded by the sensors fitted in the actuator or sending signals to the actuator), a metal removable guard of the electronic systems and gas generators protecting the actuator against an electro-magnetic pulse, an acceleration sensor, a shock sensor—an accelerometer plus position sensor—a gyroscope, a sound sensor, a smoke or fire sensor or a temperature sensor, a water sensor, a voice sensor—speech analyser/recognizer, which enables giving voice commands/instructions to enable the actuator operation or its disabling, gesture sensor or scanner, finger or palm scanner or face scanner or eye scanner, a sensor—a wireless communication module—enabling remote activation of the actuator by the crew, and also remote or wired activation by special rescue units after analysing the access codes, a room-Inside pressure sensor or a vehicle interior pressure sensor or an equipment unit/facility pressure sensor, a path sensor measuring the angle of opening of the opened movable element.

Favourably, a movable element or immovable element is equipped with an additional compensating element, favourably in a form of a cover plate which compensates their plane to right angle or almost right angle relative to the vector of force of the operating actuator.

Favourably, the actuator is installed inside the floor in an immovable element. Alternatively, the actuator is installed under the floor which constitutes a part of the immovable element and the movable element has an additional extension element protruding out of the light of the opening of the movable element in the direction of the actuator installed below. An additional actuator can be installed in the movable element and the axis of the actuator action is directed towards and at the height of the floor face of the immovable element.

In another aspect of this invention the system of emergency opening of entry openings in emergency situations consists in emergency opening of the first dosing element, which is a movable element for opening and closing the entry openings, which is made/inserted in the second element, whereas the other element is an immovable element and constitutes a barrier between the two spaces or rooms, favourably in the design in means of transport, a building structure, a building or a technological device/equipment, especially of civilian and military use, with the use of an emergency opening system including means of moving the movable element from closed position to open position, and the movable element are sliding doors moved by a sliding mechanism equipped with at least one guide and a rolling element moving along the guide.

According to the invention, at least the first actuator gets activated, which is connected, on one of its ends, with the immovable element and at the other end it is connected with the sliding (driving) system of the sliding door.

Favourably, prior to activation of the first actuator which moves the movable element, first the means adjusted/intended for opening locks and bolts, securing the movable element in closed position, are activated.

Favourably, the actuator has material with shape memory, SMA/SMP, which as a result of activation changes its shape and shifts the movable element, moving the movable element from its closed position to its open position.

Favourably, the solution includes the use of at least one actuator which has a body, at least one sliding-out element located, at least partially, within the body and the actuating/enabling means, which drive the actuator and as a result of enabling/activation, they cause the movement of at least one sliding-out element.

The activating/enabling agents/means can be at least one gas generator or the pressure of compressed gas or air, supplied from a compressed air vessel, or compressed air from a compressor.

The activating means/agents can also be at least one material with the shape memory, of the SMA/SMP type.

Favourably, according to the solution, three actuators get activated in pre-determined sequence, and the first actuator is located in parallel or almost in parallel to the wider side plane of the movable element, the second actuator is located inside the immovable element from the face of the siding door and the third actuator on the inner side of the sliding door, and the first actuator is connected by a strand/rod with the sliding mechanism which—at the moment of activating the actuator—executes work and moves the sliding mechanism of the sliding door, moving the sliding door to the open position.

Favourably, at least one actuator operation gets activated/enabled by an electronic control system, which moves the movable element, without prior activation/enabling of the actuator opening the closing means of the movable element or the closing means do not have a connection with the actuator designed for emergency opening of closing means of the movable element, whereas the closing means are then broken apart or bending or get pulled out from the movable element.

According to another aspect of this invention, the way of fastening the actuators for emergency opening of entry openings in emergency situations, used in the systems consisting in emergency opening of the first closing element, which is a movable element for opening and closing the entry opening, which is made/inserted in the second element, whereas the other element is an immovable element and constitutes a barrier between the two spaces or rooms, favourably in the design in means of transport, a building structure, a building or a technological device/equipment, and the mentioned actuator has a body, at least one sliding-out element located at least partially within the body and activating means which drive the actuator and, as a result of activation they cause movement/shift of at least one sliding-out element, characteristic with the fact that at least one additional shape is installed, which has a function of pressing surface on the movable element or immovable element, and the actuator is placed in at least one opening in this additional shape.

Favourably, at least one movable shape is installed, which goes along the plane of the movable element in such a way that it can be set in a position outside the outline/contour of the movable element or in its light.

Favourably, at least one vertical shape is installed and at least one horizontal shape is installed, and the shapes move relative to each other vertically or horizontally on guides along the plane of the movable element.

Favourably, at least one rotary (pivot) shape is installed and at least one thrust/back point to fix (immobilize) the rotary shape in the light of the movable shape.

According to another aspect of this invention, the system of emergency opening of entry openings in emergency situations is adjusted to emergency opening of the first closing element, which is a movable element for opening and closing of the entry opening, which is made/inserted in the second element, whereas the other element is an immovable element and constitutes a barrier between the two spaces or rooms, favourably in the design in means of transport, a building structure. a building or a technological device/equipment, whereas the system has the means to move the movable element from closed position into open position According to the invention the system includes at least one additional shape which has a function of pressing surface on the movable element or the immovable element and in at least one hole in this additional shape the actuator is placed, which has a body, at least one sliding-out element located, at least partially, within the body and the actuating/enabling means, which drive the actuator and as a result of enabling/activation, they cause the movement of at least one sliding-out element.

Favourably, the activating/enabling agents are at least one gas generator or the pressure of compressed gas or air, supplied from a compressed gas or air vessel or compressed air from a compressor.

Favourably, the activating agents is at least one material with the shape memory, of the SMA/SMP type.

Favourably, at least one movable shape is fastened, with a possibility to move along the plane of the movable element in such a way that it can be set in a position outside the outline/contour of the movable element or in its light.

Favourably, the system has at least one shape installed as a sliding one and the shape is moved vertically or horizontally on guides along the plane of the movable element.

Favourably, the system has at least one rotary (pivot) shape is installed pivotally and at least one thrust/back point to fix (immobilize) the rotary shape in the light of the movable shape.

Favourably, the system has at least one shape which is fixed permanently on the corner of the entrance opening and this shape overlaps partially the immovable element and partially the movable element.

According to another aspect of this invention, the device for emergency opening of entry openings in emergency situations is adjusted to emergency opening of the first closing element, which is a movable element for opening and closing of the entry opening, which is made/inserted in the second element, whereas the other element is an immovable element and constitutes a barrier between the two spaces or rooms, favourably in the design in means of transport, a building structure, a building or a technological device/equipment, whereas [the device] has the means to move the movable element from closed position into open position. According to the invention the device comprises at least one simple machine with a drive, located between the movable element and the immovable element, and the moving force coming from the drive makes the simple machine pushes the movable element and immovable element apart from each other, exerting on them with forces basically perpendicular/orthogonal to the plane of movable element and immovable element.

Favourably, the simple machine has the form of a wedge or a lever, especially a two-arm one.

Favourably, the drive is an actuator which has a body, at least one sliding-out element located, at least partially, within the body and the actuating/enabling means, which drive the actuator and as a result of enabling/activation, they cause the movement/shift of at least one sliding-out element.

Favourably, the activating/enabling agents are at least one gas generator or the pressure of compressed gas or air, supplied from a compressed gas or air vessel or compressed air from a compressor.

Favourably, the activating agents is at least one material with the shape memory, of the SMA/SMP type.

Favourably, the drive of the machine is a hand lever.

In another aspect of this invention, the system for emergency opening of entry openings in emergency situations, adjusted to emergency opening of the first closing element, which is a movable element for opening and closing of the entry opening, which is made/inserted in the second element, whereas the other element is an immovable element and constitutes a barrier between the two spaces or rooms, favourably in the design in means of transport, a building structure, a building or a technological device/equipment, whereas [the device] has the means to move the movable element from closed position into open position. Further, the system has a flexible actuator comprising a body made of a flexible material, which delimits a hermetic chamber for the working agent which is compressed gas, and it has got an expanding element or agent/means affecting the internal walls of the body of the actuator chamber, and the flexible actuator is placed in the space between the movable element and the immovable element in such a way that—as a result of activation—the expanding agent/means or element affects the flexible body of the actuator which expands and moves the movable element from its closed position to the open position.

Favourably, the expanding element is a material with the shape memory or a flexible container supplied with compressed gas.

Favourably, the expanding element is compressed gas or air.

Favourably, the source of energy generating the compressed gas is at least one gas generator located inside or next to the chamber of the actuator. The source of energy generating the compressed gas can also be at least one vessel of the compressed gas located outside or next to the chamber of the actuator, or compressed air supplied from a compressor.

Favourably, the actuator is a flexible gasket with a hermetic chamber which is installed on the rim of the hole/opening in the immovable element or on the inside rim of the movable element, especially of means of transport.

Favourably, the flexible gasket is spread over the entire surface of the hole rim or on the entire internal surface of the movable element, between the movable element and the immovable element, or only on a part of this surface, or on several separate sections.

Favourably, a flexible container/element is located inside the flexible gasket and after gas/air pressure is supplied from at least one gas generator or a compressed air vessel or compressed air from a compressor, the element causes expansion or breaking the pneumatic gasket which, pressing on the opened movable element, moves the movable element into open position.

According to another aspect of this invention, the actuator adjusted to be used in systems or devices for emergency opening of the first dosing element, which is a movable element for opening and closing the entry opening, which is made/inserted in the second element, whereas the other element is an immovable element and constitutes a barrier between the two spaces or rooms, favourably in the design in means of transport; a building structure, a building or a technological device/equipment, especially of civilian and military use, has a body, at least one sliding-out element located at least partially within the body and at least one gas gas generator which drives the actuator and, as a result of activation they cause movement/shift of at least one sliding-out element. Inside the actuator a solid or liquid material is placed, which has an ability to absorb and dissolve the carbon deposit generated during activation of the gas generator and having lubricating properties facilitating folding and re-sliding-out of the sliding-out elements of the actuator.

This invention also refers to a portable device adjusted to be used in systems or devices for emergency opening of the first closing element, which is a movable element for opening and closing the entry opening, which is made/inserted in the second element, whereas the other element is an immovable element and constitutes a barrier between the two spaces or rooms, favourably in the design in means of transport, a building structure, a building or a technological device/equipment, especially of civilian and military use. The portable device comprises the use of at least one actuator for opening the movable elements and has a pressing element and favourably the movable arms enabling to fix or thrust/back locking the portable device opposite the movable element or opposite a bullet-proof pane in the means of transport, the technical device or the construction/building object (facility).

Favourably, the portable device has an electronic system which controls activation/enabling and operation of at least one sliding-out element installed on the portable device, favourably in the actuator, or connected via the cables electric cables or connected in wireless manner with the control electronic system which controls activation of the actuator.

The application of the afore-described systems, devices and actuator for opening the movable elements, especially for pushing out or breaking bullet-proof panes installed in the windows, doors, window openings or bending out or pushing out the structure in transport means, building facilities or technical devices of civilian and military use. It is favourable if the actuator is installed in the external robust plane of structure of the transport means, technical device or a building facility (object), especially one of civilian and military use, and the structure favourably constitutes the main point of fastening and/or the main thrust/back point for the actuator operating with great power.

Advantage Effects of the Invention

The advantage of the invention is a possibility of the application of these technical solutions in mass production in the automotive and armaments industry. Thanks to the simplified design of the actuator being a pneumatic gasket, whose manufacturing and installation cost is many times lower as compared with the typical telescopic actuators, its common/universal use of this type of actuator will be possible in newly-manufactured passenger cars as well as in those already in use and in other civilian and military means of transport. An additional advantage is a milder manner of operation of the flexible actuator as compared to the telescopic actuators, which increases the safety for the outsiders staying outside means of transport, a technical device or a building object/facility during emergency opening of the movable element.

Thanks to the developed technology, in which the actuators mating simple machines and mobile shapes are applied, there will be a possibility to use emergency opening of exits in designs of means of transport, in technical devices and in building structures/facilities in which there are significant limitations of free space, preventing installation of actuators in a position perpendicular to the movable element to be opened and at the same time the application of emergency evacuation systems which save the health and life of victims of various accidents.

In order to enable the application of the actuators in heavy means of transport such as military vehicles with added armour and armoured ones and also in building constructions/facilities and technical devices, in which thick and robust door designs occur, of manholes, hatches, emergency exits, it is required to apply very big forces to be generated by an actuator.

In the pyrotechnic actuator the gas micro-generators MGG of the GTMS initiators are applied which feature not very strong design as they are generally used to pretension the seatbelts or to initiate the right substance generating gas in airbags.

In order to make it possible to generate such big forces by the actuator, it is necessary to develop a technical solution which will make the MGG and GTMS withstand the very big pressures originated in the actuators intended for heavy means of transport and reaching 500-1000 Mpa/1-2 ccm, that is why the invention originators developed the technical solution which solves this problem. Namely, a special reinforcement was added, e.g. a metal or composite plate, inserted or fused in on the thrust/back side of the gas generator, cables or electrodes and favourable forming of the cylinder-shape head which is intended for installation in various versions of the actuator.

One more advantage of the invention is the use of the actuator installed in a portable device used for emergency opening of the movable element or immovable elements. This device can aid the typical actuators installed in means of transport, in technical devices and in building structures/facilities, or it can be the main device used for emergency opening in emergency situations.

BRIEF DESCRIPTION OF THE DRAWINGS

The invention shall be presented below in a favourable example of embodiment/make with reference to the attached figures in which.

shifting a simple machine (64) in the form of wedges, a simple machine which is a manual lever (67) is applied.

Figure 16:
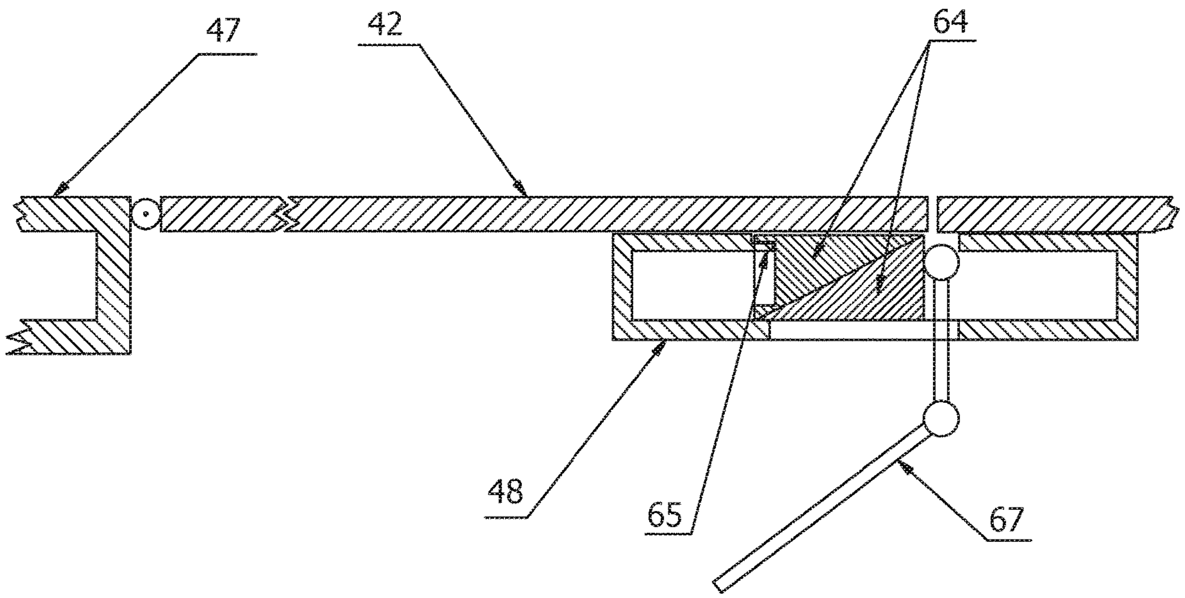
FIG. 16—shows an alternative way of embodiment of the emergency opening system where instead of the actuator (1)
Figure 16A:
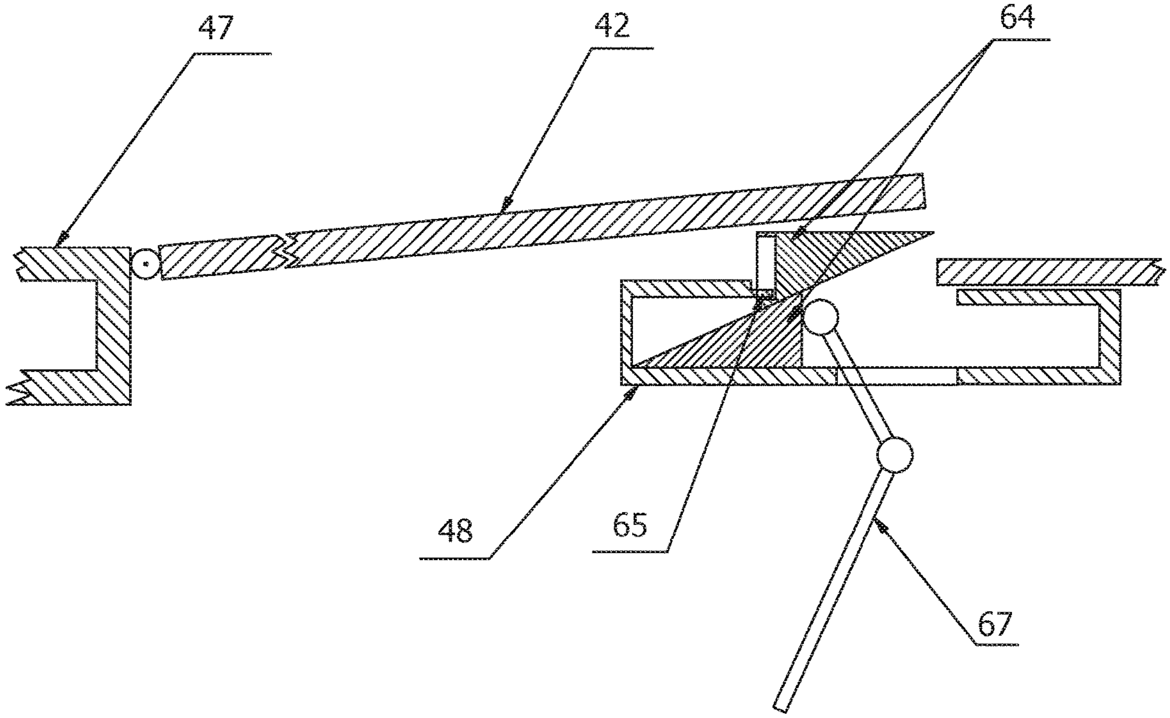

FIG. 16*a*—shows the movable element (42) shifted into the open position after exerting the pressing force of a wedge (64) which was shifted by means of the manual lever (67).

Figure 17:
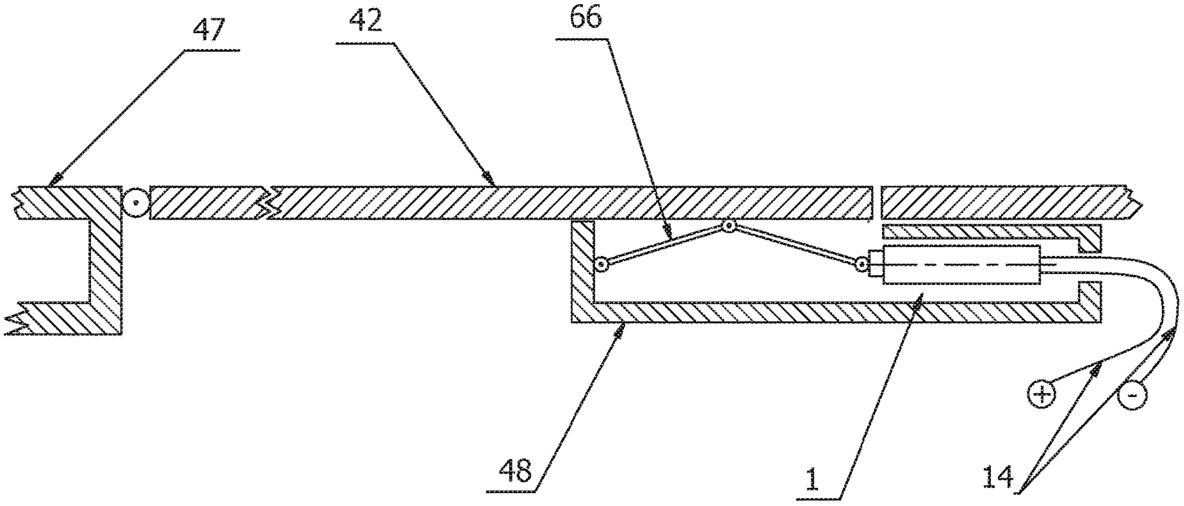

FIG. 17 shows an alternative manner of opening of the movable component (42) by means of a two-arm lever (66) driven by the actuator (1).

Figure 17A:
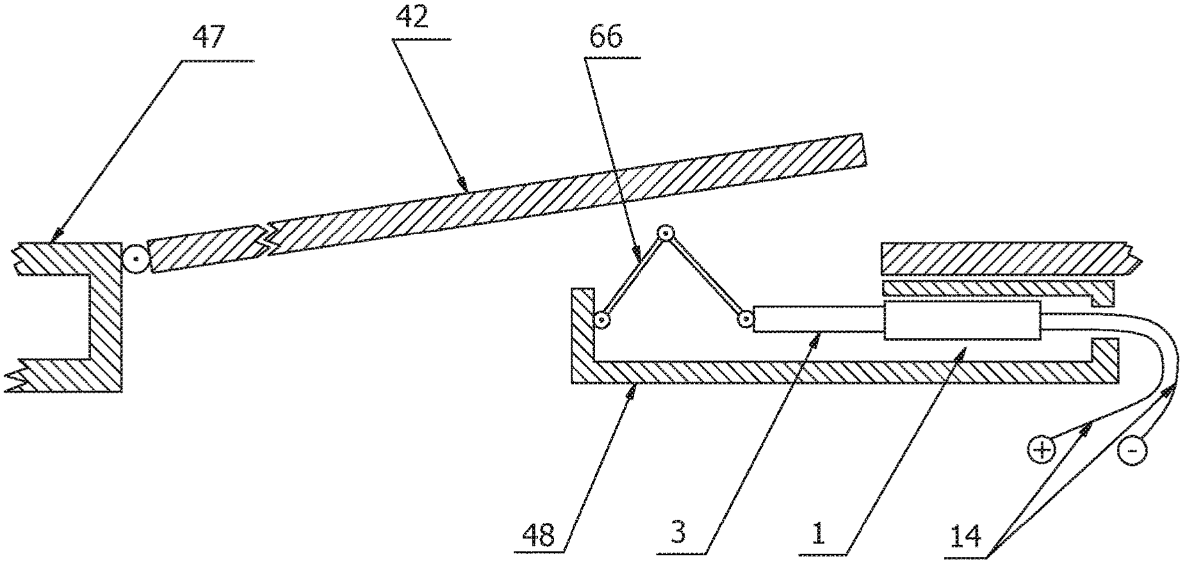

FIG. 17*a*—shows a simple machine in the form of a double-arm lever (66) from FIG. 17 after enabling and operation of the actuator (1) and the movable element (42) shifted to open position.

Figure 18:
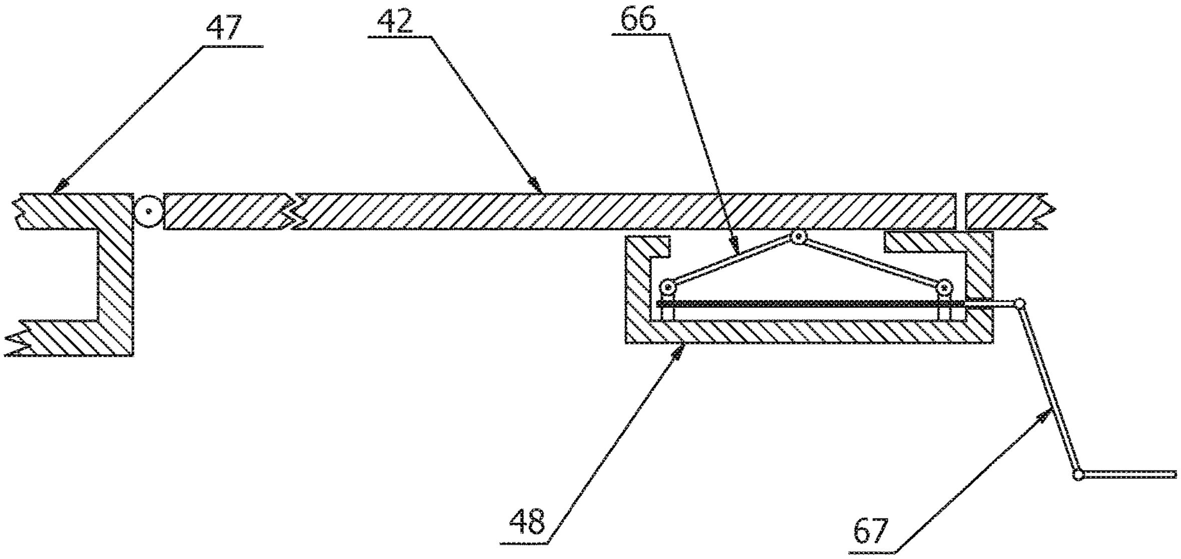

FIG. 18—shows a favourable manner of opening of the movable component (42) by means of the double-arm lever (66) driven by a helical transmission.

Figure 18A:
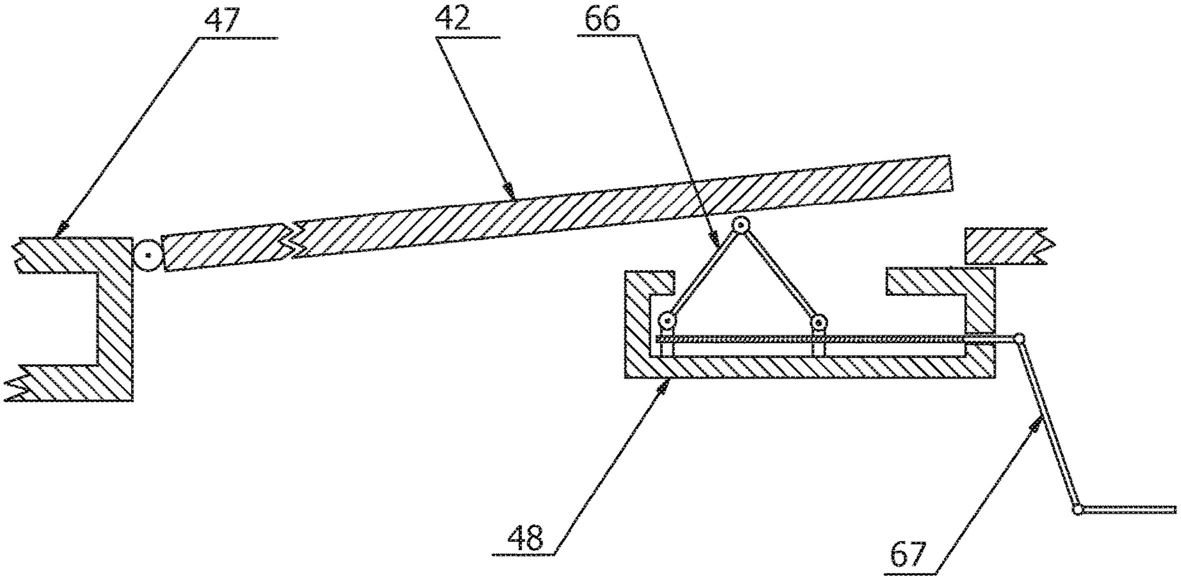

FIG. 18*a*-depicts the movable element (42) shifted into the open position after operation of the double-arm lever (66) driven by a helical transmission (67).

Figure 19:
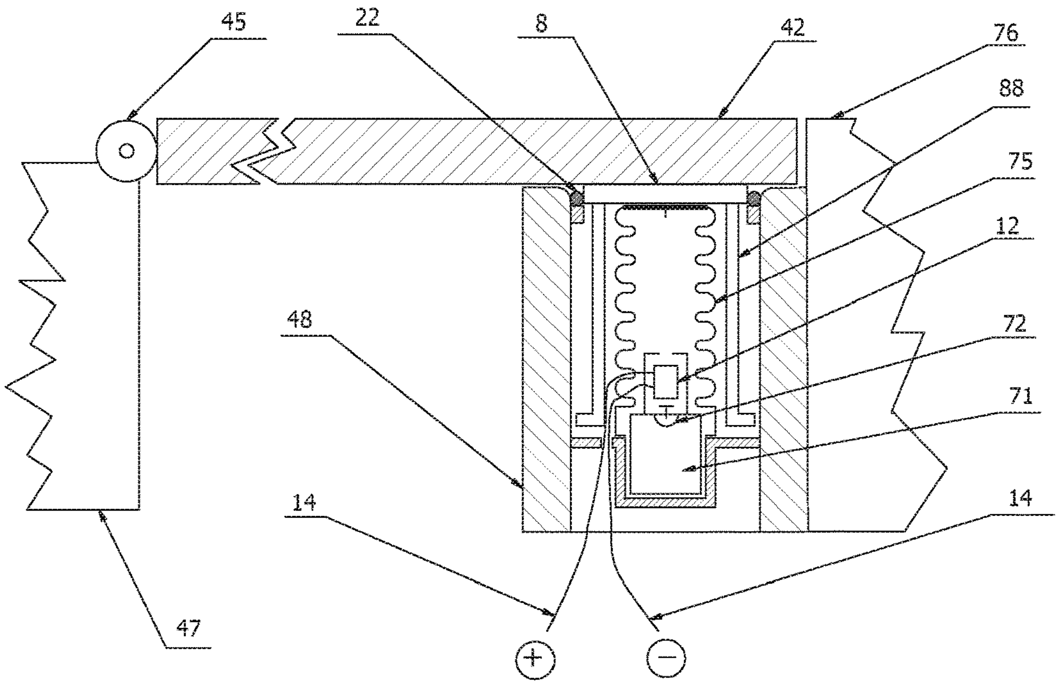
Figure 19A:
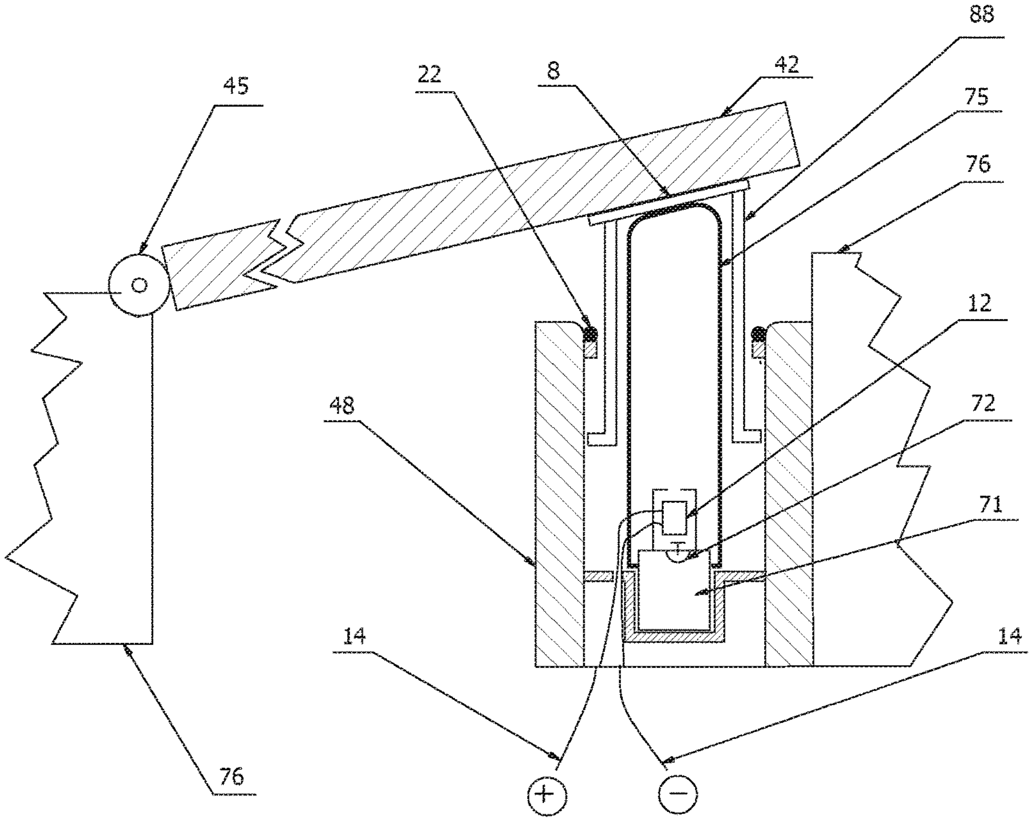

FIG. 19—depicts the manner of opening the movable element (42) by a flexible actuator (75) mounted on the rims of an opening (75) closed by the movable element (42) or on the internal plane of the movable element (42). FIG. 19*a*—shows the movable element (42) shifted to the open position by an enabled and slid-out pneumatic actuator (75) from FIG. 19.

Figure 20:
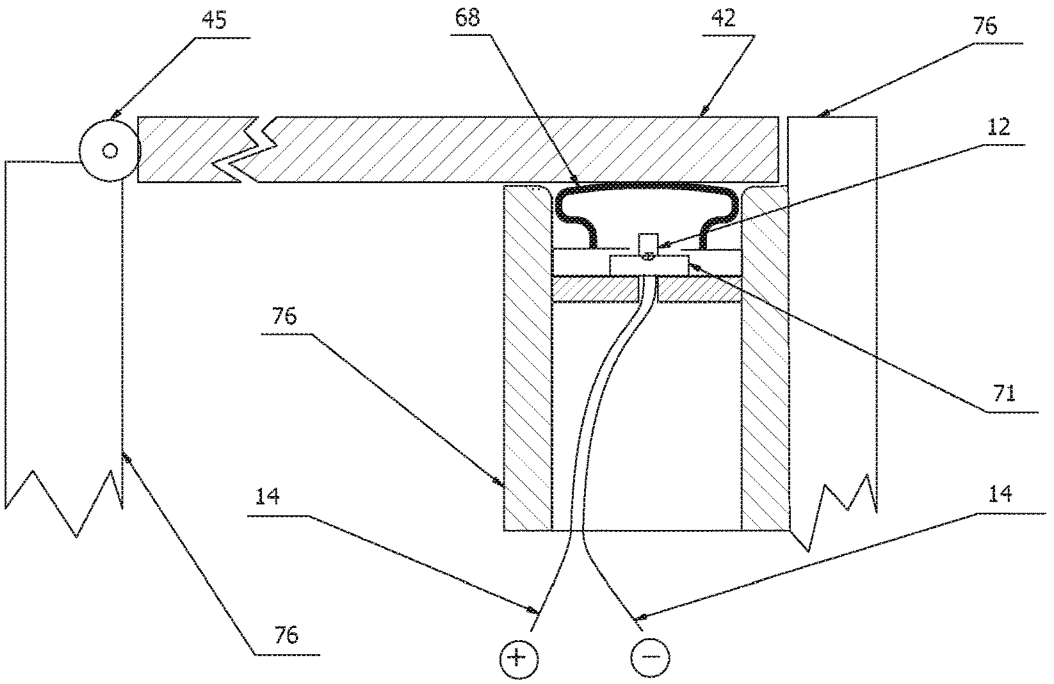

FIG. 20—shows a favourable example of an embodiment of the actuator (1) which is a modified pneumatic gasket (68), (69) commonly used to seal openings and the movable elements (42) such as doors, manholes, hatches or windows.

Figure 20A:
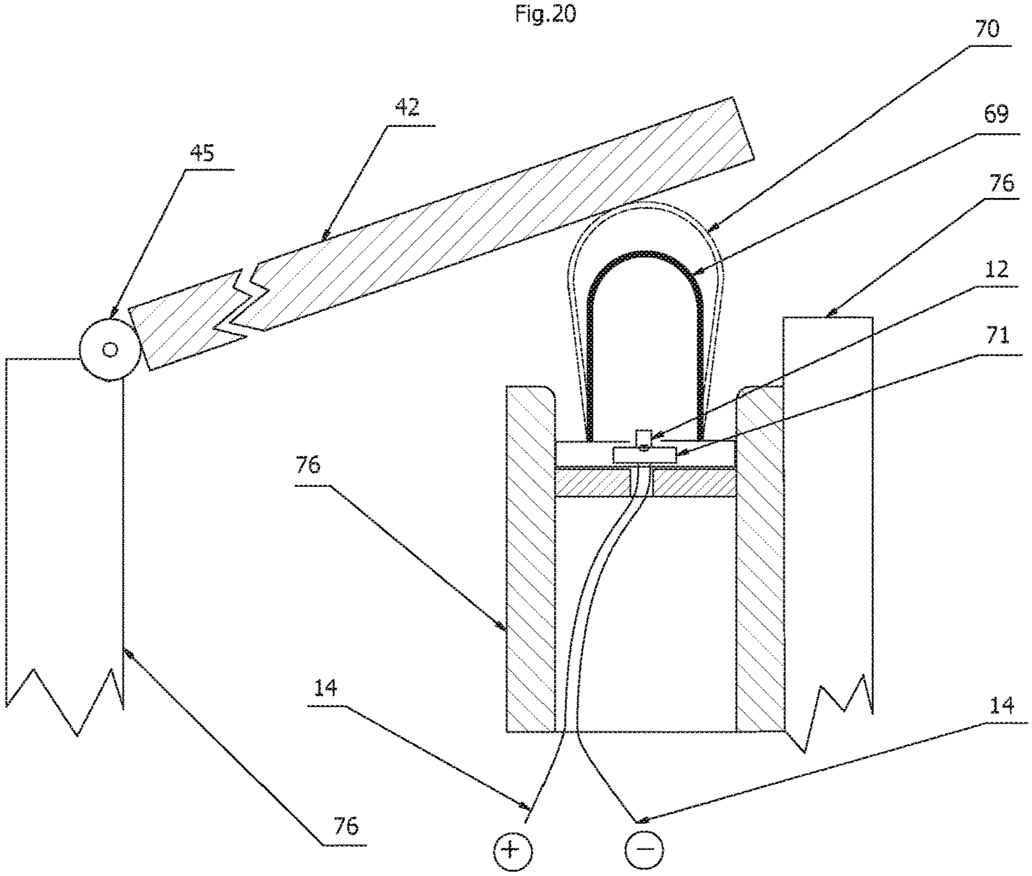

FIG. 20*a*—shows a tensed gasket (sealing) (68, 69) from FIG. 20 with the movable element (42) shifted into the opened position.

Figure 21:
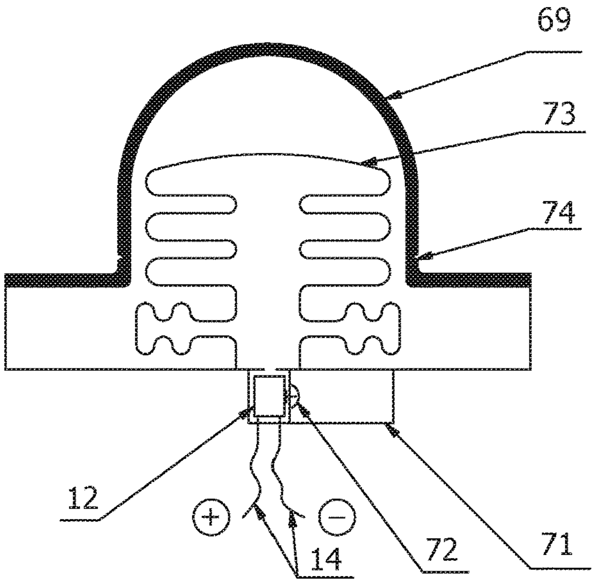

FIG. 21—shows gaskets (sealing) (68, 69) from FIG. 20, inside which an expandable flexible element (73) was fitted, which expands after pressure supplying.

Figure 21A:
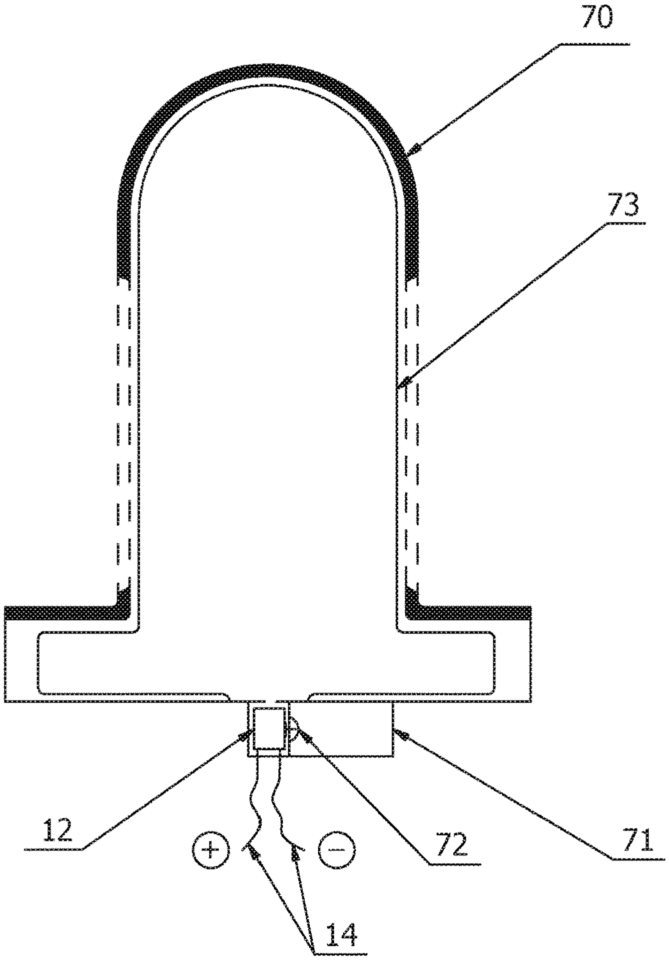

FIG. 21*a*—shows a tensed or broken/tom apart gasket (sealing) 70 from FIG. 21.

Figure 22:
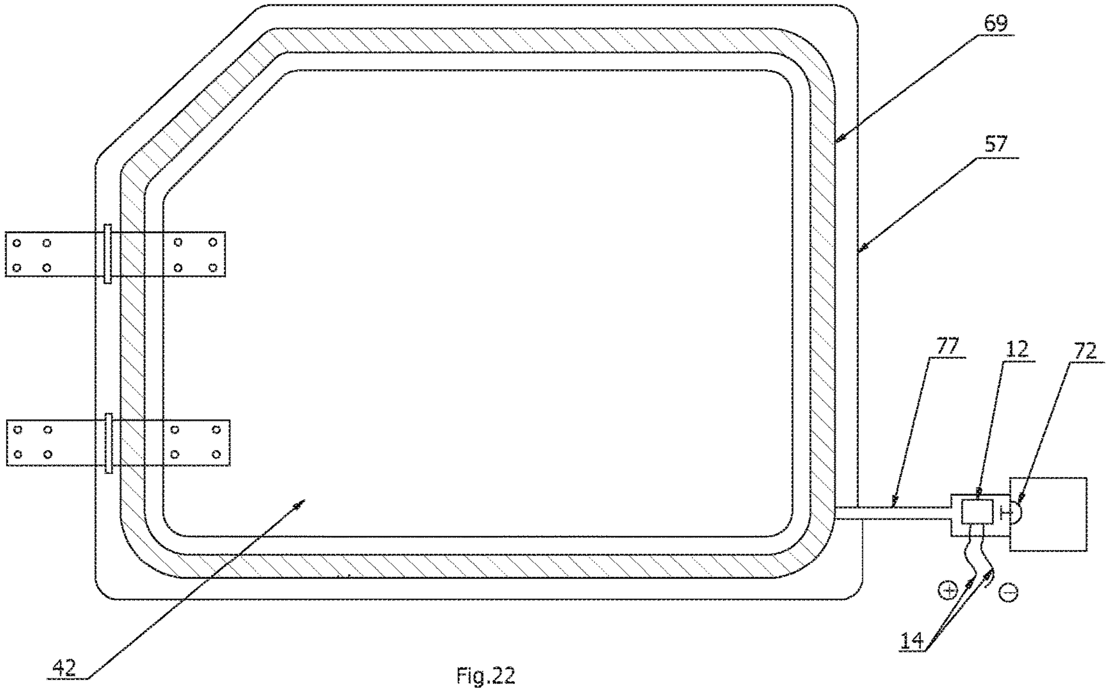

FIG. 22—shows an alternative solution of the manner of opening the movable element (42) by a gasket (69) mounted on the rims of an opening (57) of the movable element (42) or on the movable element (42) to be opened.

Figure 23:
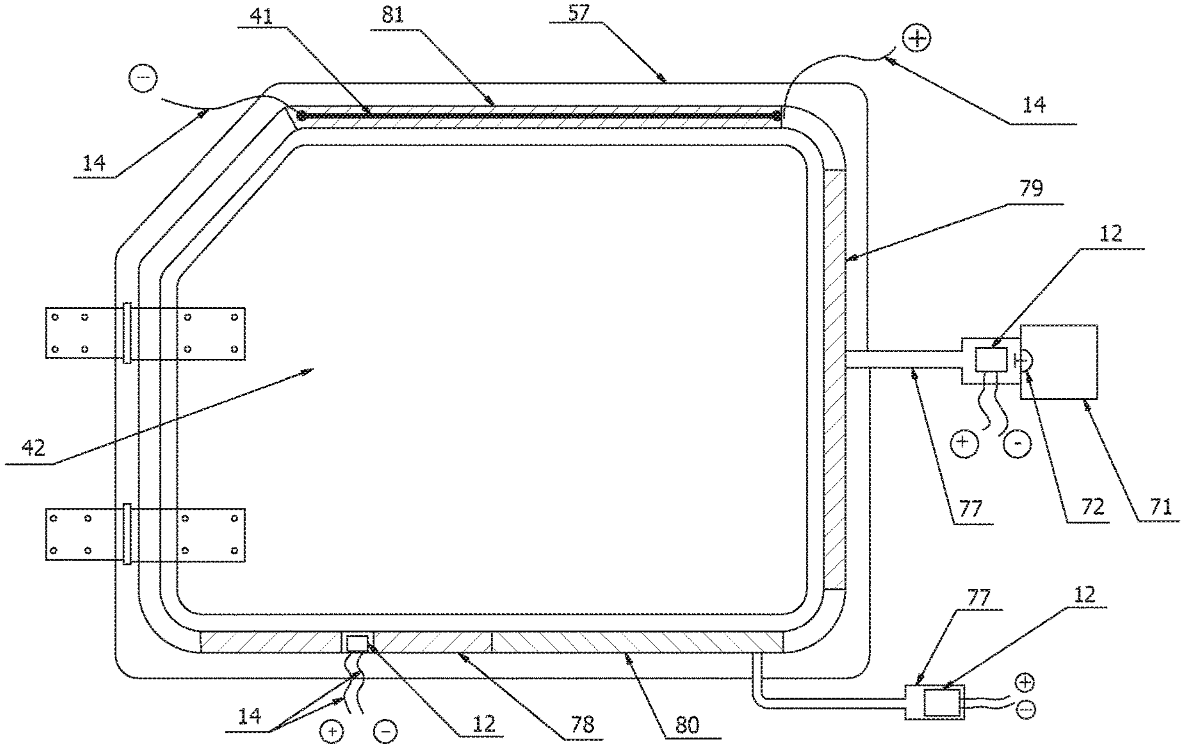

FIG. 23—shows a favourable solution of the manner of opening of the movable element (42) consisting in using the place of installation of the typical gaskets of the movable elements (42), in which a gasket is inserted or installed, one similar in appearance to typical gaskets but having more than one internal hermetic chamber to which sources of compressed gas/air supply are connected and a material with the memory of shape (41) of the SMA/SMP type.

Figure 24:
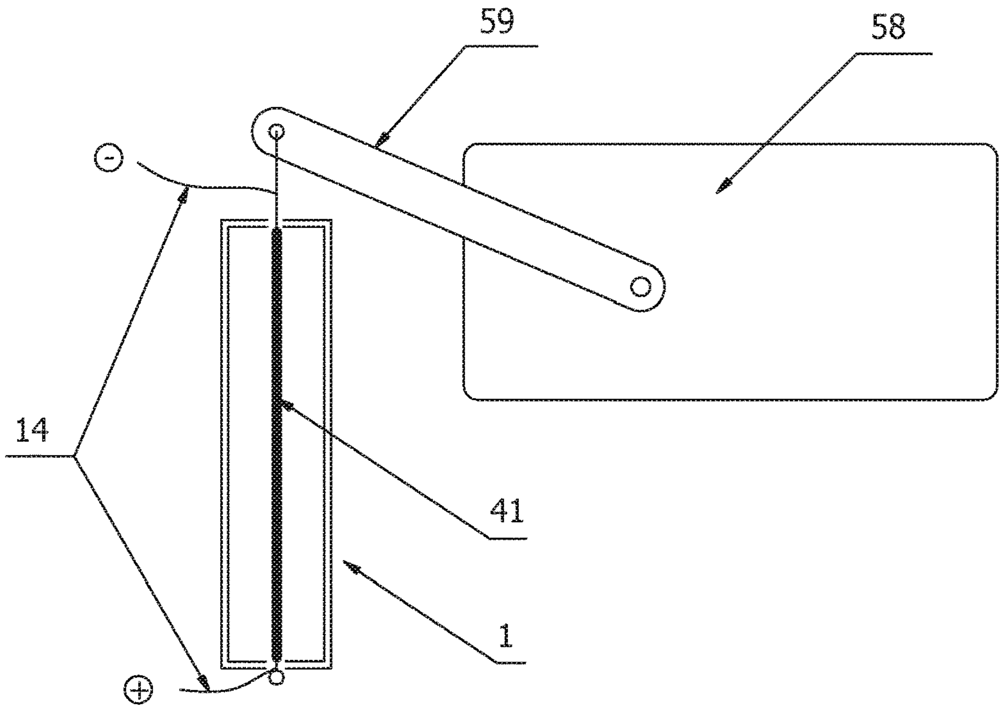

FIG. 24 shows an alternative, advantageous/favourable, manner of opening the lock or bolt of the movable component (42) by means of the actuator (1) with material (41) SMA/SMP.

Figure 24A:
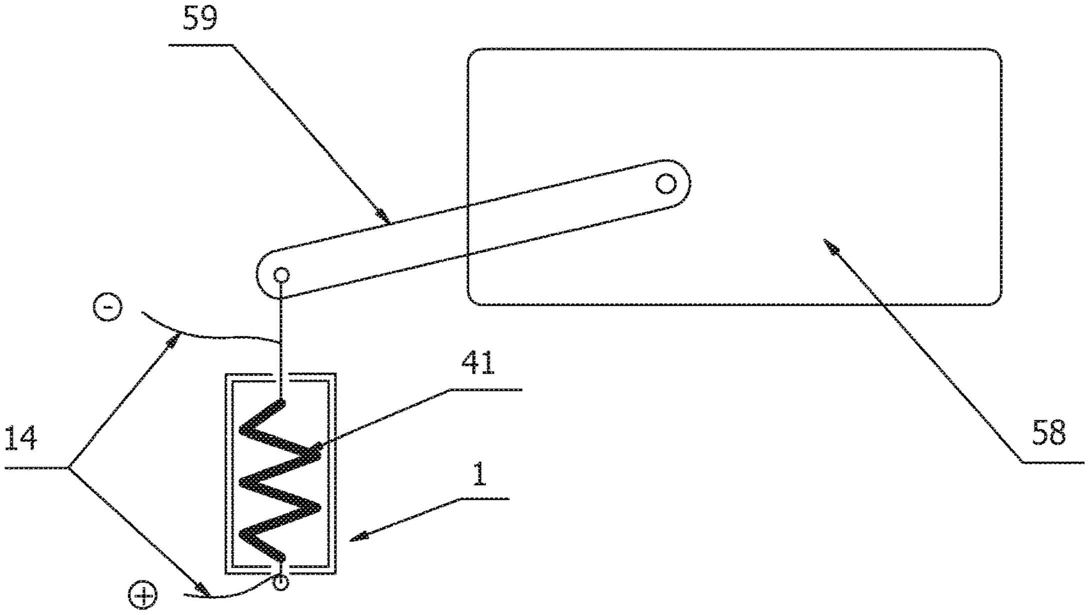

FIG. 24*a*—shows a view of an opened lock or bolt from FIG. 24.

Figure 25:
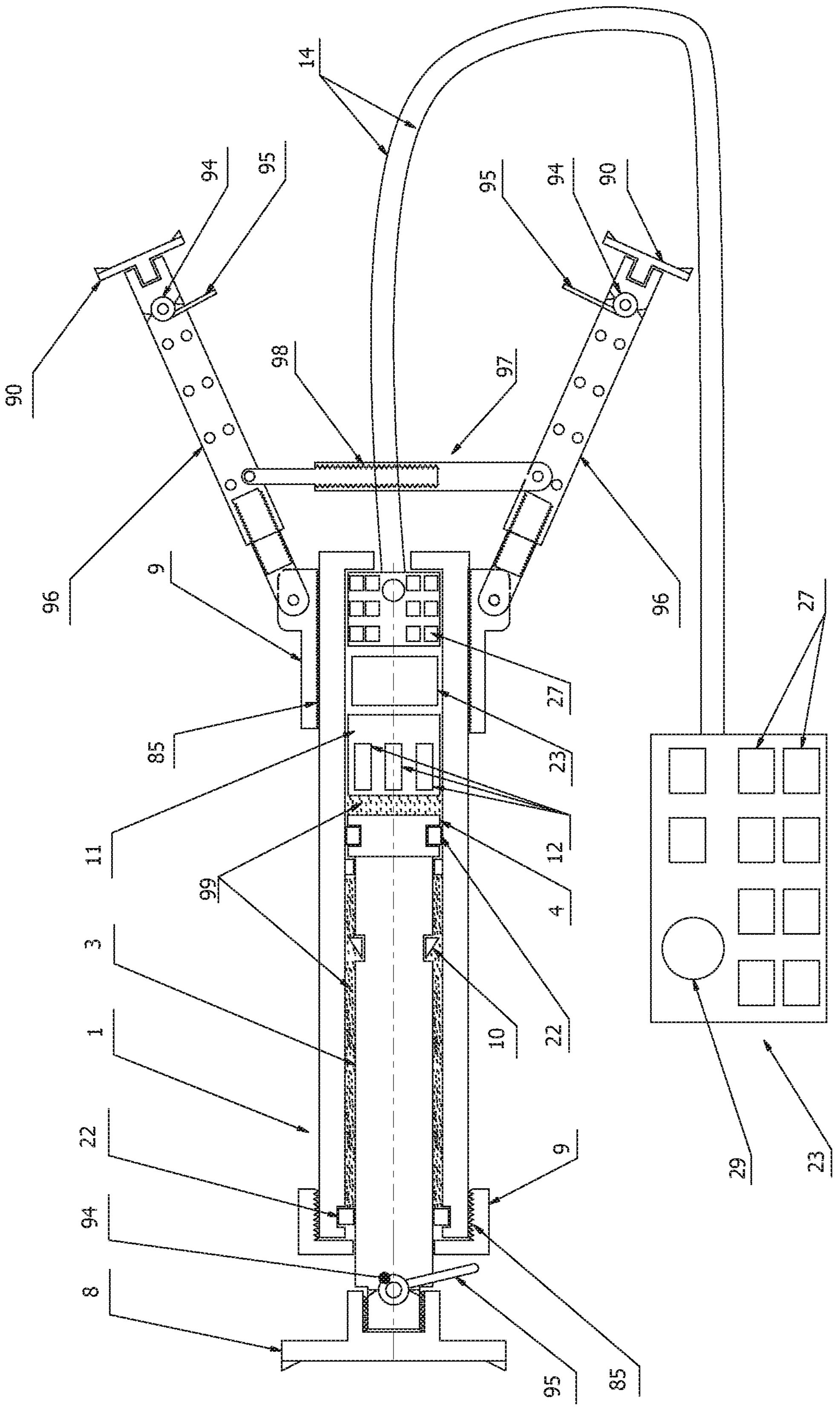
Figure 26:
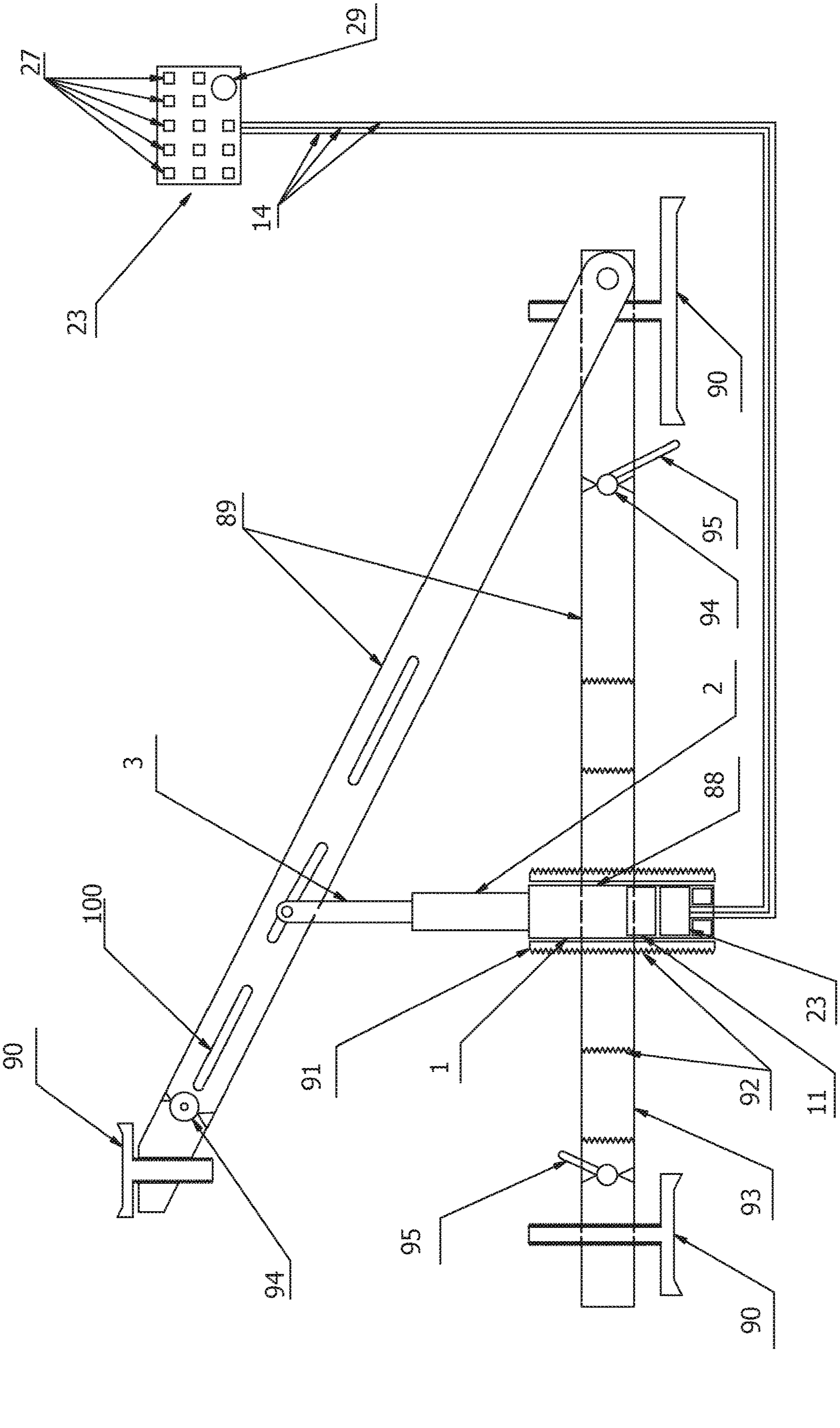

FIG. 25 and FIG. 26—shows another advantageous solution of the device in a form of a pyrotechnic opener.

DETAILED DESCRIPTION OF EXAMPLE EMBODIMENTS OF THE INVENTION

If in the description the following terms are used: "the movable element" or "the closing element" or "the movable closing element", they are understood as a movable barrier/baffle or an element closing an inlet/outlet opening/hole (hatch) or a loading/unloading opening/hole (hatch), which (the element) moves from closed position into open position and vice versa. It is installed, for example, in a sliding way or in a pivotal way in inlet/outlet openings/holes (hatches) or loading/unloading openings/holes (hatches) which are made in the immovable elements, and the immovable elements together with the movable elements form a barrier between two rooms/spaces or environments, especially in means of transport, buildings, building premises/facilities or technical equipment/devices. As an example, "the movable element" can be: doors, manholes, hatches, gate valves, emergency exits, windows, window panes and others but the invention is not limited to those aforementioned. These terms can also cover and be understood the elements which are permanently fixed, i.e. without a possibility of their free movement but which close the inlet/outlet opening/hole (hatch) or a loading/unloading opening/hole (hatch)—these are, as an example, panes glued-in into a window opening in buses/coaches, rail-coaches/wagons, military vehicles and also in regular passenger cars and motor trucks/lorries.

On the other hand, "the immovable element" is an element of construction/structure in which the inlet/outlet opening/hole (hatch) or a loading/unloading opening/hole (hatch) is made, this being closed by "the movable element". An example of the movable element can be a car body, armour or external plating of a vehicle or another means of transport, supporting structure of a building or a building facility, such as wall or masonry/brickwork, and also a body/casing/housing of technical devices/equipment or machinery.

Figure 1:
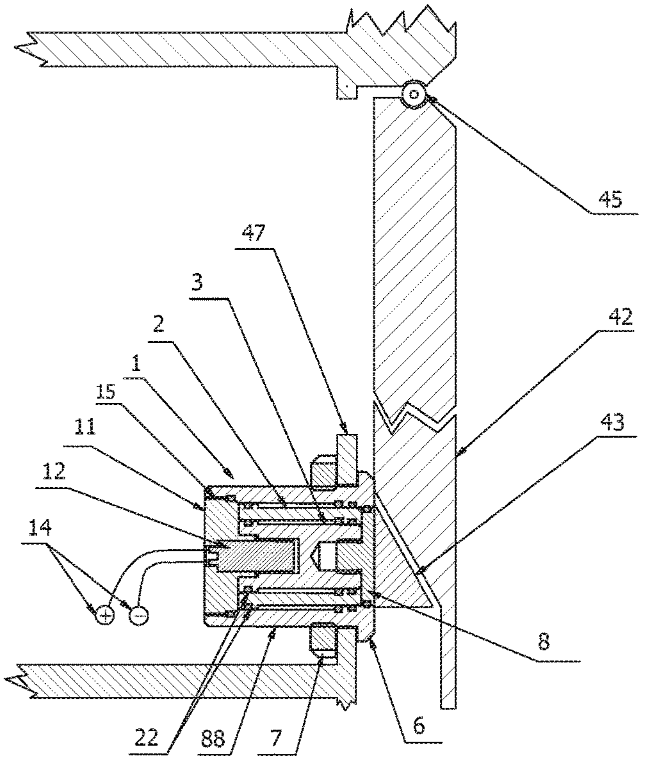
FIG. 1—shows the actuator (1) and the way of making and installation of the pyrotechnic telescopic actuator (1) in the hole/opening of the external plane of the immovable element (47).

In FIG. 1—the actuator (1) is presented and the way of making and installation of the pyrotechnic telescopic actuator (1) in the hole/opening of the external plane of the immovable element (47), especially of means of transport or technical equipment/device. a building, or a building facility/premises. The actuator (1) is situated opposite the movable element (42) fitted with a plate/cover (43) fitted on the opposite side of the hinges (45).

In this example of embodiment the actuator (1) is intended for emergency opening of movable elements (42), blocked or jammed, or locked by a lock or bolts such as a door, manhole, hatch, emergency exit or window.

The actuator (1) is installed in adequately strong/robust, thick external planes of the immovable element (47) of a means of transport, e.g. rail-coaches/wagons, underground/subway cars, motor trucks/lories, military vehicles, boats, submarines, helicopters, aircraft etc.

A through opening (a port) of appropriately selected diameter, proportional to the diameter of the actuator (1) installed, is made in the external plane of the immovable element (47) of a means of transport or a technical device/facility/equipment, or a building facility.

In order to enable the installation of actuators (1) in the external strong/robust planes of this immovable element (47), the panes being the fixing and resistance (support) point for the actuator (1) operating with great force, an adequate structure/design of the actuators (1) is necessary. For this purpose an external flange (6) was made and a thread on the body (88) of the actuator (1), which allows to screw down the actuator (1) with a nut (7).

Alternatively, the actuator (1) can be screwed into a threaded hole in the external plane of the immovable element (47) of a means of transport or a technical device/facility/equipment, or a building facility or a building.

The example provided does not exhaust other manners of installation of the actuator (1) in the immovable element (47). Such different ways of installation can be the use of Seeger ring (circlip) replacing the resistance (back) flange (6) and the nut (7), or the actuator (1) can be set on glue, soldered, welded-in or forced in the hole when the actuator (1) has a cone on its external surface (the surface is cone-shaped).

The actuator (1) is composed of an external threaded body/casing (88) having a resistance flange (6) which enables installation of the actuator (1) with a nut (7) in the immovable element (47). However, inside the body (88) the slid-out elements (2) and (3) of the actuator (1) are located, e.g. bushings (2) and a mandrel (3), featuring flanges with sealing (22) preventing complete sliding out of the slid-out elements (2) and (3) outside the actuator (1). The sliding-out elements (2) and (3) are closed with a hermetic pressure lid (8). However, opposite the actuator (1) a hermetic assembly head (11) is fitted, by a thread or in a different manner (e.g. squeezed, soldered, glued or secured with a Seeger ring);

it (the head) contains at least one gas generator (12) with electric cables (14) connected to it.

The actuator (1) is fed (driven) by at least one pyrotechnic generator (12) enabled/switched on by an electric impulse supplied by the electric cables (14). The base of the gas generator (12) is fitted in the assembly head (11) while the active part of the gas generator (12) is located inside the body (88) and specifically inside the sliding-out element (2) and (3) which enable maximal miniaturization of the actuator (1) design and achieving great energy the slid-out elements (2) and (3).

Such a design allowed to develop the miniaturized actuator (1), of 40 mm length, in folded condition and the stroke of the actuator of about 40 mm, which permits to use the actuator in some applications where—due to limited space—there is no possibility to use normal, i.e. quite long actuators at least 50 mm long, preserving appropriately small diameter and appropriately big stroke and power of the actuator.

In publications PL225323B1 and P.396300 the actuators are presented in which the pyrotechnic generators are entirely mounted in special heads and they do not enter the sliding-out elements of the actuators. However, in patent application P.416870 the manner of assembling is revealed of mounting the actuators in the internal surfaces of the external planes, e.g. door posts B and C in which the actuators are mounted, having resistance/thrust points on the internal surfaces of the door posts, as these internal surfaces of the door posts are made of strong/robust materials, such as steel boron plates which ensure retaining the activated actuators pressing with great energy (power) onto the movable element (e.g. a vehicle door) being opened.

Figure 1A:
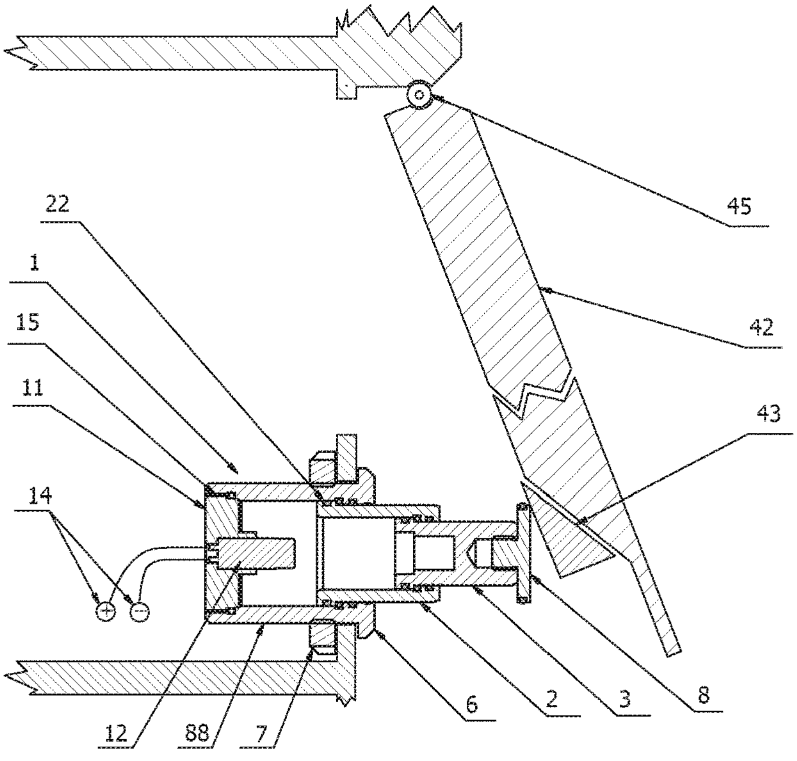
FIG. 1*a*—shows a slid-out actuator (1) after activation of the gas generator (12) and the movable element (42) moved/shifted to opened position (42).

FIG. 1*a*—shows a slid-out actuator (1) after activation of the gas generator (12) and the movable element (42) moved/shifted to opened position (42). The movable element (42), on its internal surface, has an additional compensating element (43), favourably in a form of a cover plate which compensates the plane of the movable element (42) to the right angle or almost right angle relative to the vector of force of the operating actuator (1)—this prevents the actuator (1) sliding off and breaking.

The remaining designations on FIG. 1*a* are the same as designations presented in FIG. 1.

In figures FIG. 1 and FIG. 1*a* no closing means (elements) (such as locks, bolts etc.) for the movable element (42) keeping the movable element (42) being opened in its closed position, in order to maintain the clarity of the drawings.

Figure 2:
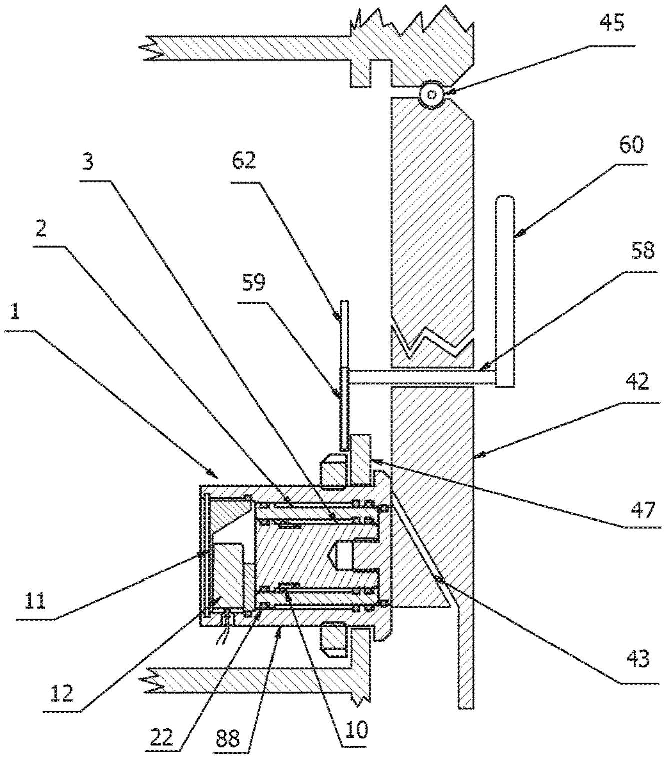
FIG. 2—shows an alternative embodiment of the actuator from FIG. 1 and FIG. 1*a* installed in the hole/opening of the external plane of the immovable element (47) and closed by the movable element (42) by means of the closing means and the actuator (1) has an assembly head (11) in which the gas generator (12) is fixed perpendicularly to the axis of the actuator (1).

In FIG. 2 an solution was presented alternative to the solution presented in FIG. 1 and FIG. 1*a*, consisting in miniaturization and shortening the length of the actuator (1) by using a special assembling head (11) in which the gas generator (12) was mounted perpendicular to the actuator (1) axis.

Such positioning of the gas generator (12), so-called "lying", allows to shorten the length of the actuator (1) substantially and to use it in some applications featuring a limited free space for installation.

The gas generator (12) is mounted in the head (11) in a way different than in solutions shown in FIG. 1 and FIG. 1*a*. Namely, the design of the head (11) was changed. In this solution the gas generator (12) is inserted on the side of the assembly head (11) and the internal part of the head (11) has a slant plane opposite the gas generator (12), which causes a rebound (routing/directing) of the shock wave originating at the moment of activation of the gas generator (12) and thus an increase of the shock wave, which results in higher power (energy) of the actuator (1) in operation.

In the sliding-out element (2) and (3) of the actuator (1), and more precisely in the mandrel (3) slid into the bushing (2), a springy cone-shaped ring (10) was located which enables locking the telescoping movement of the actuator (1).

The springy cone-shaped ring (10) can be mounted also on each sliding-out element (2) and (3) of the actuator (1). Favourably, the cone-shaped ring (10) is mounted in a recess in the outer surface of the sliding-out element (2) and (3) in such a way that after sliding out of the sliding-out elements (2) and (3) it is partially located within this recess (e.g. In the form of a perimeter groove) and partially it protrudes outside the contour of the outer surface.

While the sliding-out elements (2) and (3) are sliding out, the springy cone-shaped ring (10) is sliding in or telescoping (retreating) into the groove in which it is set and after passing beyond the sealing rings (22) set in the resistance flanges, the springy cone-shaped ring (10) is expanding. In the event the sliding-out elements (2) and (3) tend to get back or telescope, the wide base of the cone-shaped ring (10) is stopped by the resistance flange (6) of the external sliding-out element (2) and (3) and thus prevents telescoping of the entire or a part of the actuator (1).

Such a solution is advantageous in the applications where water pressure or the weight of the movable element (42) can cause telescoping or sliding off the slid out actuator (1) and return of the actuator (1) to collapsed/folded position and the return of the opened element (42) to the closed position.

Figure 2A:
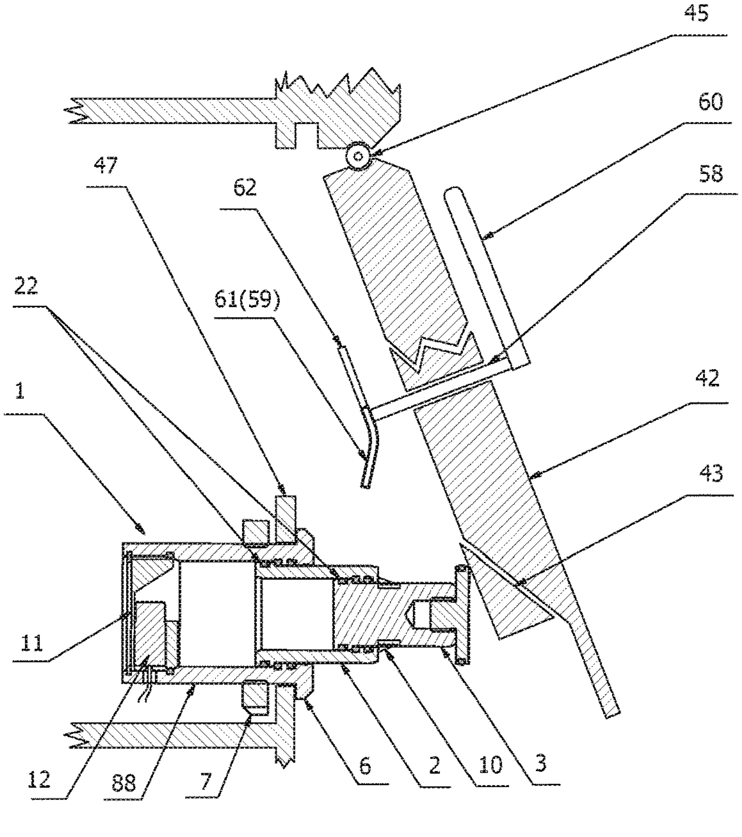
FIG. 2*a*—shows the slid-out actuator (1) from FIG. 2 after activation of the gas generator (12) and the movable element (42) moved/shifted to opened position (42) with bent closing means.

In FIG. 2 and FIG. 2*a* the closing means (elements) (58) are schematically presented, such as a lock or a bolt or a latch, mounted in the movable element (42). In other examples of embodiment no closing means (58) for closing the movable element (42) were presented in order to maintain the clarity of the drawings.

The closing means (58) intended to close the movable element (42) consist of an external arm (60) and an internal arm (59) and a spare/reserve arm (62) or can be a typical lock used commonly in the means of transport, in technical devices and in building facilities.

In FIG. 2 the movable element (42) is shown in closing position by means of the closing means (58), while FIG. 2*a* shows the movable element (42) in the opened position by moving the movable element (42) into the opened position without opening a lock or a bolt or moving the latch (58) into opened position after operation of the actuator (1), which causes bending of the arm (59) which—after bending—is designated as (61). The arms (59) and (62) feature weak points which facilitate their bending.

In some emergency situations there is a necessity of very quick opening, counted in milliseconds, of the movable element (42) to enable escape or depressurisation of compressed gases generated during explosions, e.g. of gas, in building facilities, on drilling platforms, in technical devices or in military vehicles after an explosion of ammunition (a missile, a mine), which can cause an extremely abrupt increase of pressure inside a means of transport or in a technical device or in a building facility.

In FIG. 2 and FIG. 2*a* an additional arm (62) is presented which permits re-closing of the opened movable element (42) after bending the arm (61)/(59) during sliding out of the actuator (1).

Figure 3:
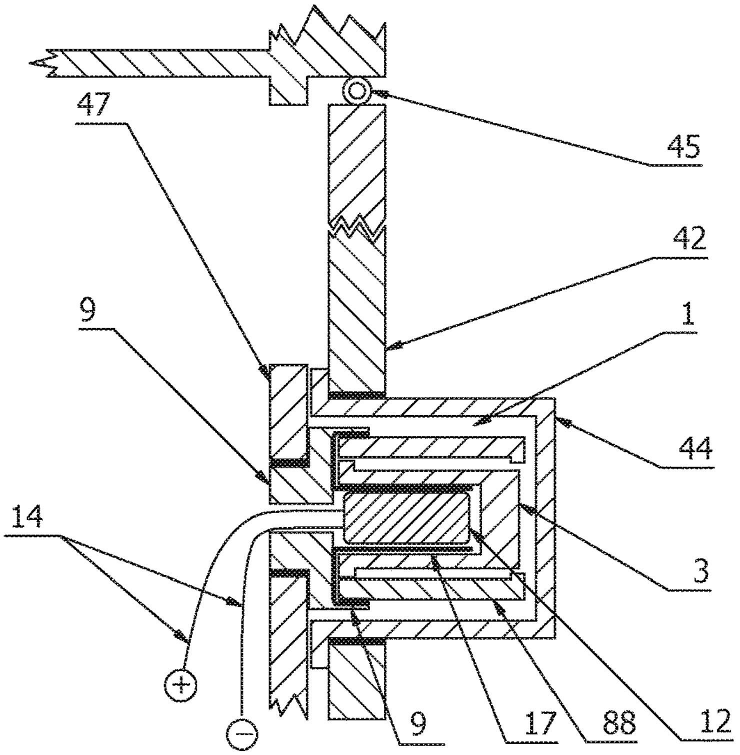
FIG. 3—shows the actuator (1) installed on the outer, strong surface of the immovable element (47).

FIG. 3 shows the actuator (1) installed on the outer, strong surface of the immovable element (47) which is a part of the structure of a means of transport (e.g. a military vehicle), of a technical device or a building facility.

In some applications, there is no possibility to place the whole actuator (1) in the external plane of the immovable element (47) or partially under this plane as there is not enough room, that is why the only possibility which remains is to mount the actuator (1) entirely or almost entirely on the external plane—(the armour) of means of transport, technical device, building facility.

To do so, a hole is made in the movable element (42), favourably in its end part on the side opposite to the hinges (45). A bushing (44) is mounted in this hole and the bushing at least partially covers or overlaps the actuator (1) when the movable element (42) is in closed position.

Figure 3A:
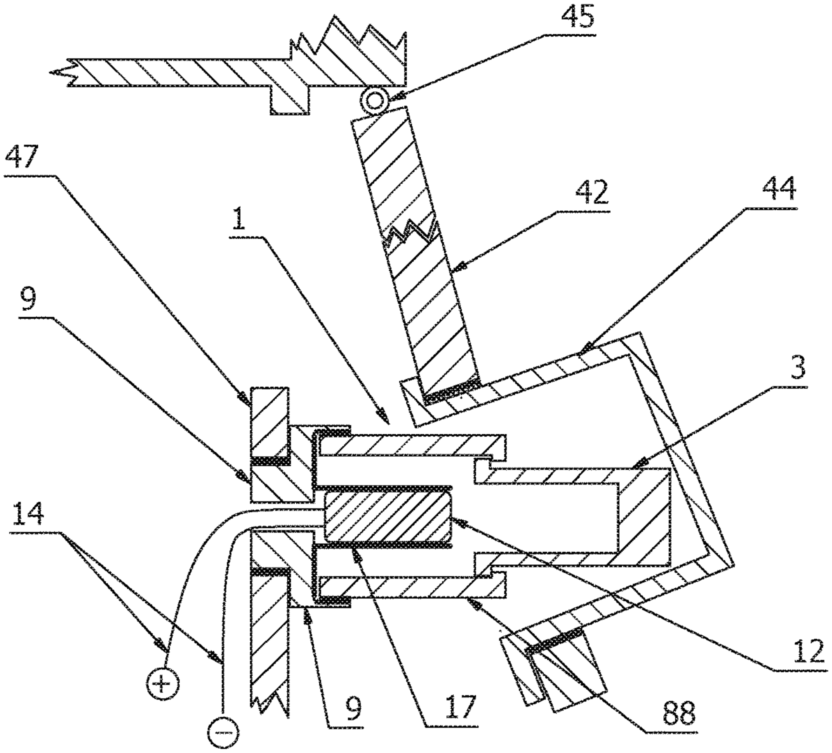
FIG. 3*a*—shows a view of the slid-out actuator from FIG. 3 with the movable element (42) in the opened position.

In FIG. 3 and FIG. 3*a* the pyrotechnic actuator (1) is located, featuring a fastening-and-closing element (9) in the form of an orifice which on one side closes the actuator (1), in this case its body (88) in which the gas generator (12) is placed. At the same time this element (9) fastens the actuator (1) to the immovable element (47) of a means of transport, a technical device or a building object/facility. The fastening-and-closing element (9) can be connected with the immovable element (47) and the actuator (1) by means of a thread or a springy ring or in a different manner, e.g. fusion-welded, glued, mechanically squeezed.

FIG. 3*a* presents the actuator (1) with protruded (slid-out) sliding-out element, and specifically with the mandrel (3) and the movable element (42) bowed/hinged to the opened position.

A special guard bushing (17), which fastens and stabilizes the gas generator (12), is used in the design of this actuator (1). The guard bushing (17) also prevents breaking the gas generator (12) apart to the sides.

The remaining designations presented in FIG. 3 and FIG. 3*a* are the same as designations presented in FIG. 1 and FIG. 1*a*.

Figure 4:
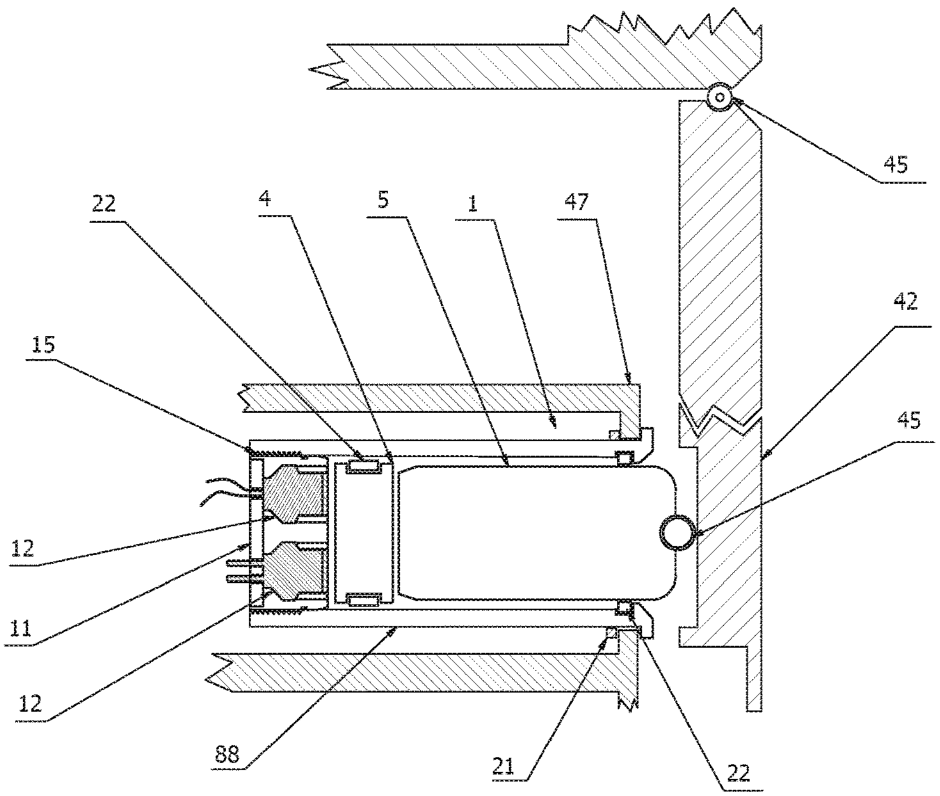
FIG. 4—shows the actuator (1) and the way of making and installation of the pyrotechnic piston actuator (1) in the hole/opening of the external plane of the immovable element (47).

In an alternative example of embodiment shown in FIG. 4 the telescopic actuator (1) was replaced by the piston actuator (1) in which, instead of telescopic/sliding-out elements (2) and (3) in the form a number of segments, one sliding element was used in the form of a piston (4).

The actuator (1) is made up of the body (88) and a piston (4) placed in it, sealed with the sealing rings (22) and driven by at least one gas generator (12) set in the assembly head (11) which closes the body (88) of the actuator (1).

The piston (4) moves inside the body (88) of the actuator (1) which is protected with an internal flange and a sealing ring (22), which prevents sliding out or falling out the piston (4) outside the actuator (1).

The piston (4) moves (pushes out) the mandrel (5) mounted on the movable element (42) which slides in/out into/out of the inside of the body (88) of the actuator (1), when the movable element shifts from opened position into closed position and vice versa. The other end of the mandrel (5) is connected by an articulated joint (45) with the movable element (42).

Such a design of the actuator (1) eliminates the problem of leakage of the seals of the telescopic sliding-out elements (2) and (3) and also eliminates the necessity of machining (turning) of precise sliding-out elements (2) and (3).

Figure 4A:
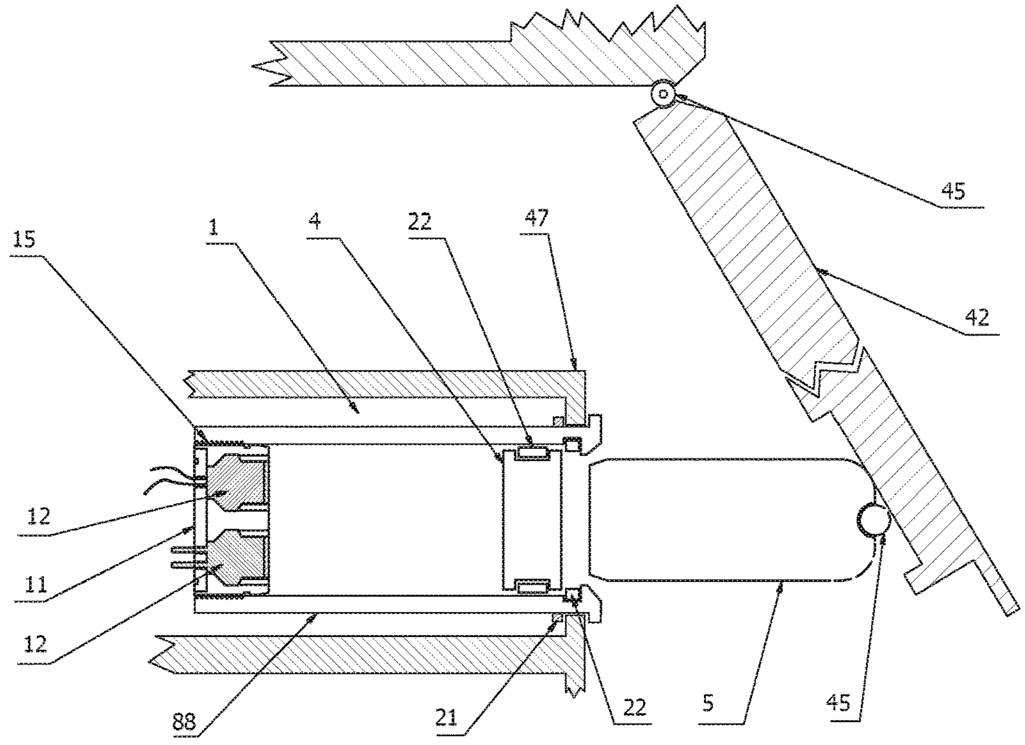
FIG. 4*a*—shows a view of the slid-out actuator from FIG. 4 with the movable element (42) in the opened position.

Presented in FIG. 4 and FIG. 4*a* the actuator (1) has a head (11) containing at least one gas generator (12) and favourably featuring a thread (15) on its external surface intended for installation in the body (88).

In turn FIG. 4*a* presents the actuator (1) after enabling/activation, when the explosion of the gas generator (12) causes the shift of the piston (4) to the position of maximum sliding out, as a result of which the piston (4) pushes out the mandrel (5) from the inside of the actuator (1) and at the same time shifts the movable element (42) to opened position.

The remaining designations presented in FIGS. 4 and 4*a* are the same as designations presented in FIG. 1 and FIG. 1*a*.

Figure 5:
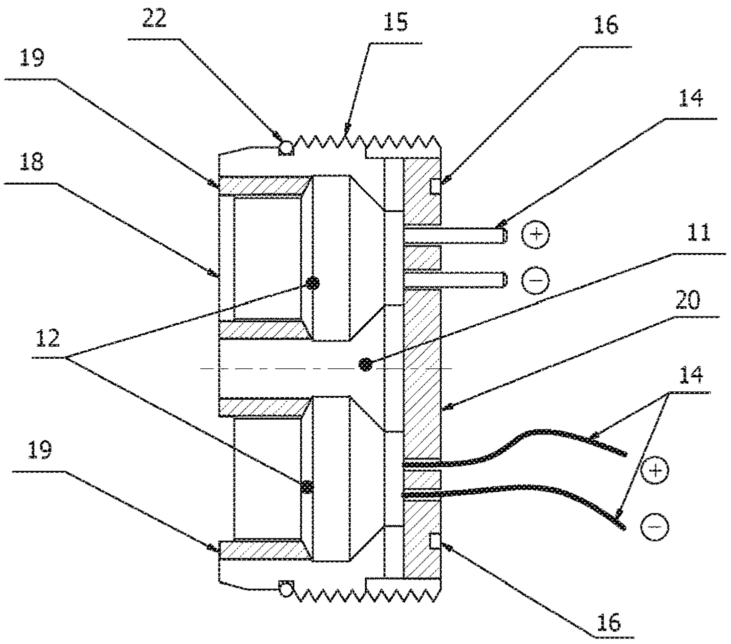
FIG. 5—depicts the head (11), at least two-step (multi-step) one or gas generator (12), at least two-step (multi-step) one, with at least two gas generators (12), with outer thread (15) for fastening, which mates the appropriate inner thread of the body (88) of the actuator (1).

FIG. 5 presents the head (11), at least two-step (multi-step) one, or the gas generator (12), at least two-step (multi-step) one, with at least two gas generators (12), and one gas generator (12) is equipped with electrical electrodes (14), while the other gas generator (12) is equipped with electrical cables (14).

The head (11), at least two-step one, or the gas generator (12), at least two-step one, favourably featuring the outer thread (15) for fastening, which mates the appropriate inner thread of the body (88) of the actuator (1).

Figure 5A:
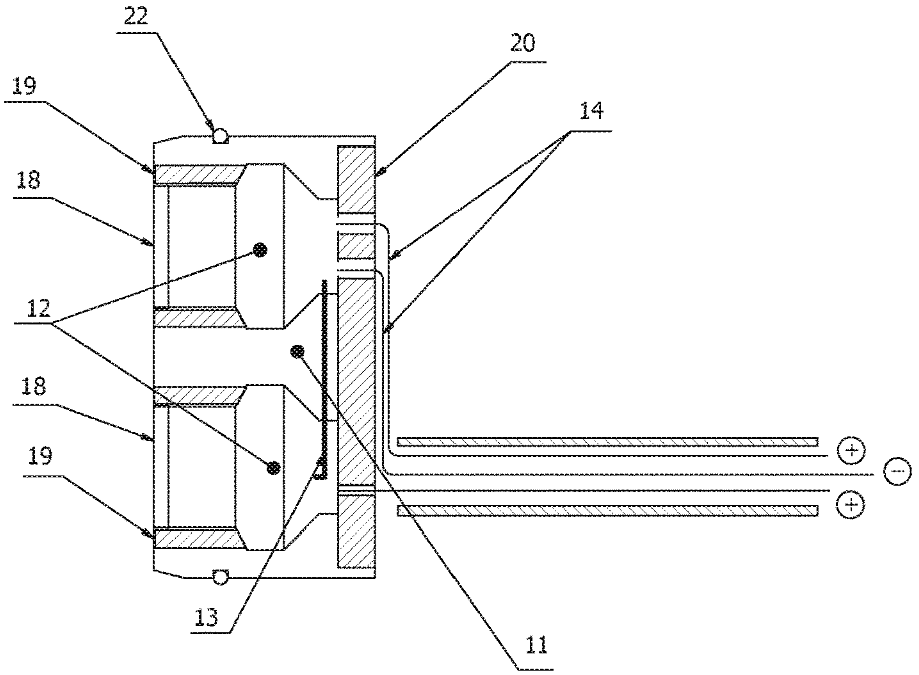
FIG. 5*a*-depicts the head from FIG. 5 without thread.

FIG. 5*a* shows the same head (11), at least two-step one, or the gas generator (12), at least two-step one, but without the fastening external thread (15), with two gas generators (12) installed or the two-step gas generator (12) equipped with the electrical cables (14) only.

As at least one gas generator (12), which is a source of energy, is used in the actuators (1) for emergency opening of the movable elements (42), it is necessary to mount the gas generator (12) or the gas generators in the actuator in a proper manner. For this purpose special heads (11) (e.g. turned/machined in metal) are made, and at least one gas generator (12) is fixed in them. However, the actuator (1) is enabled/activated in many stages, i.e. in several consecutive stages, e.g. In regular time intervals and that is why a number of gas generators (12) are set in the head (11), which complicates the assembly of such a head (11) and poses a potential hazard for individuals assembling the gas generators (12) in the head (11) and increases the risk of damage to the electric cables (14) or imprecise assembly and connection of several gas generators (12).

Commonly used wording regarding the drive/supply of the actuators (1) by the gas generators (12) is not entirely precise, as the supply/drive of the actuators (1) according to the invention is effected by the use—apart from the micro-gas generators (12) of the MGG type (Micro Gas Generators)— regular fuses (detonators)—in professional terminology also called initiators—(GTMS, Glass-to-Metal-Sealed-Squibs)—which are mainly intended for firing the proper substance (e.g. Green Propellant) producing gas in typical gas generators used to fill airbags and tensioning seatbelts. Such example gas generators were revealed in documents U.S. Pat. No. 6,364,354B1 and U.S. Pat. No. 6,053,531. Therefore the originators of the invention developed a favourable solution which eliminates these hazards and inconveniences, suggesting a design in which in the production line manufacturing gas generators (e.g. GTMS or MGG) at least one gas generator (12) is fixed or sealed in the special head (11) made of metal or robust/strong plastic.

The head (11), favourably a cylinder-shaped one, can have reinforcement (20) on the end of the electric cables (14) outlet, e.g. in the form of a plate made of composite materials or metal, which will ensure safe generation of very high pressures required to drive the actuators (1). Favourably, the reinforcement (20) has hollows or holes (16) enabling to screw in and screw out the head (11) having a thread (15).

It is also favourable to route electrical connections for the gas generators (12) inside the head (11), e.g. with a minus lead (13) inside the head (11), which will allow to lead only one minus cable out of the head (11), and one plus cable for each gas generator (12) installed in the head (11).

It is also favourable to use the electric cables (14) instead of electrodes designed for connecting electric plugs in all gas generators (12)

as they enable designing miniaturized actuators (1) which can be easily installed later in limited spaces of means of transport or technical devices or building facilities.

The head (11) containing at least one gas generator (12) or at least one-step gas generator (12) favourably has—on its external surface—sealing (22) and it favourably has a thread (15) which provides strong/robust, reliable and hermetic fixing in the actuator (1). This simplifies the design/structure of the actuator (1) as there is no necessity to use e.g. Seeger rings (21) which not always protect the head (11) against pulling out because of too much of energy of the shock wave generated during activation of the gas generators (12).

It is also advantageous/favourable to reinforce the side wall (shell) of the gas generator (12), for example with a bushing (19) made of robust/strong material and the use of guards (18) in the active part of the gas generator (12), e.g. strong/robust metal lids, which will prevent intrinsic/spontaneous activation of other gas generators (12) during activation of the first one and the following gas generators (12). Instead of guards (18) a thick layer of robust/strong plastic can also be used, sealed in the manufacturing process e.g. on injection moulding machines.

Figure 6:
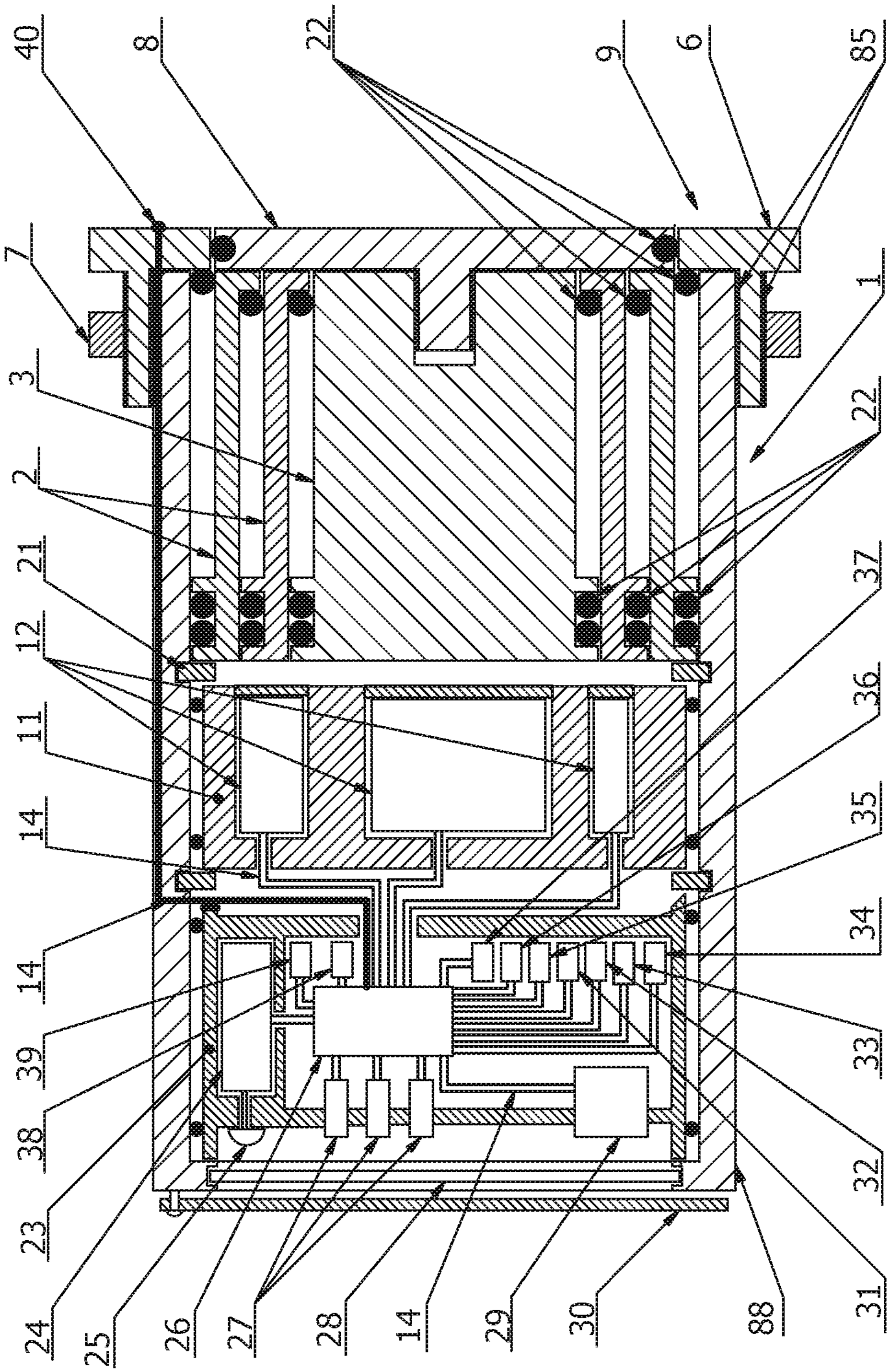
FIG. 6—depicts the actuator head (1) with the control electronic system (23) installed inside.

FIG. 6 shows a favourable version of the actuator (1) which features the same elements as a typical telescopic actuator (1) presented in FIG. 1, FIG. 1*a*, FIG. 2, FIG. 2*a*, FIG. 5, FIG. 5*a*, i.e. the body (88), the fixing orifice (9), the nut (7), the pressure lid (8), the sliding-out elements (2) and (3), the sealing ring (22), the head (11), the gas generator (12), the electric cables (14). The actuator (1) features an electronic system (23) controlling the start-up/activation and operation of the actuator (1), which (the system) is situated inside the actuator (1), favourably in the body (88).

Installation of the electronic control system (23) inside the actuator (1) will eliminate the necessity of using the electric cables (14) connecting the actuator (1) with an external electronic control centre, which increase the reliability of operation of the actuator (1), as there is no risk of damage to the electric cables (14) in emergency situations or during regular operation/use of means of transport, a technical device or a building facility.

Eliminating the external electric cables (14) decreases the risk of damage, destruction of the electronic control system (23) by an electro-magnetic pulse, thanks to the movable metal guard (30) of the electronic system (23) and the gas generators (12), which (the guard) protects against an electro-magnetic pulse.

The actuator (1) has a hermetic design and is made of metal-entirely nd owing to this fact the electronic control centre and the control system (23) and the pyrotechnic gas generators (12) are protected from an effect of an electromagnetic pulse, as they are placed in so-called Faraday cage. In other embodiment versions, located outside the actuator (1) the electronic control centres or control systems (23) and the gas generators (12) also feature protection against destructive effect of an electromagnetic pulse.

The electronic control system (23) can be enabled by hand, by entering an access code or by voice commands, or by gestures, or remotely, e.g. by a remote control unit after giving signals from the sensors mounted in the actuator (1).

The electronic system (23) controlling the initiation/start-up/enabling and operation of the actuator (1) comprises connected electrical elements such as a battery or an accumulator or a super-condenser (24) being the power supply of the electronic system (23) controlling the operation of the actuator (1), a diode or a display (25) signalling the charging level, a microprocessor (26) controlling the operation of the actuator (1), alpha-numerical push-buttons (27) or a touch-screen which permit to enter the code initiating the operation of the actuator (1), a guard (28) (e.g. made of glass) of the digital or alpha push-buttons which, in the event of necessity of activation of the actuator (1) will be broken or removed, a push-button (29) of emergency start-up of the actuator (1) without entering the access code (the push-button can be highlighted e.g. by colour pulsing light and stay enabled/active al the time or get enabled/activated after any abnormal parameters occur as sensed/recorded by the sensors mounted in the actuator or sending signals to the actuator), a metal removable guard (30) of the electronic systems (23) and the gas generators (12), protecting the actuator against an electro-magnetic pulse, an acceleration sensor (31), a shock sensor—an accelerometer plus position sensor—a gyroscope, a sound sensor (32), a smoke or fire or temperature sensor (33), a water sensor (34), a voice sensor (35)—speech analyser/recognizer, which enables giving voice commands/instructions to enable the actuator operation or its stop/disabling, gesture sensor (36) or scanner, finger/thumb or palm or face or eye scanner (37), a sensor (38)—a wireless communication module—enabling remote activation of the actuator (1) by the crew, and also remote or wired activation by special rescue units after analysing the access codes, an interior pressure sensor (39) for sensing pressure inside a means of transport, a technical device or a building facility, a path sensor (40) measuring the distance/angle of opening of the movable element (42) being opened.

The principle of operation of the actuator (1) is as follows. In a situation when it is necessary to use the actuator (1) open (move to the upper position) the movable metal guard (30) and then break or remove the glass or guard (28) guarding the push-buttons (27) and (29) and enter the access code or bring closer the electronic card which will enable/start-up the actuator (1).

Depending on the software programmed in the electronic control centre, first the first gas generator (12) of small power can be initiated and then the further gas generators (12) of high power.

The electronic sensors include also a path (distance) sensor (40) measuring the distance or the angle of opening of the movable element (42), ant this sensor activation will cause stop of activation of the consecutive gas generators (12) and thus stop sliding out of the actuator (1) when the movable element (42) gets to the opened position.

Figure 7:
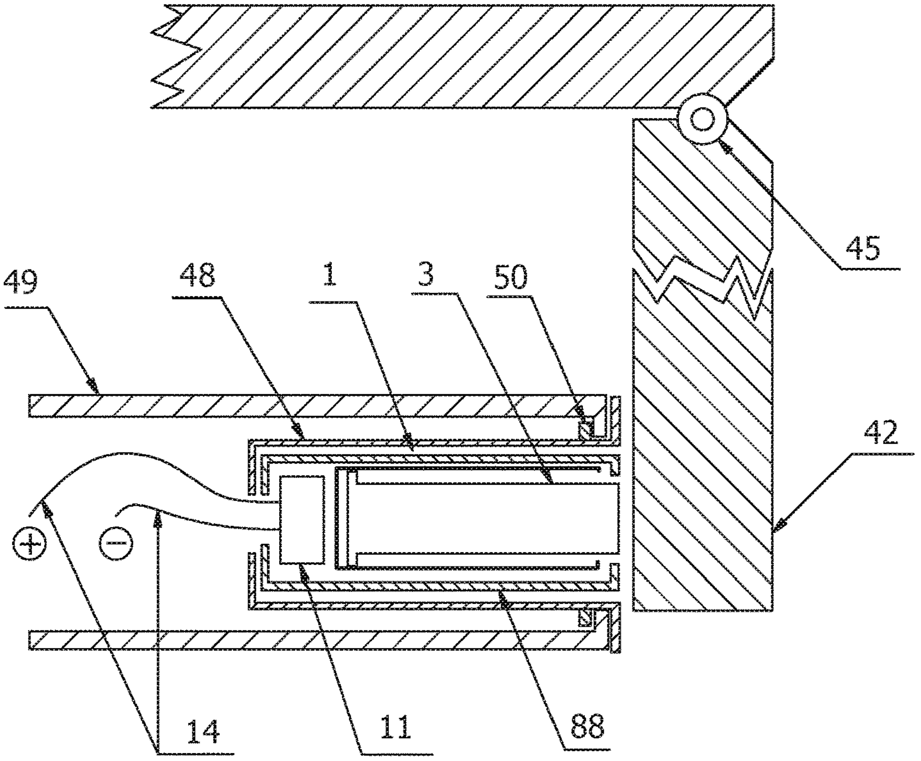
FIG. 7—shows the actuator (1) installed in the floor (49) of means of transport, a technical device or a building object/facility, especially in a robust/strong structure of a military vehicle.

FIG. 7 shows the actuator (1) installed in the floor (49) of means of transport, a technical device or a building object/facility.

The actuator (1) is made up of its external casing/body and a sliding-out element placed inside in the form of a mandrel (3) which is driven by at least one enabled gas generator (12) placed in the head (11). The actuator (1) is set inside the bushing (48) which is e.g. screwed down with a bolt/nut (50) or the ring (21), for instance Seeger ring, to the floor interior (49) of means of transport or a technical device or a building facility.

The actuator (1) is situated opposite the movable element (42) being opened, which is connected in an articulated (pivot) way by the hinge (45) with the structure a means of transport, a technical device or a building object/facility.

Figure 7A:
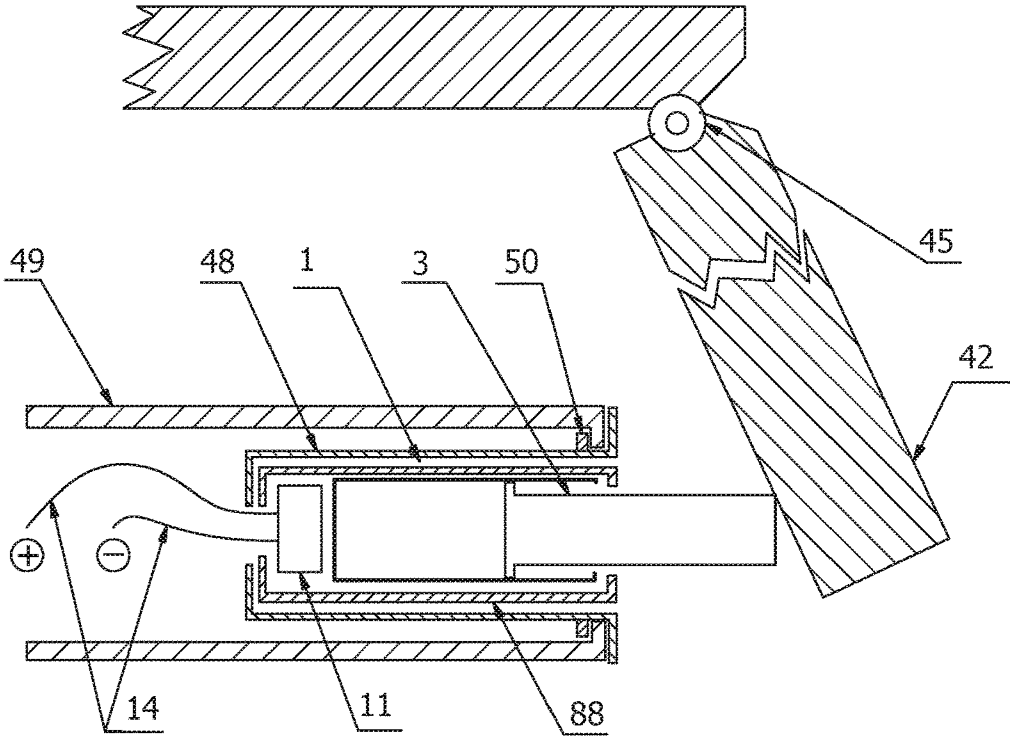
FIG. 7*a*—shows the actuator (1) from FIG. 7 after activation/effecting and sliding-out the mandrel (3) which moved the movable element (42) into the opened position.

The remaining designations presented in FIG. 7 and FIG. 7*a* are the same as designations presented in FIG. 1 and FIG. 1*a*.

FIG. 7*a* shows the actuator (1) after activation/effecting and sliding out the mandrel (3) which moved the movable element (42) into the opened position.

In some designs of means of transport or technical devices or building objects/facilities there is no possibility or mounting the actuators (1) in the light of openings of the movable elements (42) and therefore it is favourable to mount the actuators (1) in the floor or under the floor of a means of transport or a technical device or a building object/facility.

Figure 8:
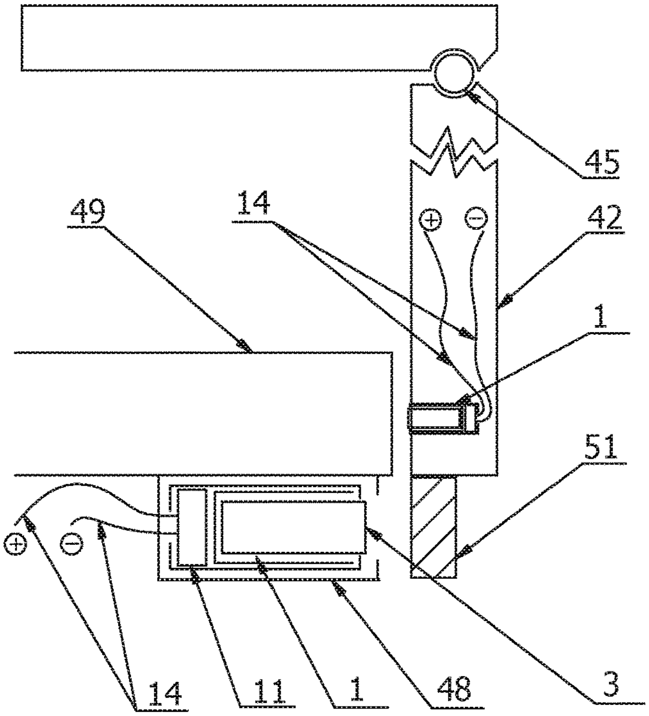
FIG. 8—shows the actuator (1) installed in a bushing (48) fixed/installed under the floor (49) of transport, a technical device or a building object/facility, especially of a military vehicle.

FIG. 8 shows the actuator (1) installed in a bushing (48) fixed/installed under the floor (49) of a means of transport or a technical device or a building object/facility.

FIG. 8 also presents another actuator (1) mounted inside the movable element (42) being opened, which is connected with the hinge (45) with the immovable structure. The actuator (1)) is placed at the height of the face of the floor (49).

An additional element (51) was added to the movable element (42)—e.g. welded or screwed down or made in the manufacturing process—in the form of an additional surface of the movable element (42) and the surface reaches out outside the light of the opening of the movable element (42) which can be e.g. a door, a manhole, a hatch. In numerous designs, especially in military applications, the movable element (42) is made in such a way that its surfaces covers the opening in a minimal extent only, therefore some extension of the surface of the movable element (42) is required. Due to the heavy weight of the movable elements (42) being opened, e.g. armoured doors/manholes/hatches, the manufacturers of means of transport maximally reduce their dimensions and weight.

In numerous means of transport, in technical devices and building facilities/objects there is no possibility of installation of the actuators (1) in the light of the movable element (42) due to minimal dimensions of the hole, which would make safe use of such a hole difficult.

In connection with it the only possibility is to mount the actuator (1) on the rims of the movable element (42) in the external planes of a means of transport or a technical device or a building object/facility, and this results in a necessity of adequately longer and/or wider structures (designs) of the movable elements (42).

A solution of this problem is to add an additional element (51) which extends the movable element (42) and plays a role of a press surface being pushed by the actuator (1) fixed outside the light of the movable element (42) or outside or under the gasket sealing the movable element (42).

Figure 8A:
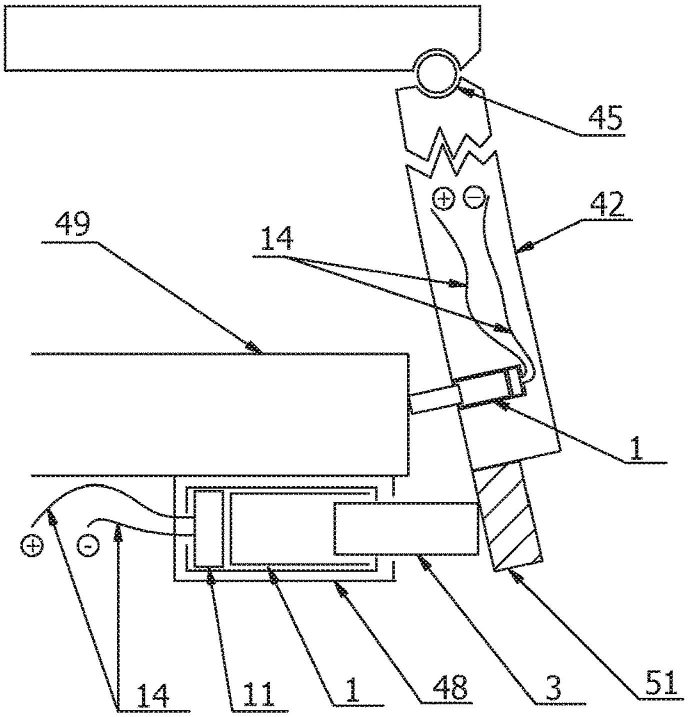
FIG. 8*a*—shows the actuator (1) from FIG. 8 after activation/effecting and sliding out the mandrel (3) which moved the movable element (42) into the opened position.

FIG. 8*a* depicts the actuator (1) placed under the floor (49) in the slid-out position and the movable element (42) hinged into the position of opening (42).

The remaining designations presented in FIG. 8 and FIG. 8*a* are the same as designations presented in FIG. 1 and FIG. 1*a*.

Figure 9:
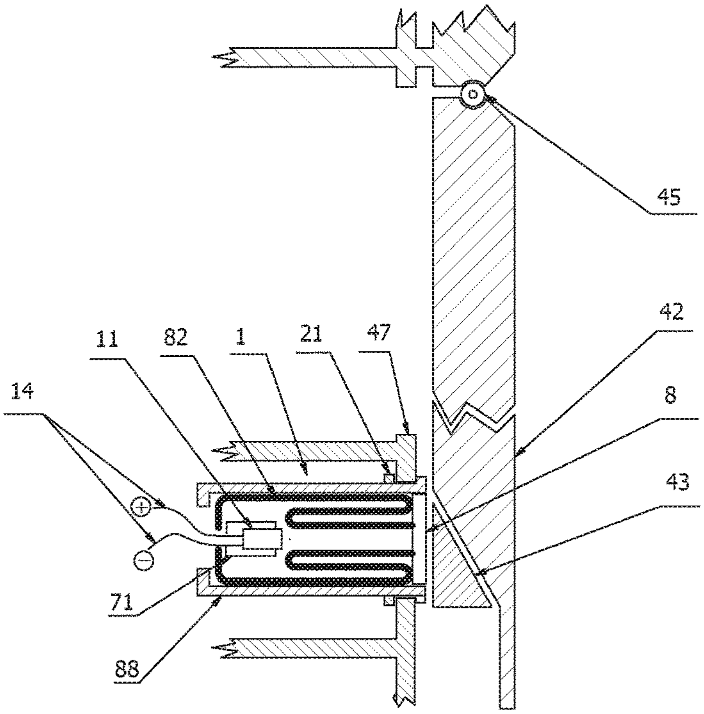
FIG. 9—shows an alternative version of the flexible actuator (1) installed in the structure of the immovable element (47).

FIG. 9 depicts another favourable embodiment of the flexible actuator (1) intended for emergency opening of the movable elements (42).

In the flexible actuator (1) presented in FIG. 9 the flexible material (82) was favourably used, which plays the role of the working element (a sliding-out one) and replaces the sliding-out elements (2) and (3) made mainly of metal, which additionally require the use of seals (22).

The flexible material (82) can be reinforced e.g. by glass fibre or carbon fibre and it is folded inside the body (88) of the actuator (1).

Inside the body (88) of the actuator (1) there is also placed at least one gas generator (12) and/or a compressed air cell opened by means of an electric (solenoid) valve or by means of a striker set in motion by the activated gas generator (12).

The actuator (1) can also be driven by compressed air pumped by a compressor.

The gas generator (12), at least one-step one, and/or the compressed air cell can be placed inside the flexible material (82) or connected with a hermetic conduit with the flexible material (82).

Figure 9A:
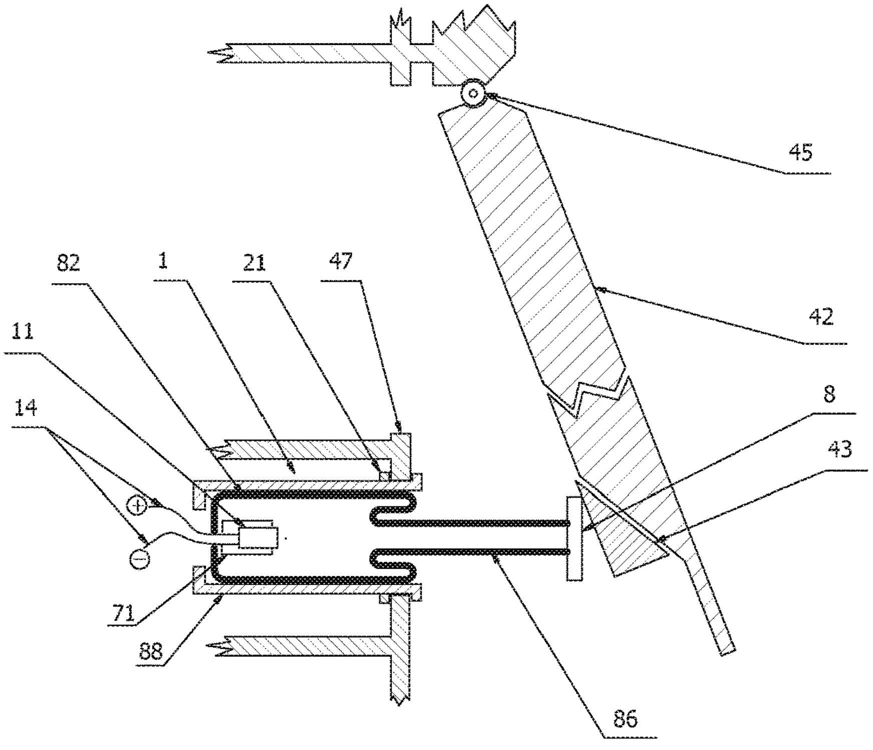
FIG. 9*a*—the view of the flexible actuator (1) from FIG. 9 after activation/effecting the flexible material (82, 86) which moved the movable element (42) into the opened position.

FIG. 9*a* depicts the flexible actuator (1) in the slid-out position and the movable element (42) shifted into the position of opening (42).

The remaining designations presented in FIG. 9 and FIG. 9*a* are the same as designations presented in FIG. 1 and FIG. 1*a*.

Figure 10:
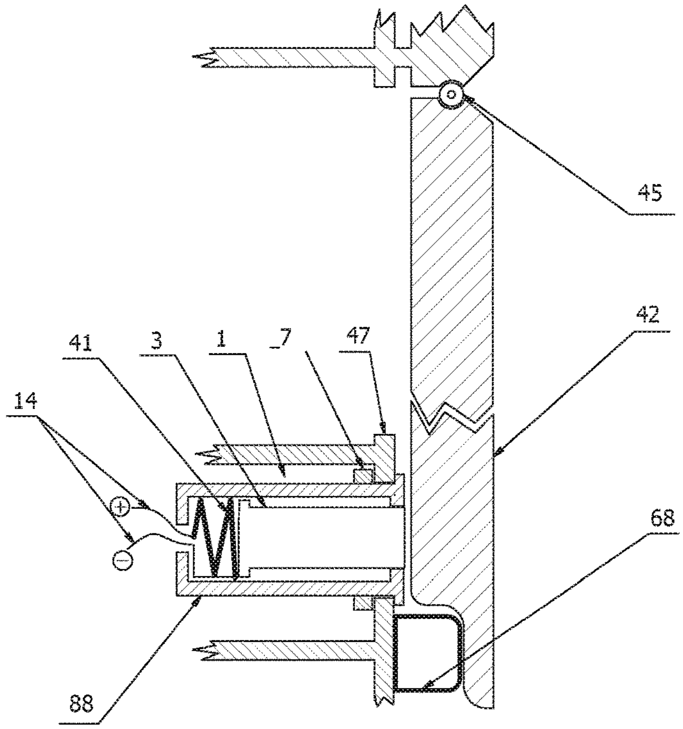
FIG. 10—shows a version of the actuator (1) equipped and fed/powered with material (41) with the memory of shape type SMA/SMP, which performs the function of drive of the working component (leader, movable-out) of the actuator (1).

FIG. 10 depicts another advantageous embodiment (version) of the actuator (1) equipped and fed/powered with material featuring the memory of shape of type SMA/SMP, which performs the function of drive of the working element (sliding-out) of the actuator (1).

The materials featuring shape memory of the SMA type (shape memory alloys) are a unique class of metal alloys which can change their shape after heating above some temperature. The change of shape consists in return of the material to its original shape, that is to that which was given in the manufacturing process or in the so-called pseudo-flexibility effect.

Whereas the SMP type materials (shape memory polymers) are so-called smart polymers.

The principle of operation consists in heating up the material (82) SMA/SMP, e.g. by electric current, which results in an increase of temperature of the material (82) SMA/SMP and its return to the shape pre-given in the manufacturing process. During the change of shape the material (82) SMA/SMP performs work, which in this case is used to drive the actuators (1) opening the movable elements (42).

In FIG. 10 the actuator (1) is shown of the same design consisting of the body (88) and sliding-out elements (22) and (3), driven by the smart material (41) of the SMA/SMP type, to whose opposite ends the electrical cables (14) are connected, supplying the voltage of the electric current during activation of the actuator (1).

FIG. 10 also depicts a pneumatic gasket (68, 69) bent by the closed movable element (42). The gasket (68, 69) can be a standard gasket used in the movable elements (42) such as doors, manholes or hatches, or can be a so-called flexible gasket driven by the pressure of gases. This type of flexible gasket (68, 69) or of the flexible actuator (1) in described in the following examples in 20, FIG. 20*a*, FIG. 21, FIG. 21*a*.

The use of smart materials of the SMA/SM type allows to use the actuators (1) many times and also use them in other applications.

Figure 10A:
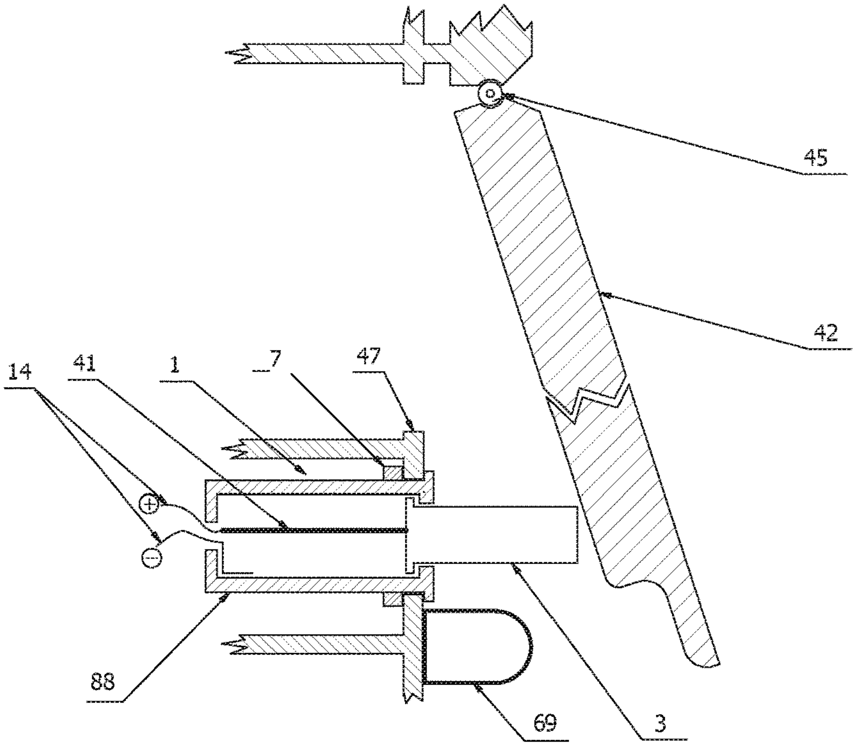
FIG. 10*a*—shows the actuator (1) from FIG. 10 after activation of the material (41) SMA/SMP and the leader (sliding-out element) (3) moved out, which moved the movable (sliding) component (42) into opened position.

FIG. 10*a* depicts the actuator (1) after activation of the material (41) of the SMA/SMP type i the slid-out sliding-out element (3) which shifted the movable element (42) into the position of opening.

Whereas the pneumatic gasket (69) is shown in the loose (depressurized) condition after opening of the movable element (42).

The remaining designations presented in FIG. 10 and FIG. 10*a* are the same as designations presented in FIG. 1 and FIG. 1*a* and FIG. 7. FIG. 7*a*.

Figure 11:
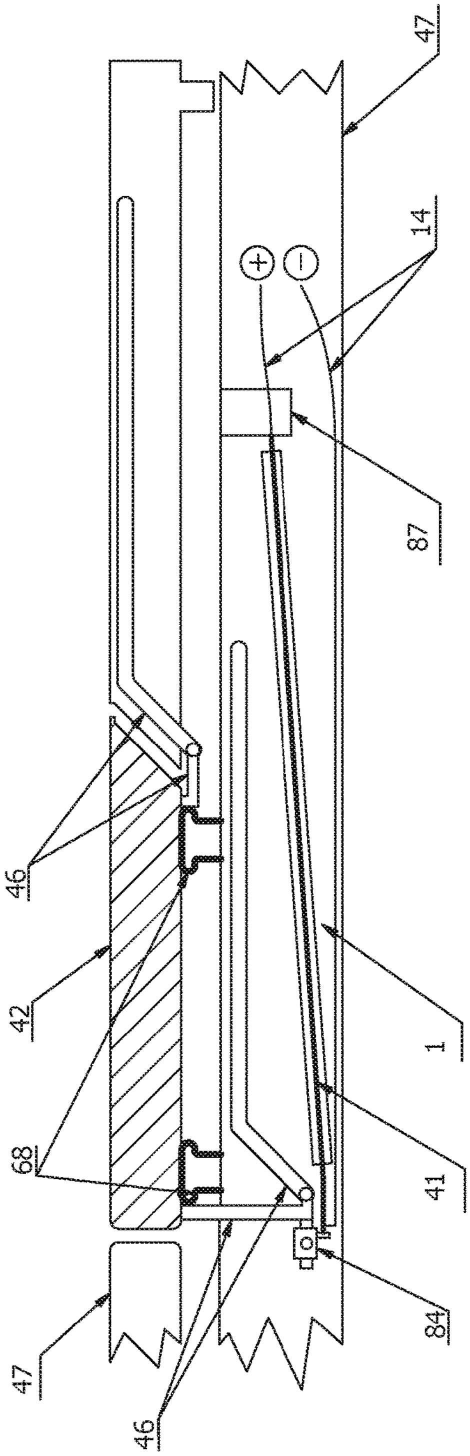
FIG. 11—shows the system of emergency opening consisting in the use of the actuator (1) driven the material (41) of the SMA/SMP type and the manner of opening a sliding door (42) of means of transport or a technical device or a building facility/object, using this actuator (1).

FIG. 11 shows another example of the actuator (1) driven by the material (41) of the SMA/SMP type, favourably mounted in the sliding door (42) of a means of transport or a technical device or a building object/facility. In this example of embodiment the actuator (1), in which the drive is the smart material (41) of the SMA/SMP type, is situated inside the body of the actuator (1) or favourably cased by a flexible thermal shield/guard. The electrical cables (14) are connected to the opposite ends of the SMA/SMP type material, which are insulated in the connections with the fastening element (87) on the immovable element (47) and with a fastening catch (84) fixed on or in the guide (46) of the movable element (42). The guides (48) and the catch (84) are a part of the sliding mechanism, which enables the sliding movement of the door (42). The actuator (1) of the SMA/SMP type is attached on one side to the grip (87) Inside the structure of a means of transport or a technical device or a building object/facility, and on the other side it is connected with the catch (84) of the sliding mechanism, which moves, e.g. by means of rolling bearings or along/over the guide (46). In the case the sliding door (42) feature an electric drive, the actuators (1) will favourably break the fastening of the electric drive or the electronic control system (23) will switch on the electric system of opening of the sliding door, which can enhance the process of opening of the sliding door (42).

FIG. 11, FIG. 11*a*, FIG. 11*b* and FIG. 11*c* shows the guides (46) for the movable element (42) movable (42), i.e. sliding door and gasket (68), (69) sealing the movable element (42), the gasket being fitted on the rim of the hole and/or on the movable element (42).

Figure 11A:
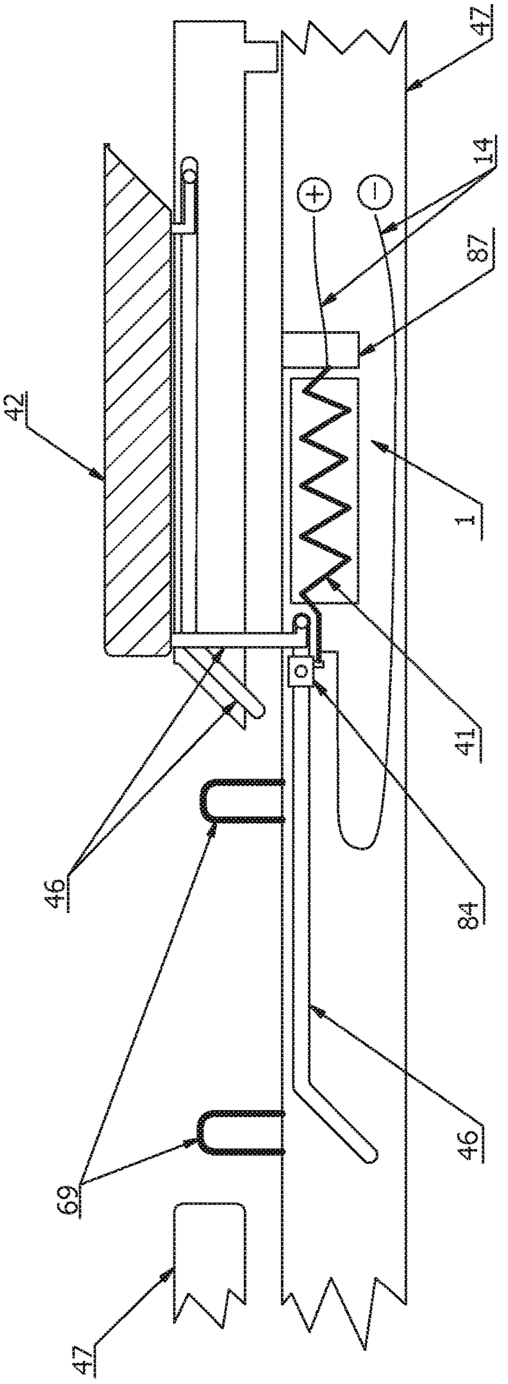
FIG. 11*a*—shows a view of the actuator (1) type SMA/SMP from FIG. 11, which has been activated and did the work moving the sliding door (42) into opened position.

FIG. 11 shows the gasket (68) bent and pressed down by the closed movable element (42) and FIG. 11*a* shows the gasket (69) in loose (depressurised) condition when the movable element (42) is open.

In an emergency situation, when there is a necessity of emergency opening of the movable element (42)—the sliding door—the electronic control system (23) supplies the voltage of electric current via the cables (14), first to the actuator (1) opening the lock or the bolts (63), and then to the actuator (1) which, after receiving the electric current voltage heats up the smart material (41) of the SMA/SMP type, which results in a change of shape of the material (41)

of the SMA/SMP type and thus the same execution of work by the material (41) of the SMA/SMP type. The material (41) (41) of the SMA/SMP type moves the sliding mechanism into the guide (48) and thus it shifts and opens the movable element (42)—the sliding door—into the open position.

In all the examples of the embodiment (except the example of embodiment in FIG. 2, FIG. 2*a*) opening the lock or the bolt (63) first is stipulated (nor shown in FIG. 11), which sets the movable element (42) motionless/locked—supply of a pulse to the actuator (1) opening the lock or bolt (63), and then opening—supply a pulse of electric current to the actuator (1) or to the actuators opening/pushing out/shifting the movable element (42). However, due to the fact that this process was described in the previous patent applications, it was not shown in this case in order to maintain the clarity of the drawings.

FIG. 11*a* shows the SMA/SMP actuator (1) installed at the sliding door (42) of a means of transport a building or a technical device or a building object facility, which (the actuator) has been activated and did the work moving the sliding door (42) into opened position.

Figure 11B:
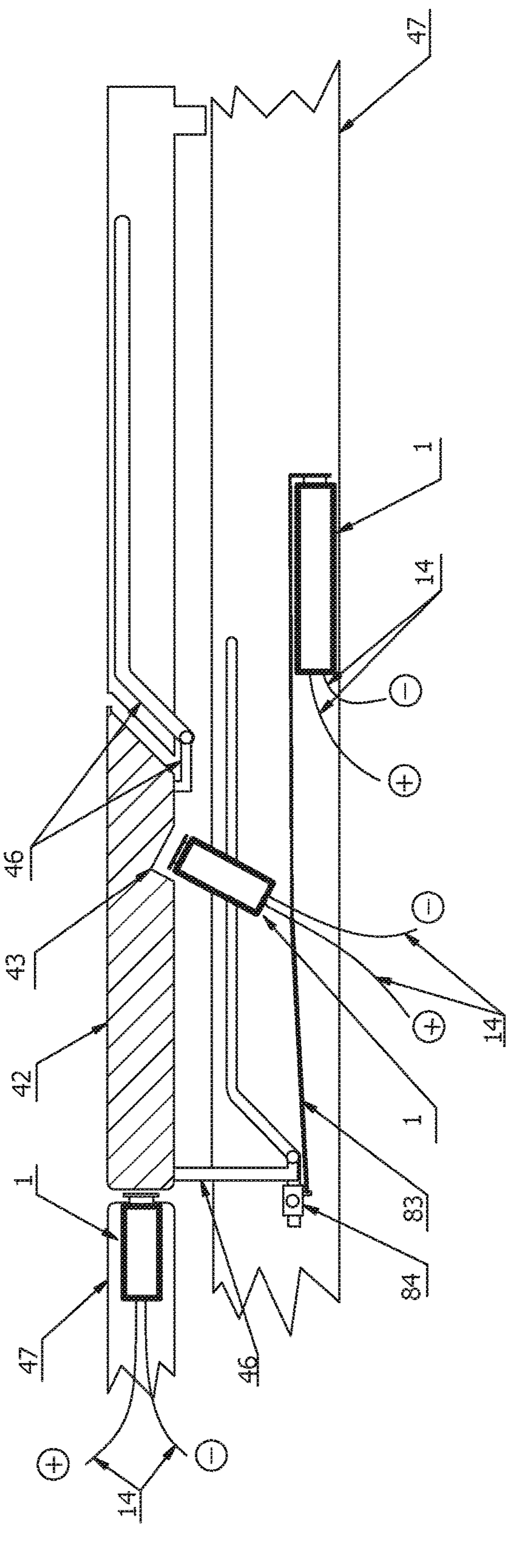
FIG. 11*b*—shows the system and manner of opening of a movable component (42), which is the sliding door, with the use of numerous pyrotechnic actuators (1).

FIG. 11*b* depicts the favourable way of opening/pushing out/shifting the movable element (42)—in this example the sliding door—with the use of the pyrotechnic actuators (1).

The remaining designations presented in FIG. 11, FIG. 11*a* are the same as the designations presented in FIG. 1 and FIG. 1*a* and FIG. 7. FIG. 7*a*, FIG. 10.

In FIG. 1, FIG. 1*a*, FIG. 2, FIG. 2*a*, FIG. 3, FIG. 3*a*, FIG. 9, FIG. 9*a*, FIG. 10 and FIG. 10*a*, the methods of opening of the movable element (42) are depicted—i.e. the revolving leaf door with the use of the actuators (1).

Figure 11C:
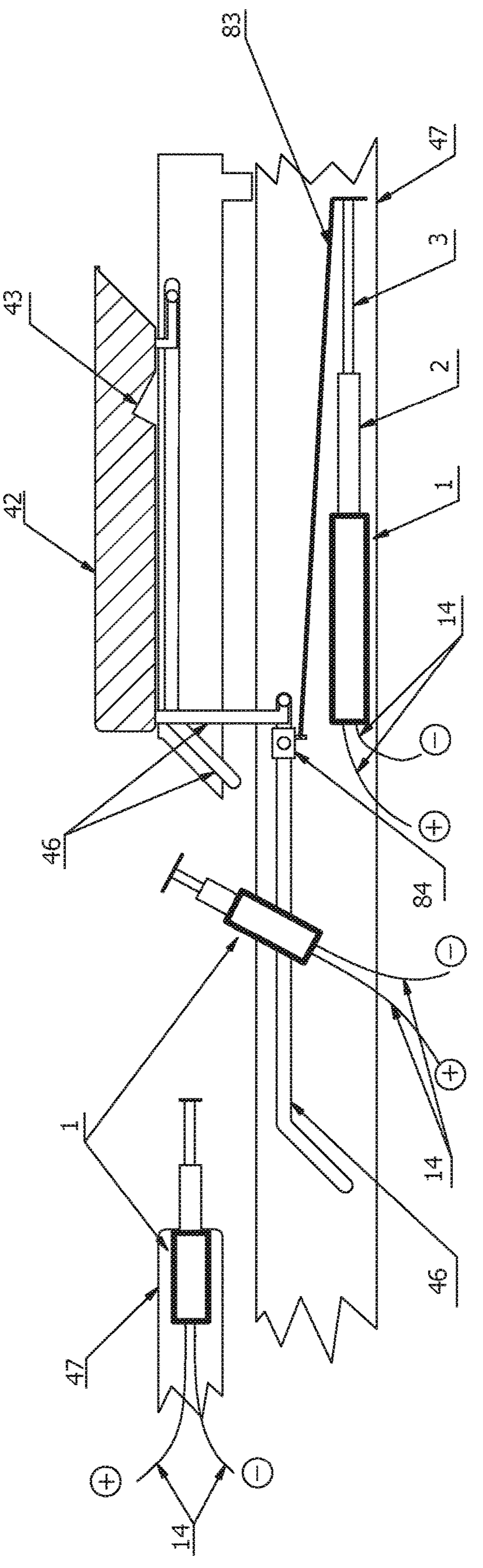
FIG. 11*c*—shows a view from FIG. 11*b* with opened movable door (42) by activated actuators (1).

FIG. 11*b* and FIG. 11*c* depict the movable element (42)—the sliding door—and the way of installation and operation of the actuators (1) was shown—in this example of embodiment these are the pyrotechnic actuators (1).

For opening of a movable element (42), which is the sliding door, one can use at least one pyrotechnic actuator (1), whereas FIG. 11*b* and FIG. 11*c*, depicts favourably three actuators (1) intended for emergency opening of the movable element (42).

The actuators (1) are fitted from the face of the door in the immovable element (47) in the external surface of a means of transport or a technical device or a building object/facility, and on the internal side of the movable element (42), and the third actuator is located in parallel or almost in parallel to the wider side plane of the movable element (42).

The first actuator (1) and the second actuator (1) press directly onto the movable element (42) to be opened, whereas the third actuator (1) is connected e.g. via a tension member (string) (83) with a sliding catch (84), which—during the activation of the actuator (1) and sliding out of one of its sliding segments (2) and (3) (41) moves and at the same time it shifts the sliding mechanism in the guide (46) and thus it shifts the movable element (42) into the open position.

The principle of operation is as follows:

Upon an emergency situation occurrence, the electronic control system (23) sends, via the cables (42), an electric pulse to activate the actuator (1) opening the lock or bolts (not shown in the drawings as it is described in the previous patent applications referred to in the status of the technology (the prior art)), and then to the actuator (1) situated on the internal side of the movable element (42), which—after activation—presses onto the internal surface, favourably pressing a shaped (profiled) surface (43) in the movable element (42), after which the electronic control system (23) sends electric pulses, via the cables (14) to the actuator (1) situated at the face of the movable element (42), and to the actuator (1) linked with the tension member (string) (83).

The remaining designations presented in FIG. 11*b* are the same as designations presented in FIG. 1 and FIG. 1*a* and FIG. 7. FIG. 7*a*, FIG. 10

FIG. 11*c* depicts the open (shifted or pushed out) movable element (42) by the activated (slid out) actuators (1).

The remaining designations presented in FIG. 11*c* are the same as the designations presented in FIG. 1 and FIG. 1*a* and FIG. 7. FIG. 7*a*, FIG. 10

Figure 12:
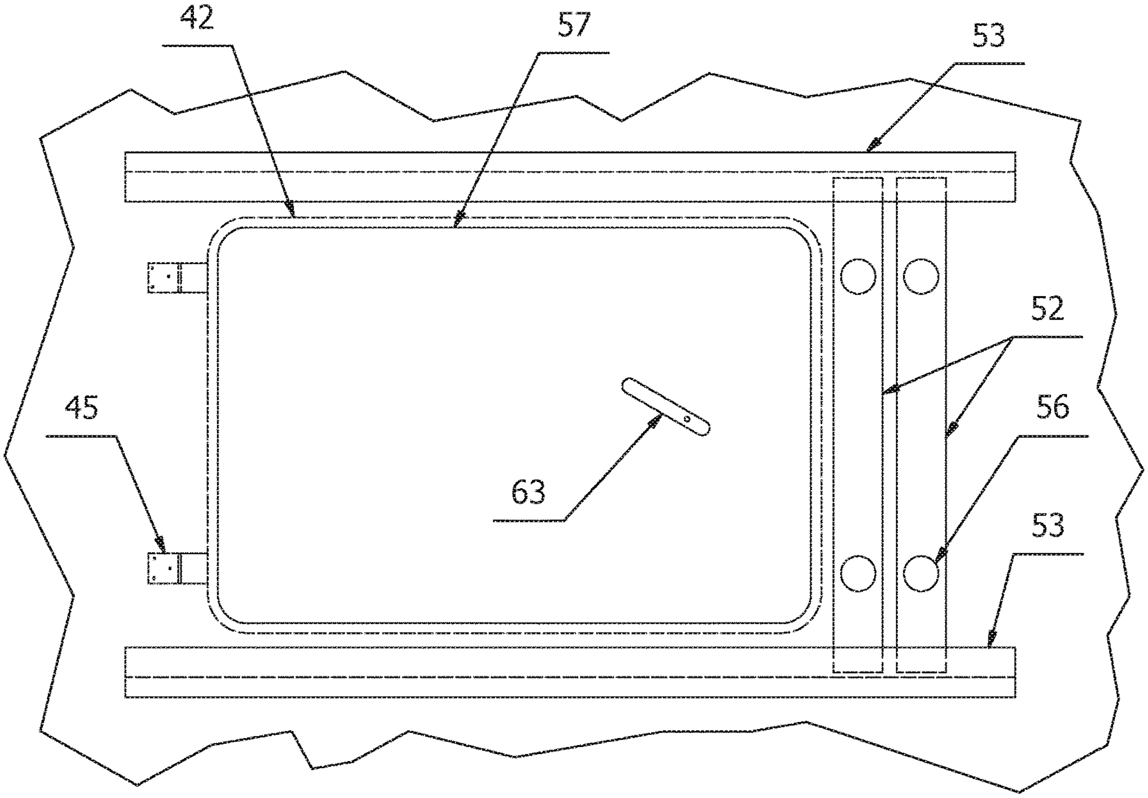
FIG. 12—shows the method of assembling the actuators (1) in a means of transport, in a technical device or in a building facility, especially in military vehicles, with the use of additional slinging shapes (52, 53) with holes (56) provided for the actuators (1)

FIG. 12 depicts another advantageous way of installation of the actuator (1) in a means of transport, a technical device or in a building facility/object.

In this example of embodiment movable vertical (52) and horizontal (53) shapes are shown in which the vertical (52) shapes are shifted.

In vertical shapes (52) the actuators (1) are mounted, e.g. In pre-drilled holes (56), which—after sliding the shape (52) onto the movable element (42) to be opened or onto the immovable element (47), e.g. a window with a bullet-proof pane during activation of the actuator, sliding out the sliding-out segments (2) and (3)—open the movable element (42) to be opened.

Such advantageous solution permits the use of the actuators (1) intended for emergency opening of the movable elements (42) and of the immovable element (47), as in some designs of means of transport or technical devices or building objects/facilities there is no possibility or mounting the actuators (1) in the external plating/sheathing of the immovable elements (47), of the structure or in the light of opening of the movable element (42) or the immovable element.

It is advantageous to use this solution in the form of shapes (52), (53) as this eliminates the necessity of making holes in external surfaces or planes of means of transport, technical devices or building facilities/objects.

The principle of operation is as follows.

Upon an emergency situation occurrence, a crew or the electronic control system (23) of a means of transport or a technical device or a building object/facility can shift the vertical shapes (52) to the centre of the rim of the hole (57) of the movable element (42) or this can be effected manually or automatically, e.g. by the use of an electric motor, into a position opposite the movable element (42) to be opened and to initiate manually the operation of the emergency opening system or this can be done automatically initiated by the electronic control system (23).

The electronic control system (23) first opens the locks or bolts (63) closing the movable element (42), and then initiates opening of the movable element (42)). In special situations the electronic control system (23) effects opening of the movable element (42) without initiating the procedure of opening the locks or bolts. It is of special importance when there is a danger/hazard or there was an explosion of gas or other explosives and the purpose is to enable to make holes to let the compressed gases get out.

The remaining designations presented in FIG. 12 are the same as the designations presented in FIG. 1 and FIG. 1*a* and FIG. 7. FIG. 7*a*, FIG. 10

Figure 12A:
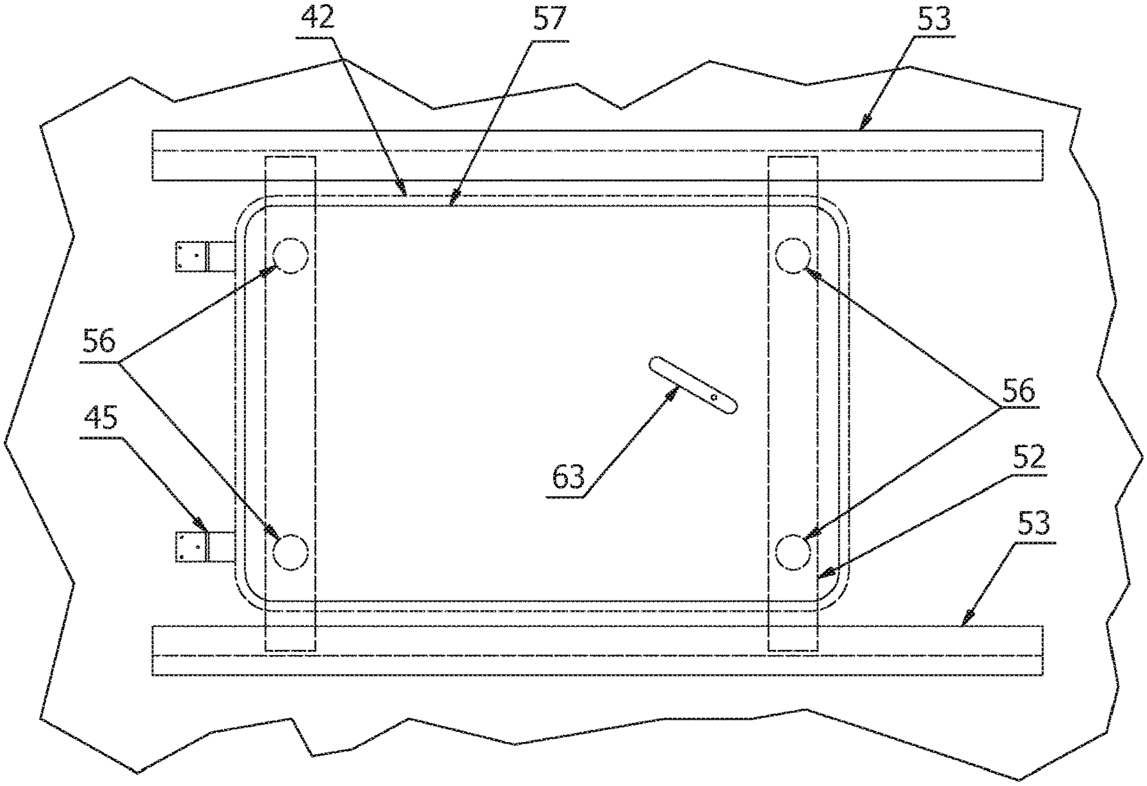
FIG. 12*a*-presents sliding vertical shapes (52) shifted to the middle of the rim of the hole (57) of the movable element (42).

FIG. 12*a* depicts the movable sliding vertical shapes (52) designed to fix the actuators (1), shifted to the middle of the rim of the hole (57) of the movable element (42).

The remaining designations presented in FIG. 12 are the same as the designations presented in FIG. 1, FIG. 1*a*, FIG. 7, FIG. 7*a*, FIG. 10.

Figure 13:
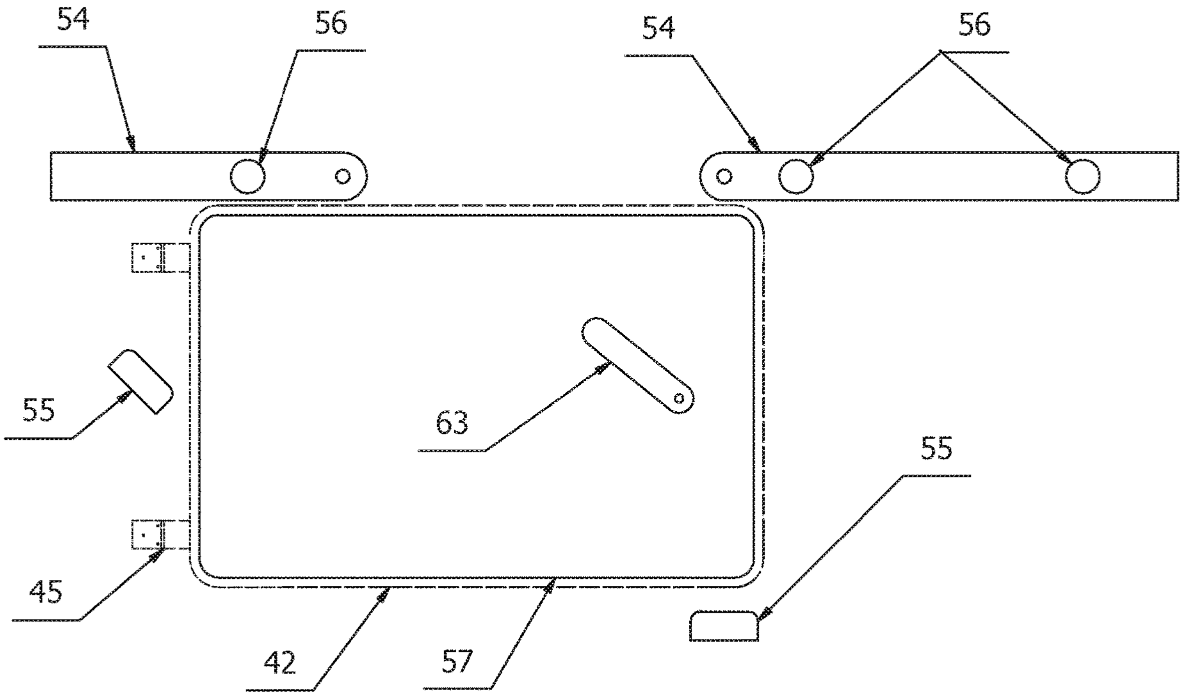
FIG. 13—depicts the method of assembling the actuators (1) in a means of transport, in a technical device or in a building facility, especially in military vehicles, with the use of additional rotating shapes (54) with holes (56) provided for the actuators (1).

FIG. 13 depicts an advantageous way of embodiment (making) and fastening the movable rotatable shapes (54) intended for emergency opening of the movable element (42) or of the immovable element—bullet-proof panes.

In this example of embodiment there are no guiding shapes/rails (52) and (53). Movable shapes (54) have a pivot fastening point at one of the ends and a stop/resistance point (55) situated below the upper rim (57) of the hole.

The holes (56) are made in the rotatable shape (54) and they enable to fast the actuator (1) which is used for emergency opening of the element (42).

Figure 13A:
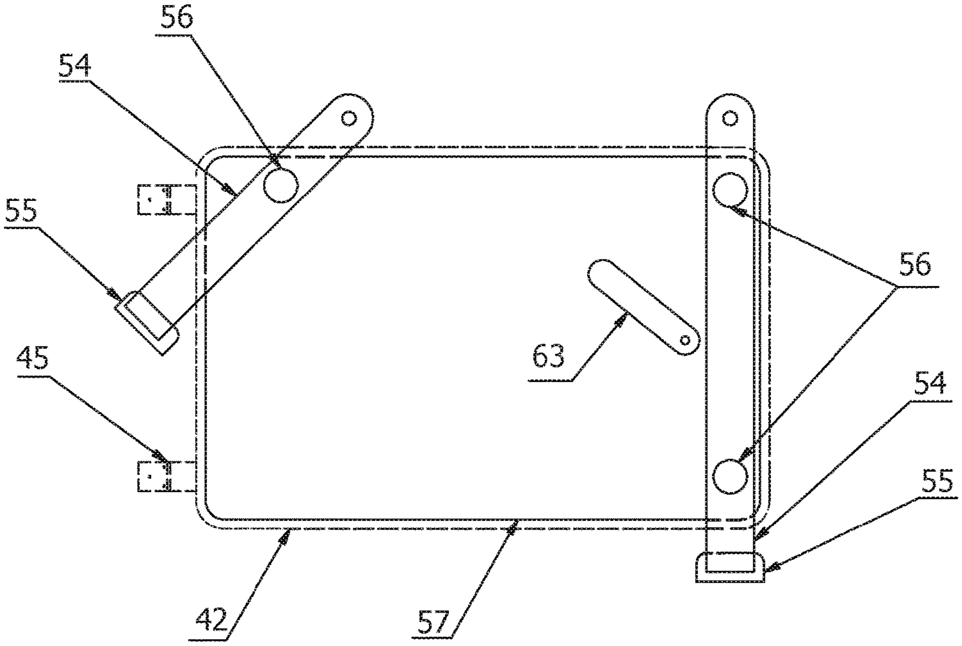
FIG. 13*a*-depicts the rotating shapes (54) shifted to the middle of the movable element (42) or the immovable element (47).

A crew or passengers of a means of transport or the inhabitants of a building facility can move the rotatable movable shape (54) into vertical position or almost vertical position shown in FIG. 13*a*. Another possibility is automatic moving the shapes (54), e.g. by means of an electric motor (not shown in FIG. 13), upon an emergency situation occurrence, where the electronic control system (23) will initiate the procedure of moving and operation of the actuators (1) opening the movable element (42), e.g. bullet-proof panes.

The remaining designations presented in FIG. 13 are the same as the designations presented in FIG. 1, FIG. 1*a*, FIG. 7, FIG. 7*a*, FIG. 10.

FIG. 13 depicts the movable rotatable shapes (54) intended for emergency opening of the movable element (42) or of the immovable element (42), e.g. bullet-proof panes, shifted to the centre of the movable element (42) or of the immovable element (47).

The remaining designations presented in FIG. 13*a* are the same as the designations presented in FIG. 1, FIG. 1*a*, FIG. 7, FIG. 7*a*, FIG. 10

Figure 14:
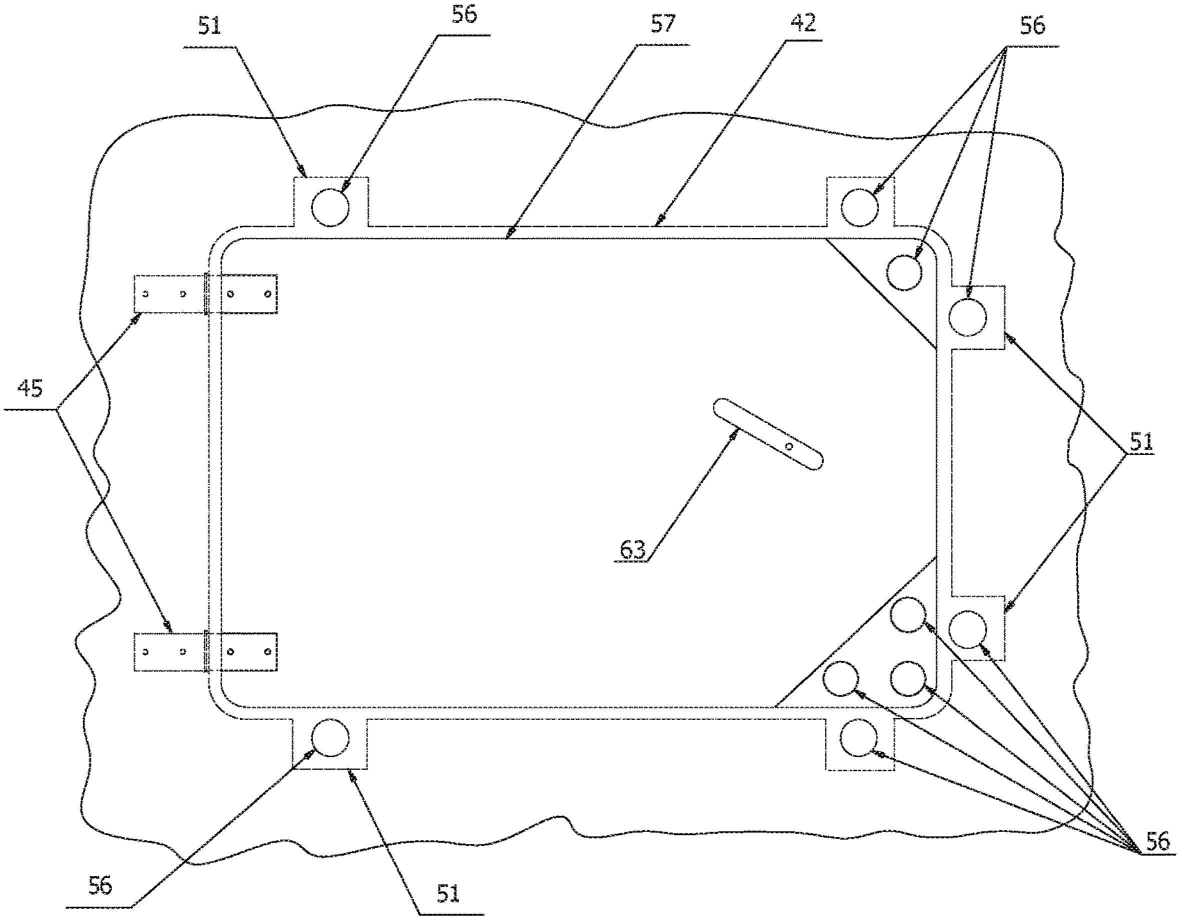
FIG. 14—shows the method of assembling the actuators (1) with the use of additional reinforced shapes (51), which increase the area of the movable element (42).

FIG. 14 depicts the advantageous ways and places of installation of the actuators (1) in the external planes of the movable element (42) being a part of the structure of a means of transport, a technical device and a building facility/object.

An advantageous solution is to fasten the actuator (1) inside the entry/exit opening (hole) (57) closed by the movable element (42) in such a way that it does not hinder the normal operation/use, including entering and exit as well as loading and unloading of a means of transport, a technical device or a building facility/object An advantageous place to locate the actuators (1) are the arches of the rim delineating the entry/exit hole (hatch) or the loading/unloading hole (hatch) (57) on the side of a lock/bolts. For this purpose, in these arches of the hole (57) an additional reinforced shape (51) should be inserted, which is reinforced and fastened permanently, e.g. thick metal plate. The holes (56) for installation of the actuators (1) are made in this reinforced shape (51).

However, not in all applications it is possible to fasten the actuators (1) inside the rim of the hole (57) due to minimized dimensions of the hole (57) in various types of means of transport, technical devices or building facilities/objects, since the actuators (1) installed in these places would hinder safe entering and exit or loading and unloading goods.

Therefore if the hole (57) is too small or too narrow, the actuators (1) are installed outside the rim of the hole (57) and advantageously outside the gasket (69).

In some types of means of transport and technical devices, and also in building facilities/objects the movable elements (42) of minimal dimensions are used, e.g. in order to reduce the weight of these elements, and this refers specifically to the armoured or armour military means of transport.

The reinforced shapes (51) increase the surface of the movable element (42) but on the other hand they do not result in a substantial increase of its weight and can be added in the process of designing and manufacture of these movable elements (42) or installed (welded or screwed down) to the movable elements (42) used in already operated/used means of transport, technical devices and building facilities/objects.

The remaining designations presented in FIG. 14 are the same as the designations presented in FIG. 8. FIG. 8*a*, FIG. 10, FIG. 12, FIG. 12*a*, FIG. 13, FIG. 13*a*.

Figure 15:
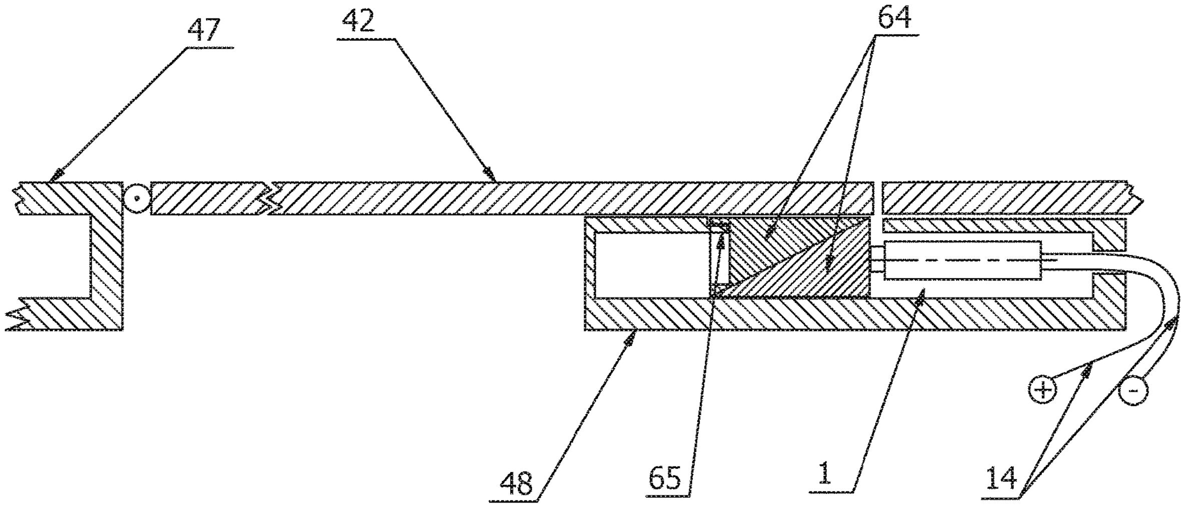
FIG. 15—shows a favourable manner of emergency opening of the movable element (42), which is a door or a manhole, or a hatch, or a window, or a pane installed in a window opening, by using a simple machine (64) which is at least one wedge, driven by the actuator (1) or by a lever (67).

FIG. 15—depicts a favourable/advantageous manner of emergency opening of the movable element (42), which is a door or a manhole, or a hatch, or a window, or a pane installed in a window opening, by using a simple machine (64) which is at least one wedge, driven by the actuator (1) or by a lever (67).

FIG. 15 depicts the external surface of the immovable element (47) of a means of transport, a technical device or a building object/facility, to which the movable element (42) is fastened by means of hinges (45). At one of the ends of the movable element (42), advantageously on the side of a lock or a bolt (63), a simple machine is situated—at least one wedge (64) or a set of wedges driven by the actuator (1).

The wedges (64) and the actuator (1) are installed advantageously in a bushing (48) fixed to the inner side of the immovable element (47) of a means of transport or a technical device or a building object/facility.

The external wedge (64) pressing and opening the movable element (42) has a hollowed chamber which is penetrated by the mandrel (65) guiding and protecting the wedge (64) from entire sliding out from the bushing body/casing (48).

In some means of transport or in technical devices or building facilities there is not enough free space to install the actuators (1)

by the methods depicted in previous FIG. 1 to FIG. 14, i.e. perpendicularly to the opened/pressed surface of the movable element (42) and therefore the only advantageous solution is the use of simple machines driven by the actuators (1) or levers (67).

In addition, it is advantageous to use the simple machine (64) since—as a result—a much greater pressing force onto the movable element (42) to be opened is generated, compared to the pressing force of the actuator (1).

Installation of the wedges (1) and of the actuator (1) in the way given above does not require a properly great free space since the wedges (64) and the actuator (1) are fitted in parallel to the external plane of the immovable element (47) and of the movable element (42), which occupies a small space of the width of 20 mm-25 mm, depending on the power of the actuator (1) used.

In the solutions depicted previously in FIG. 1 to FIG. 14, where the actuators (1) are installed perpendicularly to the external surface of the immovable element (47) of the structure and they act by the force vector perpendicular or almost perpendicular to the surface of the movable element (42) to be opened, a minimal space is required of at least 40 mm-50 mm wide, and in most applications this space must be over 70 mm, in order to ensure the adequate power of the actuator (1) and its adequately big sliding out.

Figure 15A:
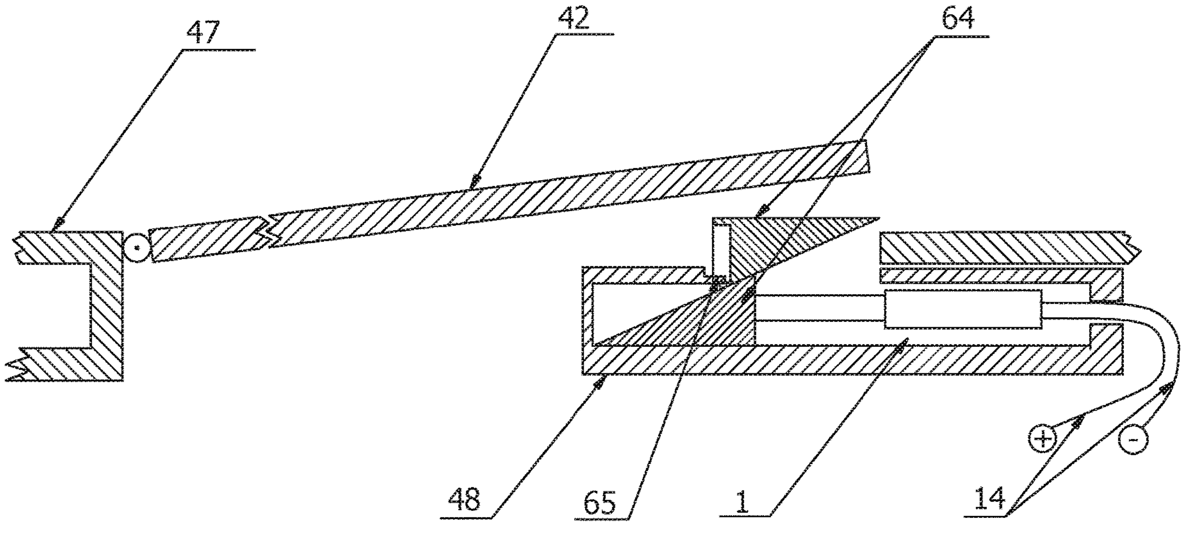
FIG. 15*a*—shows the movable element (42) shifted into the open position and a slid-out wedge (64) after enabling and operation of the actuator (1) from FIG. 15.

FIG. 15*a*—shows the movable element (42) shifted into the open position and a slid-out wedge (64) after enabling/activation and operation of the actuator (1).

The remaining designations presented in FIG. 15 and FIG. 15*a* are the same as the designations presented in FIG. 8. FIG. 8*a*, FIG. 10, FIG. 12, FIG. 12*a*, FIG. 13, FIG. 13 and FIG. 14.

FIG. 16—shows an alternative way of embodiment of the emergency opening system where instead of the actuator (1) shifting the simple machine (64) in the form of wedges, a simple machine which is a manual lever (67) is applied.

The principle of operation is similar as with the use of the actuator (1) to drive the simple machine (64) in the form of wedges depicted in FIG. 15 and FIG. 15*a*. During the shift of the arm of the manual lever (67), the shorter arm of the lever (67) presses the wedge (64) moving it to the upper position and thus a pressure is exerted on the movable element (42) to be opened, which moves to the opened position.

FIG. 16*a* depicts the movable element (42) shifted into the open position after exerting the pressing force of a wedge (64) which was shifted by means of the manual lever (67).

The remaining designations presented in FIG. 16 and FIG. 16*a* are the same as the designations presented in FIG. 8. FIG. 8*a*, FIG. 10, FIG. 12, FIG. 12*a*, FIG. 13, FIG. 13*a*, FIG. 14, FIG. 15.

FIG. 17 depicts an alternative manner of opening of the movable element (42) (e.g. a bullet-proof pane installed in a window opening) by means of a two-arm lever (66) driven by the actuator (1).

The technical solution presented in FIG. 17 and FIG. 17*a* permits to use a double-arm lever (66) shifted by means of the actuator (1) in minimal free narrow spaces at the elements to be opened, where the space necessary to install the double-arm lever (66) and the actuator (1) can have the width of 15 mm-20 mm and the reach of operation of the double-arm lever (66) can have much larger scope compared with the wedges (66) and it can amount to several hundred millimetres, depending of the length of the lever (66) arms and the length of stroke of the actuator (1).

The principle of operation is similar to the a/m ways of opening, i.e. the actuator (1) activated in an emergency situation, sliding out the sliding-out segment, presses on one of the ends of the double-arm lever (66) which, while folding, presses on the movable element (42) to be opened, moving it to the opened position.

FIG. 17*a* depicts the folded simple machine—the double-arm lever (66) after enabling/activation and operation of the actuator (1) and the movable element (42) shifted to open position.

The remaining designations presented in FIG. 17 are the same as designations presented in FIG. 8. FIG. 8*a*, FIG. 10, FIG. 12, FIG. 12*a*, FIG. 13, FIG. 13*a*, FIG. 14, FIG. 15, FIG. 15*a*.

FIG. 18 depicts another alternative way of emergency opening of the movable element (42) by means of the simple machine—the double-arm lever (66) driven by a helical transmission.

In this example of embodiment the double-arm lever (66) is also used but it is driven in a different way, i.e. by means of the helical transmission (67) set in motion manually or by means of an electric motor.

In an emergency situation, when there is a necessity of opening of the movable element (42), there is a possibility of using a helical transmission (67) which—while rotating—will cause folding of the arms of the double-arm lever (66) and—at the same time—its sliding out and pressing on the movable element (42) to be opened.

The application of the helical transmission (67) and the double-arm lever (66) releases the passengers or the crew of a means of transport or the inhabitants of a building facility/object from starting-up the actuators (1) by means of electrical power.

FIG. 18*a* depicts the movable element (42) shifted into the opened position after operation of the simple machine—the double-arm lever (66) driven by a helical transmission (67).

The remaining designations presented in FIG. 18 and FIG. 18*a* are the same as the designations presented in FIG. 8. FIG. 8*a*, FIG. 10, FIG. 12, FIG. 12*a*, FIG. 13, FIG. 13*a*, FIG. 14, FIG. 15, FIG. 16, FIG. 17, FIG. 17*a*.

FIG. 19 depicts the advantageous manner of opening the movable element (42) by a flexible actuator (75), especially in the form of a pneumatic actuator (e.g. a gasket or a storage cell), mounted on the rims of the opening (57) closed by the movable element (42) and/or on the internal plane of the movable element (42).

In the solution depicted the sliding-out elements (2) and (3), depicted in previous solutions in FIG. 1 to FIG. 17*a*, which require the use of special sealing (22), and apart from that, they are heavy weight and their manufacturing cost is high compared with the solution depicted in FIG. 19 to FIG. 23.

In this example of embodiment in FIG. 19 a pneumatic flexible actuator (75) was used fastened advantageously in appropriately profiled shape of the external plane (76) of a means of transport, a technical device or a building facility/object, e.g. on the rims of the opening (57), in the door post (76), a sill, roof, floor or on the external surfaces of the movable element (42) to be opened.

The flexible actuator (75) is made of a strong/robust flexible material, the same or similar to the material used in manufacturing of airbags or of a different flexible material, e.g. one reinforced with glass or carbon fibre. Favourably the flexible actuator (75) can be accordion-folded. It is also advantageous to manufacture the pneumatic actuator (75) of thin metal sheet, formed advantageously as a cylinder, hermetically closed (sealed) on both sides and pressed as accordion-folded along the symmetry axis of the cylinder.

Presented in FIG. 19 pneumatic flexible actuator (75) has an external body/casing (88) guarding it against damage and tilting sideways. There is a source of supply inside the pneumatic actuator (75) or there are connected via hermetic conduit to this source of supply, generating or containing compressed gas or air. These can be at least one gas generator (12) and/or at least one cell (71) of compressed gas or air, or a compressor.

In an emergency situation, when there is a necessity of opening of the movable element (42)), the electronic control system (23) (not shown in the drawing) sends a pulse of electric current via the electric cables (14) to activate at least one gas generator (12) which produces compressed gas which advantageously partially gets into the chamber of the pneumatic actuator (75), and partially presses on the striker (72) puncturing the membrane of the compressed gas/air cell (71), which fills the casing of the pneumatic actuator (75), exerting pressure on the surface of the movable element (42) to be opened.

In a different embodiment version passengers or the crew or the inhabitants of a building facility/object can decide on their own whether to activate the pneumatic actuator (75) or not. Then the actuator (75) has advantageously the gas generators (12) only or the compressed gas/air cell (71) only opened, e.g. by a solenoid valve. Also in this example of embodiment, one can stipulate that the lock/bolt blocking the movable element (42) is opened first.

The pneumatic actuator (75) can have any shape, e.g. cylindrical, oval or oblong. In a simplified version (not shown in the drawings) the pneumatic flexible actuator (75) does need to have the external guard/shield (86).

FIG. 19*a* depicts the movable element (42) shifted to the open position by an enabled and slid-out pneumatic actuator (71) after supplying pressure of the gas generator (12) and/or the compressed gas/air from the cell (71) or from the compressor.

The remaining designations presented in FIG. 19 and FIG. 19*a* are the same as the designations presented in FIG. 8. FIG. 8*a*, FIG. 10, FIG. 12, FIG. 12*a*, FIG. 13, FIG. 13*a*, FIG. 14, FIG. 15, FIG. 16, FIG. 17, FIG. 17*a*.

FIG. 20 depicts a different alternative example of application (embodiment) of the flexible actuator (1) which is a modified pneumatic gasket (68), (69) commonly used to seal openings and the movable elements (42) such as doors, manholes, hatches or windows and, at present, also adjusted for emergency opening of the movable elements (42), which (the gasket), after feeding the supply, i.e. filling with compressed gas or air, results in pressing on the movable element (42), shifting it to the opened position.

This solution stipulated the modified typical gasket (68) sealing the movable element (42) adding to this gasket (68) the supply with compressed gas, for example from at least one gas generator (12) or from at least one storage cell (71) of compressed gas or air and/or from a compressor.

In order to seal the holes of the movable elements (42), all over the world, in all types of means of transport, in technical devices and building facilities, the typical flexible gaskets are used, which in general have an internal hollow chamber, which allows slight sagging/yield of the external surface of the gasket during closing of the movable element (42) and thus hermetic shield of the hole/opening closed by the movable element (42) to prevent penetration of noise, air, dust, water.

The originators of this invention developed an advantageous version of embodiment (fabrication) of the typical gasket of the movable element (42) adding to it or connecting its hermetic internal chamber with a source of compressed gas or air, which ca be at least one gas generator (12) or a compressed gas cell (71) or compressed air can be supplied by a small compressor.

The typical gaskets (68), (69) depicted in FIG. 20, FIG. 20*a* and FIG. 22 are installed on the edges/rims of the immovable elements (47) of the structure, on the rims of holes (57) and/or on the internal surfaces of the movable elements (42), which provides a large surface of contact (mating) with the movable element (42) to be opened and thus provides a large surface of thrust/pressing on the element (42) to be opened—it is more advantageous compared with single-point thrust/pressure of the telescopic actuator (1) shown in FIG. 1, or of the simple machine (64), (66) shown in FIG. 15, FIG. 17.

Another advantageous effect of using the pneumatic gasket (68), (69) is less energetic/not so abrupt opening of the movable element (42) which increase the safety of its use.

If the cell (71) with compressed gas or air is used, it is advantageous to apply a solenoid valve or a valve which will enable bleeding the compressed gas or air from the inside of the pneumatic gasket (68, 69), which will permit to close the movable element (42).

The pneumatic gasket (68, 69) shown in FIG. 20, FIG. 20*a*, FIG. 21, FIG. 21*a*, FIG. 22, FIG. 23 can be installed in the points of installation used so far, i.e. on the rim of the opening (door-way) (57) in the immovable element (47) of the structure, mounted on the welded metal sheets of such opening (door-way) (57), e.g. the door-way in means of transport, passenger cars and motor trucks/lorries, or on the movable elements (42) to be opened, in this example of embodiment on the door of a means of transport, a technical device and a building facility/object.

This way of installation does not exclude introducing or making advantageous forming (drawing/extruding die-stamping) in the places of installation of the flexible gasket (68), (69), to ensure its more stable mounting/seating.

In an emergency situation the electronic control system (23) or passengers activate the operation of the electronic control system (not shown in the drawings) which first opens the lock or the door bolts (not shown in the drawings), and then at least one gas generator (12) or the cell (71) of compressed gas or air is activated, or compressed air is supplied from a compressor, and after that the compressed gas or air gets to the internal, at least one, hermetic chamber of the pneumatic gasket (68), (69), which results in expansion of the pneumatic gasket (68), (69) exerting pressure on the movable element (42) and in its shifting into the opened position (FIG. 20*a*).

After supplying the gas or air pressure the pneumatic and flexible gasket (68), (69), while expanding, straightens up and increasing its volume (marking 70 shows the expanded or disrupted gasket) beyond its normal shape, at the same time exerting pressure on the movable element (42) to be opened. The greatest force is exerted on the element (42) to be opened on the longest arm of the movable element (42) to be opened, i.e. close to the lock/bolts (63), opposite the hinges (45) of the movable element (42).

The advantage of the pneumatic gasket (68, 69) is that, while pressing the part located close to the hinges (45), it allows for a large angle of opening of the movable element (42) and maintaining it in the opened position.

Another advantage of this solution are lower costs of manufacturing and mounting of the pneumatic gasket (68)—there is no need to make installation holes or special fastening devices (shapes) compared with typical turned telescopic actuators (1).

In a different embodiment version (not shown in FIG. 20 no gas generator (12) is used but only the cell (71) of compressed gas equipped with a solenoid valve (not shown in the drawing), opened by the electronic control system (23).

FIG. 20*a* depicts the movable element (42) shifted into the open position after operation of the actuator (1), advantageously being a modified pneumatic gasket (69) commonly used for sealing the openings/holes/ways of the movable elements (42), also adapted for emergency opening (pushing out, shifting) the movable elements (42), after supply with compressed gas/air.

The solutions presented in FIGS. 19 and 19*a* as well as FIGS. 20 and 20*a* will find specific application for emergency opening of window openings, that is removing, rejecting or levering, even only one side of panes which are glue-installed in buses/coaches, rail-coaches/wagons, military vehicles and also in regular passenger cars and motor trucks/lorries.

The remaining designations presented in FIG. 20 and FIG. 20*a* are the same as the designations presented in FIG. 8. FIG. 8*a*, FIG. 10, FIG. 12, FIG. 12*a*, FIG. 13, FIG. 13*a*, FIG. 14, FIG. 15, FIG. 16, FIG. 17, FIG. 17*a*, FIG. 19.

FIG. 21 depicts an alternative solution in which, inside the typical gasket (68, 69), an expendable flexible element (73) was fitted, which expands after pressure supplying.

FIG. 21 depicts the folded flexible expandable element (73), supplied by at least one gas generator (12) or by compressed gas or air supplied from the cell (71) of compressed gas/air and/or from a compressor.

The principle of operation is the same as that in previously given examples of embodiment in FIG. 20, FIG. 20*a*, i.e. the activated gas generator (12) produces the pressure of compressed gas which partially or entirely migrates to the expandable element (73). The gas generator (12) presses partially or entirely the striker (72) which punches the membrane of the cell (71) with the compressed gas and the compressed gas/air migrates to the expandable element (73) resulting in its expansion and exerting pressure on the flexible gasket (69) which, in turn, presses on the movable element (42) to be opened shifting it to the opened position (FIG. 21*a*).

In another variant of embodiment, a solenoid valve (not shown in the drawing) can be used instead of the striker (72).

The use of the internal flexible expandable element (73), inserted into the gasket (68), (69) allows to increase the pressing force generated by the pneumatic gasket (68), (69) and simultaneous increase of the stroke/sliding-out of the tightened pneumatic gasket, which is depicted in FIG. 21*a* (the gasket tensed/expanded or tom apart is marked as 70).

The pneumatic gasket (70) can also have weakened points (74) of its side walls, which—upon supply of compressed gas is broken/tom apart, which allows to slide out the expandable element (73) by a larger distance and thus to exert pressure on the movable element (42) to be opened on a longer distance.

The advantage of application of this type of pneumatic gaskets is that it uses the already existing/used shapes or places of installation provided for usual gaskets of the movable elements (42) in many means of transport, technical devices and building facilities/objects and there is no necessity of making any additional holes in the internal or external surfaces of means of transport, a technical device a building facility/object.

Such embodiment allows to open the movable element (42) in a milder way and poses less risks to the outsiders staying in the vicinity of the movable element (42) to be opened.

The remaining designations presented in FIG. 21 and FIG. 21*a* are the same as the designations presented in FIG. 8. FIG. 8*a*, FIG. 10, FIG. 12, FIG. 12, FIG. 13, FIG. 13*a*, FIG. 14, FIG. 15, FIG. 16, FIG. 17, FIG. 17*a*, FIG. 19, FIG. 20.

FIG. 22 depicts an alternative solution of the manner of opening the movable element (42) by a gasket (69) mounted on the rims of the opening (57) of the movable element (42) or on the movable element (42) to be opened. It is similar to a typical gasket used to seal the movable elements (42) but advantageously it has at least one hermetic chamber to which the hermetic conduit (77) is connected, connecting the hermetic chamber with an external source of supply by compressed gas/air produced by at least one gas generator (12) and/or at least one cell (71 of compressed gas/air and/or by a compressor.

The principle of operation and the designations are described in previous FIG. 20 and FIG. 20*a*.

The remaining designations presented in FIG. 22 are the same as designations presented in FIG. 8. FIG. a, FIG. 10, FIG. 12, FIG. 12*a*, FIG. 13, FIG. 13*a*, FIG. 14, FIG. 15, FIG. 16, FIG. 17, FIG. 17*a*, FIG. 19, FIG. 20, FIG. 21, FIG. 21*a*.

FIG. 23 depicts an alternative advantageous solution of the manner of opening of the movable element (42) consisting in using the place of installation of the typical gaskets of the movable elements (42), in which a gasket is inserted or installed, one similar in appearance to typical gaskets but having more than one internal hermetic chamber to which sources of compressed gas/air supply are connected and a material with the memory of shape (41) of the SMA/SMP type.

The pneumatic gasket (68), (69) features a number of hermetic chambers supplied with compressed gas. The first chamber (78) has at least one gas generator (12) placed inside it, with the electric cables (14) connected to it, and via the cables an electric pulse is sent to activate the gas generator (12), which results in producing the pressure of compressed gas which—while migrating to the hermetic chamber (78)—causes expansion of the hermetic chamber (78) and a pressure on the movable element (42) to be opened. And the other chamber (79) has a hermetic conduit (77) connected to it, connecting the chamber (79) with at least one gas generator (12), connected with the cell (71) of compressed gas/air.

Upon activation of the gas generator (12) a simultaneous pressure is advantageously exerted on the striker (72) which punches the membrane of the cell (71) of compressed gas/air which migrates to the hermetic chamber (79) resulting in its expansion and pressing on the movable element (42) to be opened. And also a hermetic conduit is connected to the third chamber (80), connecting the chamber (80) with the gas generator (12) mounted in the hermetic conduit (77), and the principle of operation is the same as that described for the first hermetic chamber (78).

In turn the fourth chamber (81), contains the material with the memory of shape (41) of the SMA/SMP type, which can have the shape of a flat bar, with the electric cables (14) connected to its opposite ends, which (the cables) transmit the voltage of electric current, which causes heating up the material (41) of the SMA/SMP type and the change of its shape e.g. a sinusoid or accordion (bellows). The change of shape of the material (41) results in extension (expansion and bulging/belly) and disruption of the chamber (81) and simultaneous pressure on the movable element (42) to be opened.

The remaining designations presented in FIG. 23 are the same as designations presented in FIG. 8. FIG. 8*a*, FIG. 10, FIG. 12, FIG. 12*a*, FIG. 13, FIG. 13*a*, FIG. 14, FIG. 15, FIG. 16, FIG. 17, FIG. 17*a*, FIG. 19, FIG. 20, FIG. 21, FIG. 21*a*, FIG. 22.

FIG. 24 depicts an alternative, advantageous, manner of opening the lock or bolt of the movable element (42) by means of the actuator (1) with the material (41) of the SMA/SMP type.

By means of the SMA/SMP actuator (1) locks or bolts can be advantageously opened many times, in contract with the pyrotechnic actuators (1) in use, which are of one-off use and require replacement of the gas generators (12) used-up with the new ones.

The principle of operation consists in heating up the material (41) of the SMA/SMP type. e.g. by electric current, which results in an increase of temperature of the SMA/SMP material (41) and its return to the shape pre-given in the manufacturing process. During the change of shape the SMA/SMP materials (41) perform work, which in this case is used to drive the actuator (1) intended for emergency opening of the lock or a bolt of the movable element (42).

The electric cables (14) are connected to the SMA/SMP actuator (1), which are used to supply the voltage of electric current. And also one of the ends of the actuator (1) with the SMA/SMP material (41) is connected with the internal arm (59) of a lock or a bolt (58) and the other end is connected with any point situated next to the lock or the bolt (58).

FIG. 25 and FIG. 26 depict another advantageous example of embodiment—a technical solution, accomplishing the same purpose—opening/getting ajar/shifting/pushing out blocked/jammed door/manholes/hatches/emergency exits/windows or panes in windows or window openings, or in doors, by means of a portable device, so-called "Pyrotechnic opener"

The pyrotechnic opener is used to release people trapped, in various emergency situations, in means of transport (planes, helicopters, military vehicles, boats, submarines), in technical devices/facilities, e.g. radar stations or in building facilities/objects, e.g. drilling platforms, refineries, chemical plants/sites producing inflammable (combustible)/explosive chemical compounds.

While—in the examples of embodiment given previously—the depicted solutions are intended mainly for newly designed, and also already in use, means of transport/technical devices/building facilities/objects etc., where there is a necessity of interference in the design/structure, e.g. making holes for installation, reinforcement of a structure etc., the originators of the invention, in order to avoid these inconveniences—weakening a structure, developed a solution which provides the application of an entirely independent technical method of opening/getting ajar/shifting/pushing out various elements, i.e. doors/manholes/hatches/lids/emergency exits/windows or panes in windows, in doors and window openings, or in doors, by means of a portable device, the "Pyrotechnic Opener".

The pyrotechnic opener shown in FIG. 25 and FIG. 26 does not require installation, i.e. interference in the structure, making hole for mounting in means of transport, technical devices or building facilities/objects. In order to use it, strong/robust surfaces are required inside a means of transport, in a technical device or in a building facility/object, which will constitute a resistance point/thrust point for the pyrotechnic opener in operation, pressing on the movable element (42) to be opened.

The pyrotechnic opener presented in FIG. 25 and FIG. 26 has at least one sliding-out/pressing (3) segment, driven by at least one actuator (1)

(a pyrotechnic, pneumatic, electric one or a SMA/SMP actuator), which is installed in the pyrotechnic opener. As an example the actuator (1) can be the actuator shown in FIG. 6.

The pyrotechnic opener can be started manually or remotely by people present in means of transport, technical devices or building facilities/objects and has adequate support elements (89, 96) (struts, fastening arms), providing a point of support or thrust/resistance for a siding out (3) segment/support element, which—pressing on the movable element (42) to be opened/got ajar/shifted/pushed out—moves it to its opened position.

Another advantageous technical solution is the use of special fastening devices mounted on the floor/ceiling/wall inside a means of transport, in a technical device or in a building facility/object, to which (the fastening device) the pyrotechnic opener from FIG. 25 and FIG. 26 is fixed, whose (the opener's) sliding out (8) part, (90) is situated opposite the movable element (42) to be opened, advantageously on the side (58) of a lock/bolts, opposite the hinges (45) of the movable element (42).

The pyrotechnic opener has a possibility of multiple use in one action and there is no necessity to replace the pyrotechnic actuators (1) which drive it.

The originators of the invention developed an advantageous technical solution which assures the multiple use of the actuator (1) in various applications, not only in the pyrotechnic opener, i.e. multiple sliding out and return of the sliding-out elements (2) and (3) of the telescopic actuator (1) or the piston (4), used in the pyrotechnic piston actuator (1).

For this purpose, in the spaces between the sliding-out elements (2) and (3) and/or between (11) the multi-step head containing (12) gas generators or between the multi-step gas generators (12) and the face of the siding-out bushings (2) and/or the sliding-out mandrel (3), or the piston (4) of the actuator (1), a lubricant (99) should be put, e.g. grease (solid lubricant) or in liquid form, or oil, or liquid/fluid silicone, or other solid or liquid/fluid substances providing slide of the siding-out elements (2), (3), (4) and absorption and dissolving the products—carbon deposit generated during activation of the pyrotechnic gas generators.

The use of pyrotechnic opener can be a supplement or an alternative option for the actuators (1) and other devices (84), (66), (68), (70), (73), (75), (78), (79), (80), (81), installed as permanent in means of transport, technical devices or building facilities/objects. The opener can also be the only device used for emergency opening of various movable elements and bullet-proof panes.

The pyrotechnic opener has a control panel controlling the operation of the device, which can be connected via the electric cables (14) or wireless with the device—the pyrotechnic actuator (1) (pyrotechnic actuators), or can be installed on a device in a shock-absorbing manner, so that to avoid any damage to the power supply battery/accumulator/super-condenser and the electronic control devices (23, 27).

Both versions of control provide a possibility to set the delay times of initiating the device and a selection of number and sequence of activation of specific gas generators (12) so that the operating staff would have time to walk away safely from the device to be operating. The pyrotechnic opener can also be used for opening (getting ajar, pushing out, shifting) various elements, also in other means of transport, technical devices, or building facilities/objects, including those used by the road traffic rescue teams/units, fire brigades and other rescue units/services.

FIG. 25 and FIG. 26 depicts the pyrotechnic device—the pyrotechnic opener in which at least one pyrotechnic actuator (1) is installed which drives at least one mandrel (3)/piston rod, featuring adequate pressing/thrust elements (8), pressing on the movable element (42) to be opened. The mandrel (3)/piston rod of the actuator (1) can press directly on a given element or indirectly pressing the arm (89).

The pyrotechnic opener has at least one electronic control centre unit (23) installed in the actuator (1) and/or at least one electronic control centre (23) connected via the cables (14) and advantageously disconnecting plug or wireless with the pyrotechnic (1) telescopic actuator, driving the pyrotechnic opener and the electronic control centres (23) are power supplied by at least one battery and/or an accumulator and/or a super-condenser. The electronic control centres/units (23) are initiated/started by means of the push-buttons (27) or by means of the access codes entered via the touch screen or by means of voice commands (35).

The pyrotechnic telescopic actuator (1) features the head (11) having at least one pyrotechnic gas generator (12) or has at least one multi-step gas generator (12) (as a target, several or up to twenty pyrotechnic gas generators of various rated powers). Upon initiation/operation of the actuator (1) there is a possibility to telescope (slide-in) of the bushings (2) and (3) of the actuator (1), which allows for multiple use of the pyrotechnic opener. Certainly, there is also a possibility of simultaneous activation of several gas generators (12), in order to achieve the greatest possible force of performance/operation of the pyrotechnic actuator and to open, as fast as possible, the given movable element (42), e.g. when human life is in danger.

There is also stipulated a possibility of exchange of the actuators and replacing the actuators with used-up gas generators (1), with new actuators featuring several or up to twenty gas generators (12).

Depending on the intended use of the device, in the actuators, the generators (12) of more and more power/energy can be applied, which will let achieve graduated pressing power up to many tonnes.

The principle of operation is as follows.

Upon an emergency situation occurrence, when the door (s)/manholes/hatches etc. has got blocked, the individuals staying inside in means of transport, technical devices or building facilities/objects can set the pyrotechnic opener opposite the movable element (42) to be opened, (e.g. to put it up to the element to be opened) and then to lock the device by means of the movable arms (96), adjusting the strut (97) of the arms by means of the thread (98), e.g. against the opposite wall or against specially fastening devices/projections/caving (hollows/pits) in the floor/ceiling or against the floor and ceiling etc. Then unwind the cables with the control console and walk away from the device by a safe distance. Then, upon making sure, that no other individuals are behind the element to be opened, initiate emergency opening (getting ajar, pushing out or shifting) of the movable element (42).

There is also a possibility of remote control of the device by the crew/team without the electric cables (14). For this purpose, the actuator (1) features its own electronic control/power supply system (23) and the module (38) of wireless communication, which enables the initiation/start-up of the pyrotechnic opener fastened inside a means of transport, a technical device or in a building facility/object, and also from outside by special rescue units, having the access codes or magnetic cards inserted in the card reading device, or by means of adequate outputs of the wireless module (38), (or the wired module), where there is a possibility to connect to it the plugs of the electronic device/computer of rescue units. The entire electromic control system (23), has protection against an electromagnetic pulse.

The manner of initiating/start-up from inside and from outside of the pyrotechnic opener given above also refers to all and any other examples of embodiment of the actuators (1), applied for emergency opening of the movable elements (42).

LEGEND OF DESIGNATIONS IN THE DRAWINGS/FIGURES

1. Actuator (telescopic actuator, piston actuator, flexible actuator, SMA/SMP actuator),
2. Sliding-out element of the actuator—bushing,
3. Sliding-out element of the actuator—mandrel,
4. Actuator piston,
5. Pressing mandrel (movable, linked with the movable element)
6. Resistance/stop flange—fastening the actuator body/casing,
7. Threaded nut, fastening the actuator body/casing or the bushing in the installation hole,
8. Pressing lid of the actuator, of the mandrel (3)
9. Actuator orifice, closing the actuator body/casing and fastening the actuator in the hole or in the opening device,
10. Springy ring with pawls/latches (blocking the telescoping of the slid-out actuator),
11. Head with at least one gas generator or at least one-step generator (can have internal connections (13) of the gas generators, e.g. via electric leads),
12. Gas generator/generators,
13. Electrical connection of gas generators (minus or plus) inside the head, at least two-step one,
14. Electric cables/electrodes of the gas generator—(+), (−), electrical connection, 15. Thread on the gas generator/gas generators,
16. Hollow enabling to screw in/screw out the head, gas generator
17. Retaining bushing of the gas generator (the bushing fastening the gas generator and preventing tearing apart the sides of the gas generator),
18. Guard of the gas generator (protects against the effect of the shock wave generated by another activated gas generator, it can be, e.g. a steel or composite material lid pressed into the hole in which the gas generator is fixed or an adequate layer of plastic when the head is made of plastic)
19. Reinforcement of the side wall (shell) of the pyrotechnic gas generator (e.g. a steel or composite material bushing which prevents tearing apart the sides of the gas generator),
20. Reinforcement of the head/pyrotechnic gas generator of the actuator,
21. Ring (e.g. Seeger ring), fastening the actuator/the bushings/the heads of the gas generator,
22. Sealing or resistance or leading ring,
23. Electronic system controlling the start-up/operation of the actuator,
24. Battery/accumulator/super-condenser supplying power to the system controlling the operation of the actuator,
25. Diode/display, signalling the level of charging/discharging of the battery, the accumulator or the super-condenser,
26. Microprocessor controlling the operation of the actuator,
27. Alfa-numerical push-buttons or a touch screen enabling to enter the code activating/enabling the operation of the actuator,
28. Glass/shield/guard shielding the pushbuttons of the control system,
29. Pushbutton for emergency start-up of the actuator without entering the access code—the pushbutton can be highlighted and enabled/active all the time or it can get enabled/activated upon the occurrence of abnormal parameters recorded/sensed by the sensors installed in the actuator or sending signals to the actuator,
30. Metal, movable guard/shield of the electronic assemblies and gas generators, protecting the actuator against an electromagnetic pulse,
31. Acceleration sensor, shock sensor—accelerometer plus position sensor—gyroscope,
32. Sound sensor,
33. Smoke/fire/temperature sensor (detector),
34. Water sensor (detector),
35. Voice sensor (detector)—speech analyser, enables to give voice/oral commands initiating the operation/activation of the actuator,
36. Sensor (detector)/scanner of gestures,
37. Scanner of thumb/finger/palm (hand)/face/eye,
38. Wireless communication module,
39. Sensor of the inside pressure of a vehicle/object (facility),
40. Path sensor, measuring the distance/angle of opening of the movable element to be opened
41. SMA/SMP material, constituting the drive of the actuator/gasket,
42. Movable element (door, also sliding door, manhole, hatch, window, bullet-proof pane)
43. Tip segment (cover plate)—a formed surface mounted on the internal surface of the movable element,
44. Press bushing, installed in the hole of the movable element,
45. Hinge of the movable element,
46. Sliding door guide,
47. Immovable element (the external plane or surface of the structure of means of transport, e.g. a door post, a sill, the armour),
48. Bushing fastening the actuator/actuator fastening,
49. Floor of means of transport/technical device/building facility (object),
50. Bushing fastening to the floor of means of transport/technical device/building facility (object), e.g. a bolt, a nut fastening the bushing),
51. Additional surface of the movable element, which is the press/thrust point of the actuator,
52. Movable—sliding shape,
53. Rail guiding the movable/sliding shape,
54. Movable—rotatable shape/arm,
55. Thrust/resistance catch (holder) of the rotatable shape,
56. Point/hole for fixing/installation of the actuator,
57. Rim of the hole of the movable element
58. Closing means (lock, bolt, lock holder (assembly/cassette)
59. Internal arm of the lock/bolt/latch
60. External arm/handle of the lock/bolt/latch
61. Bent internal arm of the lock/bolt/latch (opening of the movable element occurred without prior opening of the lock/bolt/latch),
62. Spare internal arm of the lock/bolt/latch (enables closing the opened movable element after bending the first arm 60 of the lock/bolt/manhole),
63. Handle of the lock/bolt/latch of the movable element,
64. Wedge—simple machine, the set of two wedges strutting the movable element to be opened,
65. Mandrel guiding the wedges (prevents complete sliding out of the wedges),
66. Double-arm lever—simple machine,
67. Manual lever arm—the sliding or rotatable (helical) one,
68. Pneumatic gasket (in deflected condition, pressed down by the closed movable element),
69. Pneumatic gasket (in loose (expanded) condition, pressed down the movable element is opened),
70. Pneumatic gasket (stretched or tom apart during supply of the pressure of compressed gas of the generator or of compressed air),
71. Cell of compressed gas/air,
72. Striker or solenoid valve—the element opening the cell of compressed gas/air (e.g. a striker or a solenoid valve or weakened point of the cell, the striker driven by the activated gas generator),
73. Flexible cell (container)/element placed inside the pneumatic gasket,
74. Weakened point of the pneumatic gasket (facilitating tearing apart of the external coating of the gasket)
75. Pneumatic cell/container,
76. Door post/sill/rim of the hole of the movable element,
77. Conduit connecting the pneumatic gasket with the pyrotechnic gas generator or with the container of compressed gas,
78. Part of the gasket having a hermetic, pneumatic chamber and at least one gas generator placed directly inside the gasket chamber,
79. Part of the gasket having a hermetic, pneumatic chamber supplied with compressed gas and compressed air—the gas generator and the cell of compressed air,

80. Part of the gasket having a limited (contained) pneumatic chamber supplied only with the gas generated by the activated at least one gas generator connected with the chamber via a hermetic conduit,

81. Part of the gasket driven by smart material of the SMA/SMP type,

82. Flexible sliding-out element of the SMA/SMP actuator,

83. Tension member linking the actuator with the element to be opened (e.g. the guide of sliding door),

84. Sliding fastening device or catch (holder) of the SMA/SMP actuator or of the tension member opening/pulling the movable element, e.g. sliding door.

85. Thread on the orifice (9) closing and fastening the actuator (1),

86. Flexible, sliding out part of the flexible actuator (1),

87. Catch (holder) fastening the SMA/SMP actuator (1).

88. Body of the actuator (1).

89. Lever arms—simple machine,

90. Thrust/resistance base (support),

91. Fastening of the actuator—bushing,

92. Thread on the actuator fastening device—bushing,

93. Hole for installation of the bushing, of the actuator,

94. Bolt linking the movable parts of the arm (89), of pin (3),

95. Arm of the bolt (94) nut, replacing the wrench for bolts,

96. Resistance-and-retaining arm stabilizing the actuator/device for emergency opening,

97. Strut of the resistance-and-retaining arms,

98. Thread adjusting the length of the strut (97),

99. Lubricant (e.g. oil, grease, fluid/liquid silicone etc. absorbing and dissolving the products generated during the pyrotechnic activation of the gas generator, which (the products) bound or dissolved by the lubricant, enable multiple telescoping (folding) and sliding-in the segments of the actuator (1) and thus multiple operation of the actuator (1),

100. Hole for slide-fastening (1) of the actuator, of the sliding-out element (3)/of the mandrel.

The invention claimed is:

1. A system for emergency opening of a movable closure (42) inserted in an immovable element (47) and which constitutes a barrier between two spaces, wherein the system comprises an actuator (1) able to move the closure (42) from a closed position into an open position, wherein the actuator (1) comprises:

a casing (88), at least one sliding-out element (2, 3, 4, 82, 86), placed at least partially in the casing (88), and at least one gas generator (11, 12) able to drive the at least one sliding-out element (2, 3, 4, 82, 86) away from the casing, wherein the casing (88) is fixed in an opening in one of the immovable element (47) and the closure (42) and the at least one sliding-out element is fixed to the other one of the immovable element and the closure, wherein the at least one gas generator (11, 12) is placed in the casing (88) of the actuator (1), wherein the at least one gas generator (11, 12) at least partially or in total enters the at least one sliding-out element (2, 3, 4, 82, 86), and wherein the at least one sliding-out element is inflatable and made from a flexible material.

2. The system according to claim 1, wherein the at least one gas generator (11, 12) is mounted to a mounting head of the casing (88).

3. The system according to claim 1, wherein a volume of the at least one sliding-out element (82, 86) increases in response to the gas generated by the at least one gas generator (11, 12).

4. The system according to claim 1, wherein the gas generator comprises compressed gas.

5. A system for emergency opening of a movable closure (42) inserted in an immovable element (47) and which constitutes a barrier between two spaces wherein the system comprises an actuator (1) able to move the closure (42) from a closed position into an open position, wherein the actuator (1) comprises:

a casing (88), at least one sliding-out element (2, 3, 4, 82, 86), placed at least partially in the casing (88), and at least one gas generator (12) able to drive the at least one sliding-out element (2, 3, 4, 82,86) away from the casing, wherein the casing (88) is fixed in an opening in the movable closure (42) and the at least one sliding-out element is fixed to the immovable element, wherein the at least one gas generator (12) is placed in the casing (88) of the actuator (1) in parallel with an axis of operation of the actuator (1), wherein the at least one gas generator (12) at least partially or in total enters the at least one sliding-out element (2, 3, 4, 82, 86), and wherein the at least one sliding-out element is inflatable and made from a flexible material.

* * * * *